(12) United States Patent
Okamoto et al.

(10) Patent No.: US 6,744,426 B1
(45) Date of Patent: Jun. 1, 2004

(54) PEN COORDINATE READING DEVICE WITH PEN ATTRIBUTE DETECTING FUNCTION

(75) Inventors: Tsugio Okamoto, Mizuho-ku (JP); Takashi Kawaguchi, Mizuho-ku (JP); Tsuyoshi Ohashi, Hashima (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 631 days.

(21) Appl. No.: 09/636,818

(22) Filed: Aug. 10, 2000

(30) Foreign Application Priority Data

| Aug. 10, 1999 | (JP) | ............ P11-226693 |
| Aug. 18, 1999 | (JP) | ............ P11-231151 |
| Mar. 31, 2000 | (JP) | ............ P2000-099354 |

(51) Int. Cl.$^7$ .................................. G09G 3/36
(52) U.S. Cl. .................. 345/179; 345/174; 178/18.07
(58) Field of Search ................ 345/176, 173, 345/174, 179, 156, 157; 178/18.01–18.11, 19.01, 19.07

(56) References Cited

U.S. PATENT DOCUMENTS 5,138,118 A * 8/1992 Russell .................... 178/19.03
5,239,489 A * 8/1993 Russell ....................... 701/37
5,571,997 A * 11/1996 Gray et al. .............. 178/19.04

FOREIGN PATENT DOCUMENTS

| JP | A-5-233127 | 9/1993 |
| JP | A-5-274079 | 10/1993 |
| JP | A-7-160400 | 6/1995 |

* cited by examiner

Primary Examiner—Dennis-Doon Chow
(74) Attorney, Agent, or Firm—Oliff & Berridge PLC

(57) ABSTRACT

A circuit mounted in the circuit board 69 of the pen 60 includes: a CR solution circuit 69e; an LC oscillation circuit 69c; and an FSK circuit 69d. The CR oscillation circuit 69e oscillates a signal with one of a plurality of different modulation frequencies that correspond to a plurality of different attributes, such as ink colors, pen tip thickness, and the like, of the pen. The LC oscillation circuit 69c is for oscillating a carrier wave for transmitting the signal oscillated by the CR oscillation circuit 69e. The FSK circuit 69d is for PSK modulating the oscillation frequency of the LC oscillation circuit 69c in accordance with the modulation frequency of the CR oscillation circuit 69e. The receiving side measures a time period at which the frequency of the carrier wave is maintained, thereby determining the period of the modulation frequency to know the pen attributes. Because it is sufficient to receive the signal from the pen for at least one period of time thereof, it is possible to shorten the time required to recognize the pen attributes.

41 Claims, 44 Drawing Sheets

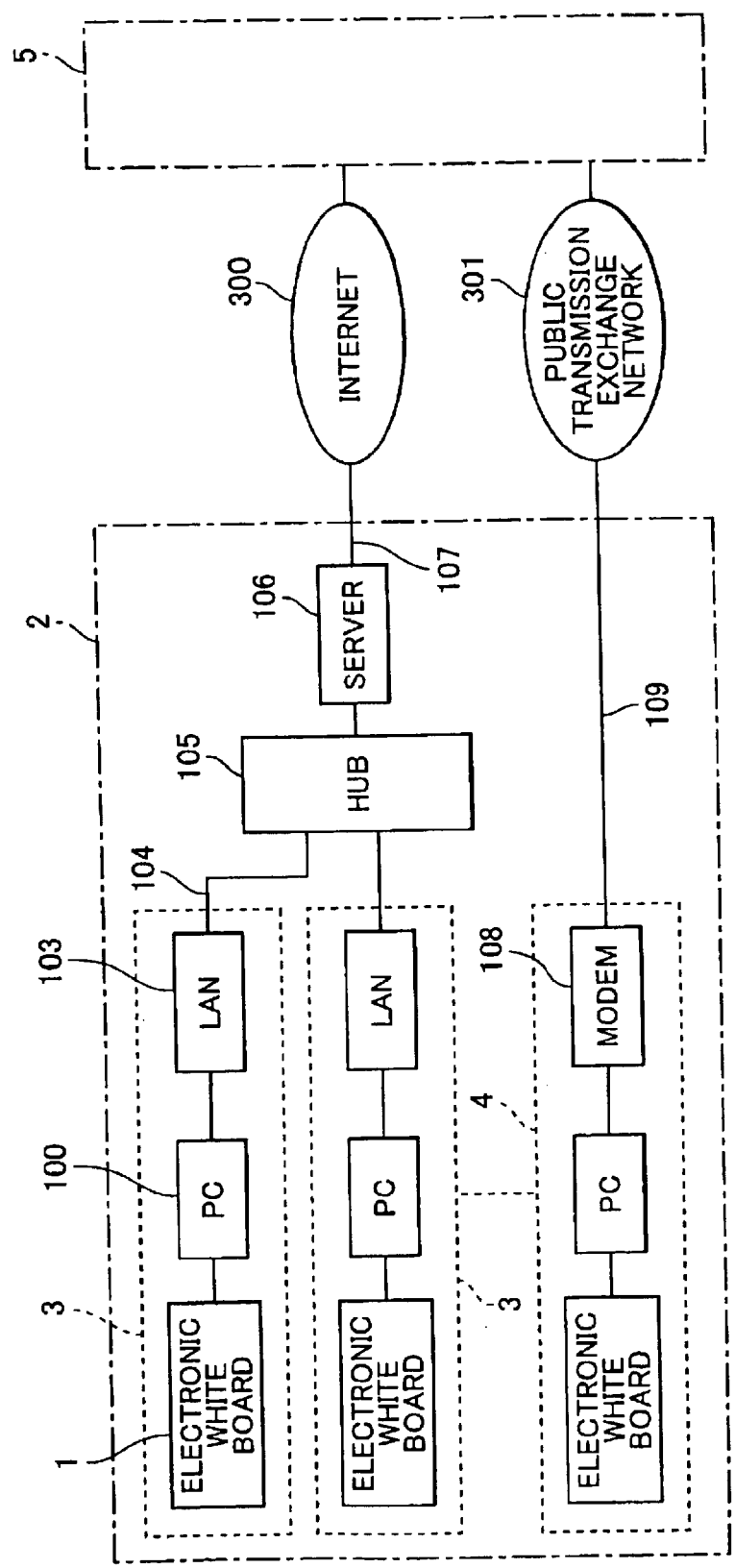

RELATIONSHIP BETWEEN PEN ATTRIBUTE AND MODULATION FREQUENCY

| fm (KHz) | 10 | 8.7 | 7.7 | 6.9 | 6.3 | 5.6 | 5.0 | 4.5 | 4.1 |
|---|---|---|---|---|---|---|---|---|---|
| PEN ATTRIBUTE | ERASER | RED FINE | RED THICK | GREEN FINE | GREEN THICK | BLUE FINE | BLUE THICK | BLACK FINE | BLACK THICK |
| DEMODULATION COUNT NUMBER | 100 | 115 | 130 | 145 | 160 | 180 | 200 | 220 | 245 |

POSITION COORDINATE TABLE 58a

| ΔX [mm] ΔY | DIFF |
|---|---|
| 0 | 163 |
| ⋮ | ⋮ |
| 2.5 | 127 |
| ⋮ | ⋮ |
| 5.0 | 91 |
| ⋮ | ⋮ |
| 7.5 | 58 |
| ⋮ | ⋮ |
| 10.0 | 26 |
| ⋮ | ⋮ |
| 12.5 | 0 |

VOLTAGE VALUE STORAGE AREA 59a

| COIL NUMBER | VOLTAGE VALUE |
|---|---|
| X1 | e1 |
| X2 | e2 |
| X3 | e3 |
| X4 | e4 |
| X5 | e5 |
| X6 | e6 |
| X7 | e7 |
| X8 | e8 |
| X9 | e9 |
| ⋮ | ⋮ |
| Xm | em |

PEN ATTRIBUTE DETECTION ROUTINE 2

: INPUT TO IC2

: OUTPUT FROM IC4

RELATIONSHIP BETWEEN PEN ATTRIBUTES AND
LOW LEVEL PERIOD T1

| PERIOD T1 [mS] | .. | .. | 0.13 | .. | .. | .. | .. | .. | 0.24 |
|---|---|---|---|---|---|---|---|---|---|
| PEN ATTRIBUTE | ERASER | RED FINE | RED THICK | GREEN FINE | GREEN THICK | BLUE FINE | BLUE THICK | BLACK FINE | BLACK THICK |
| DEMODULATION COUNT NUMBER | 100 | 115 | 130 | 145 | 160 | 180 | 200 | 220 | 245 |

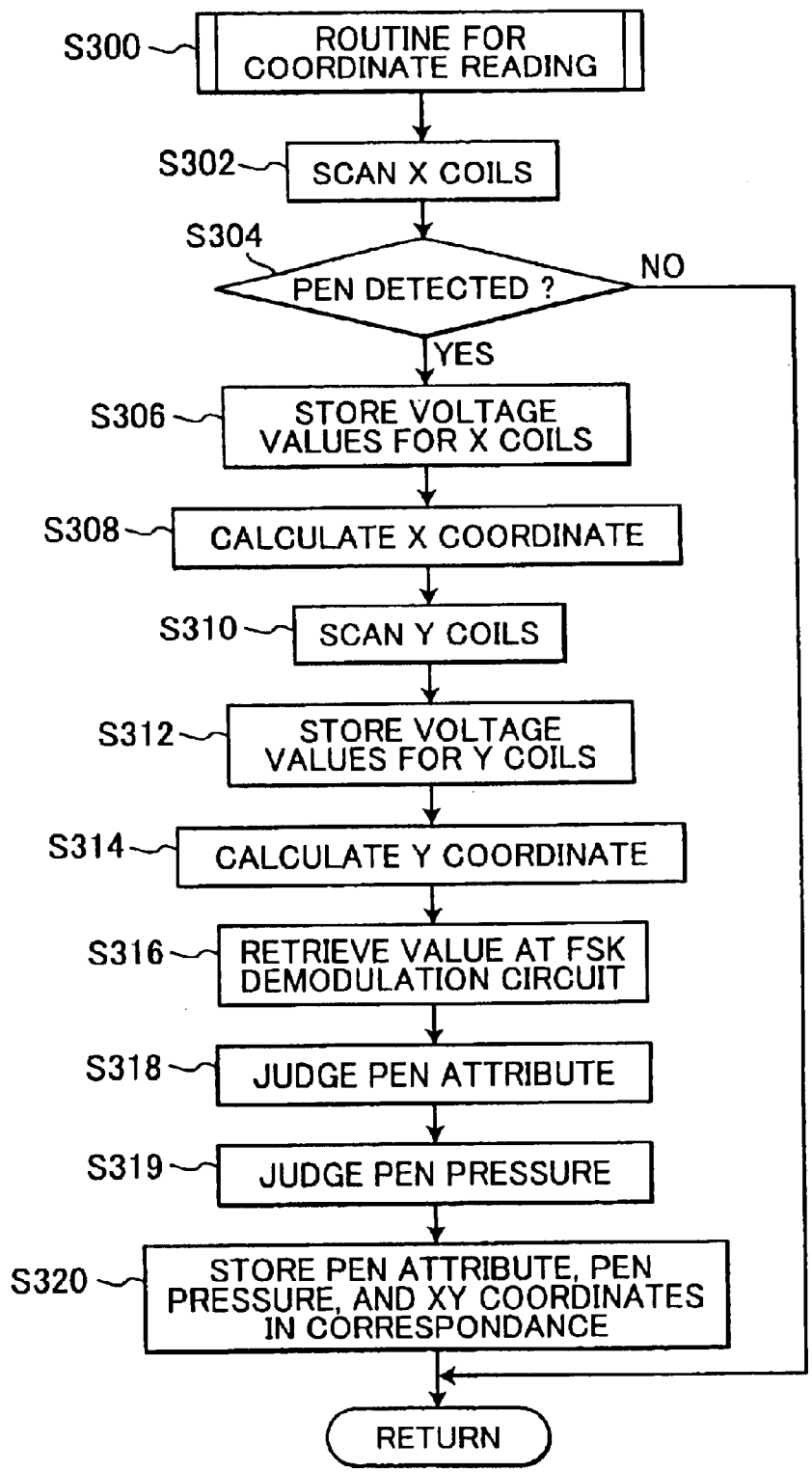

FIG.29(c)
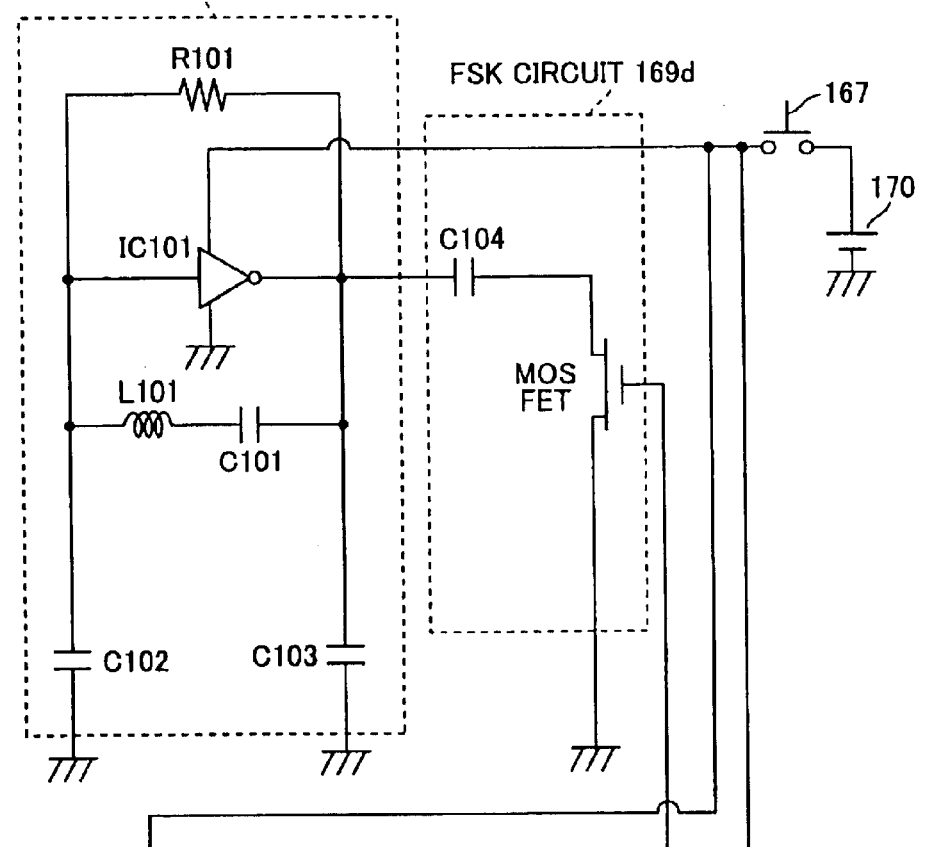
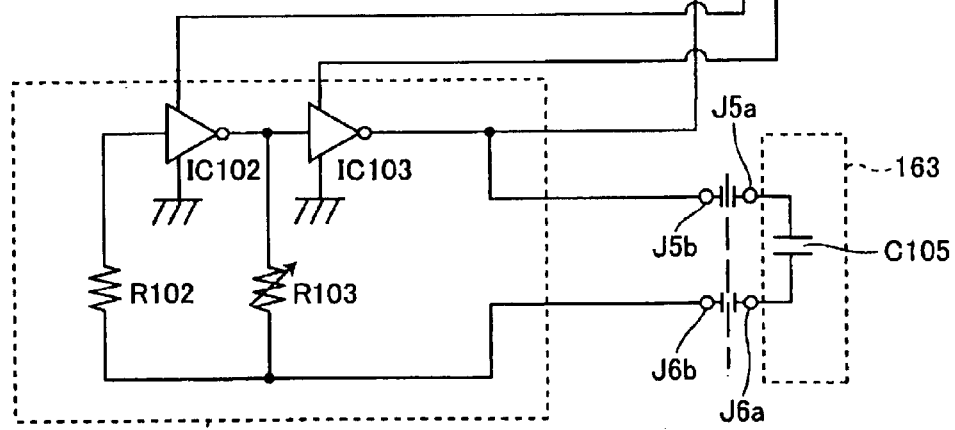

PEN COORDINATE READING DEVICE WITH PEN ATTRIBUTE DETECTING FUNCTION

BACKGROUND OF THE INVENTION

1. Field of the Invention

The present invention relates to a coordinate reading device and a coordinate input device.

2. Description of the Related Art

Various types of coordinate reading device and a coordinate input device have been proposed.

SUMMARY OF THE INVENTION

FIG. 1(a) is a configuration of a conceivable coordinate reading device and a conceivable coordinate input device. The conceivable coordinate reading device includes: a table 91, a scanning circuit 92, and a detection circuit 90. The tablet 91 is provided with a plurality of X sense coils (conductive loop wires) X1 to Xm and Y sense coils (conductive loop wires) Y1 to Yn. The X sense coils X1 to Xm are for detecting X coordinates of a pen (coordinate input device) 400, the Y sense coils Y1 to Yn are for detecting Y coordinates of the pen 400. The scan circuit 90 is for serially scanning the sense coils X1–Xm and Y1–Yn on the tablet 91. The detection circuit 90 is for calculating the x and y coordinates of the pen by detecting induction signals generated at the sense coils X1–Xm and Y1–Yn.

The pen (coordinate input device) 400 includes a coil 401 that generates an alternating magnetic field. When the pen 400 contacts the tablet 91, some sense coils that are located near to the pen 400 generate induction signals 97 due to magnetic coupling with the alternating magnetic field from the coil 401. The induction signals 97 are inputted into the detection circuit 90. The induction signal 97 are amplified at an amplifier 93 and then its amplitude is detected at an amplitude detection circuit 94. Next, and A/D conversion circuit 95 converts the measured amplitude into digital values, and outputs the digital values to a CPU 96. The CPU 96 calculates the positional coordinate of the pen 400 based on the inputted digital values from the A/D conversion circuit 95. For example, the CPU 96 may refer to a coordinate table that stores data indicative of a relationship between a plurality of digital values and coordinate positions. The CPU 96 selects a positional coordinate that corresponds to the digital values presently inputted from the A/D conversion circuit 95.

Japanese Patent-Application Publication (Kokai) No. HEI-5-233127 discloses a coordinate reading device for a plurality of different type pens. Each pen transmits a code train that includes attribute information indicating attributes of the pen. The coordinate reading device detects the attribute information in the signal.

FIG. 1(b) is a timing chart showing an example of the code train transmitted from the pen. The code train G includes ten bits; two start bits, seven bits indicating pen attribute information, and a single stop bit. The code train G is superimposed on an alternating magnetic field from the pen in accordance with an operation clock F and then outputted.

In the coordinate reading device, the sense coils generate signals to response to the alternating magnetic field transmitted from the pen. The coordinate reading device reads the code train G that is superimposed in the generated signals, and detects the pen attribute information.

According to this method proposed by the publication, however, the coordinate reading device cannot recognize the pen attribute information unless it receives the code train G over a plurality of periods from the start bit to the stop bit.

Also, the coordinate reading device can not recognize the pen attribute information unless the operation clock of the pen is synchronized with the operation clock of the coordinate reading device.

Further, if detection by the sense coils is started somewhere between the start bit and the stop bit, then the coordinate reading device has to wait until the next start bit, and receive the entire code train from the start bit to the stop bit, or will not be able to detect pen attribute information. Thus, it takes a great deal of time to determine the pen attribute information.

Japanese Patent-Application Publication (Kokai) No. HEI-7-160400 discloses another coordinate reading device and a pen (coordinate input device). According to this publication, the pen generates an alternating magnetic field, whose frequency changes according to color of ink in the pen. The pen includes a switch that enables changing the frequency of the alternating magnetic field in accordance with the ink color. The coordinate reading device recognizes the color of the ink by detecting frequency of the alternating magnetic filed outputted from the pen.

In the configuration proposed by this publication, however, the coordinate input device (pen) switches frequency in accordance with the ink color. The coordinate reading device detects the ink color according to the received frequency. It is impossible for the pen to transmit values that consecutively change, such as pressure, at which the pen is pressed against the writing surface of the coordinate reading device. Also, because only a certain number of frequency bands can be used, this configuration can use frequency to designate only a limited number of attributes, that is, the ink color.

Japanese Patent-Application Publication (Kokai) No. HEI-5-274079 discloses a coordinate input device (pen) which includes a marker portion and a case portion. The marker portion is detachably attached to the case portion, and includes a coil and an ink tank filled with ink. The marker portion is used to draw character and figures on a white board using the ink in the ink tank. The case portion includes a battery and a signal tuning circuitry for producing signals to cause the white board to detect the position of the pen. When the ink in the marker portion runs out, then the marker portion is detached from the case portion and is discarded. A new marker portion filled with ink is then attached to the case portion in its place. With this configuration, the battery and the circuitry in the case portion can still be used, so running costs are low. However, the only information the white board obtains from the tuning unit is the position of the input unit on the board.

In view of the above-described drawbacks, it is an objective of the present invention to provide an improved coordinate input device which is capable of transmitting information so that the coordinate reading device can distinguish the information in a short period of time, and to provide an improved coordinate reading device which is capable of distinguishing information, transmitted from a coordinate input device, in a short period of time.

It is another objective of the present invention to provide an improved method for communicating information so that an information receiving side can distinguish the information in a short period of time.

It is another object of the present invention is to provide an improved coordinate input device which is capable of transmitting information indicating a variety of attributes and consecutively-changing values, and an improved coordinate reading device which is capable of detecting information indicating a variety of attributes and consecutively-changing values.

It is still another objective of the present invention to provide an improved coordinate input device wherein a single case portion can be used with a plurality of different marker portions with different colors, wherein the marker portions can be exchanged simply and easily, wherein the characters drawn on the board will properly match ink color information transmitted to the coordinate reading device.

In order to attain the above and other objects, the present invention provides a coordinate reading system, comprising: a coordinate input device, the coordinate input device including: a coil generating an alternating magnetic field; an angle-modulation portion that modulates the alternating magnetic field in an angle modulation to thereby successively change an angle state of the alternating magnetic field into a plurality of different states in a plurality of successive time durations, with a length of at least one time duration corresponding to desired information; and a coordinate reading device, the coordinate reading device including: a main body having a surface defining a coordinate of the coordinate input device; a plurality of wires provided to the main body, each wire generating an electric signal in response to the alternating magnetic field; a coordinate detection unit that calculates the coordinate of a position of the coordinate input device based on the amplitude of the generated electric signal; and an information detection unit that demodulates the generated electric signal to detect the length of the at least one time duration, thereby determining the desired information.

A length of a single modulation period, which is equal to the total length of all the plurality of time durations, may correspond to the desired information. A duty ratio, which is equal to a ratio of a length of one time duration relative to the total length of all the plurality of time durations, may correspond to the desired information.

The angle-modulation portion may include a frequency modulation portion that modulates the alternating magnetic field in a frequency deviation modulation to successively modulate the alternating magnetic field into a plurality of different frequencies in a corresponding plurality of time durations, with a length of at least one time duration for at least one frequency corresponding to the desired information.

The coordinate input device may further have a consecutive detection unit that consecutively detects a characteristic of the coordinate input device. In this case, the length of at least one time duration for at least one frequency may have a consecutively-changing value indicative of the consecutively-detected characteristic of the coordinate input device.

The frequency modulation portion in the coordinate input device may include: a signal production portion that produces a signal that repeatedly changes its amplitude in a modulation frequency, the amount of the modulation frequency indicating the desired information; and a modulation portion that subjects the alternating magnetic field to the frequency modulation by using the produced signal. The coordinate input device may further include: an ink cartridge that includes a tank storing ink, the desired information indicating color of the ink; and a case portion that detachably houses the ink cartridge. In this case, at least a part of the signal production portion may be mounted to the ink cartridge.

According to another aspect, the present invention provides a coordinate input device, comprising: a coil generating an alternating magnetic field; and an angle-modulation portion that modulates the alternating magnetic field in an angle modulation to thereby successively change an angle state of the alternating magnetic field into a plurality of different states in a plurality of successive time durations, with a length of at least one time duration corresponding to desired information.

According to a further aspect, the present invention provides a coordinate reading device reading a coordinate of a position of a coordinate input device, the coordinate reading device comprising: a main body having a surface defining a coordinate of the coordinate input device, a plurality of wires provided on the main body, each wire generating an electric signal in response to an alternating magnetic field from a coordinate input device, the alternating magnetic field being modulated in an angle modulation so that an angle state of the alternating magnetic field is successively modulated into a plurality of different states in a plurality of successive time durations, with a length of at least one time duration corresponding to desired information; a coordinate detection unit that calculates the coordinate of a position of the coordinate input device based on the amplitude of the generated electric signal; and an information detection unit that demodulates the generated electric signal to detect the length of the at least one time duration, thereby determining the desired information.

According to another aspect, the present invention provides an information communicating method, comprising the steps of: generating a carrier wave; modulating the carrier wave in an angle modulation to thereby successively change an angle state of the carrier wave into a plurality of different states in a plurality of successive time durations, with a length of at least one time duration corresponding to desired information, and transmitting the carrier wave; receiving the carrier wave by producing an electric signal whose angle state corresponds to that of the carrier wave; and demodulating the carrier wave to detect the length of the at least one time duration, thereby determining the desired information.

BRIEF DESCRIPTION OF THE DRAWINGS

The above and other objects, features and advantages of the invention will become more apparent from reading the following description of the preferred embodiments taken in connection with the accompanying drawings in which:

FIG. 5 is a block diagram showing configuration of a network for communicating written data between the electronic white board and other electronic white boards;

FIG. 10(a) is a graph representing a position coordinate table 58a;

FIG. 10(b) illustrates a structure of the position coordinate table 58a;

FIG. 10(c) illustrates how the detected voltage values from the coils are stored in a voltage value storage area 59a in the RAM 59;

FIG. 13(a) illustrates the relationship between the output signal from the CR oscillation circuit 69e, the carrier signal outputted from the LC oscillation circuit 69c and FSK-modulated by the FSK circuit 69d, the output signal from the limiter circuit 54, and the counter value k by the counter circuit 55a;

FIGS. 21(a) and 21(b) are timing diagrams showing a CR signal outputted from the CR oscillation circuit 69e and a carrier signal modulated by the CR signal, wherein FIG. 21(a) shows the carrier signal and the CR signal generated from a thick black pen 60 that is pressed against the writing surface 21a with a large pen pressure and a small pen pressure, and FIG. 21(b) shows the carrier signals and the CR signals generated from a thick red pen 60 that is pressed against the writing surface 21a with a large pen pressure and a small pen pressure;

FIG. 24 is a flowchart of a coordinate reading process of S300 in FIG. 16 according to the second embodiment;

FIG. 26(c) are timing charts showing the carrier signal and the CR signal when a thick red pen is used to write with a large pen pressure and a small pen pressure;

FIG. 29(c) is a circuit diagram showing electric configuration of the pen 160 according to the first modification;

DETAILED DESCRIPTION OF THE PREFERRED EMBODIMENTS

Figure 1A:
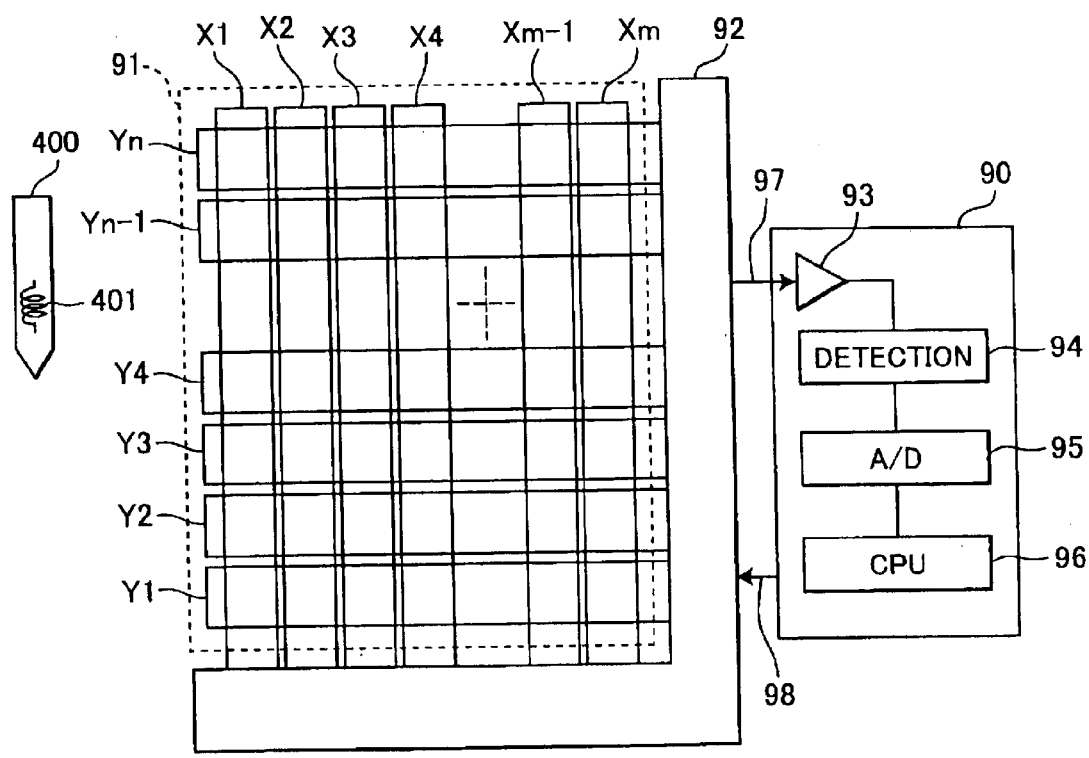
FIG. 1(a) is a configuration of a conceivable coordinate reading device.

A coordinate reading device according to preferred embodiments of the present invention will be described while referring to the accompanying drawings wherein like parts and components are designated by the same reference numerals to avoid duplicating description.

<First Embodiment>

A coordinate reading device according to a first embodiment will be described below with reference to FIGS. 2 to 18(b).

The coordinate reading device of the present embodiment is an electronic white board. A pen is used to draw images such as characters and/or figures on the electronic white board, whereupon the electronic white board electrically reads the drawn images and stores data of the read images therein.

Next, the configuration of the electronic white board 1 will be described while referring to FIGS. 2 and 3.

Figure 2:
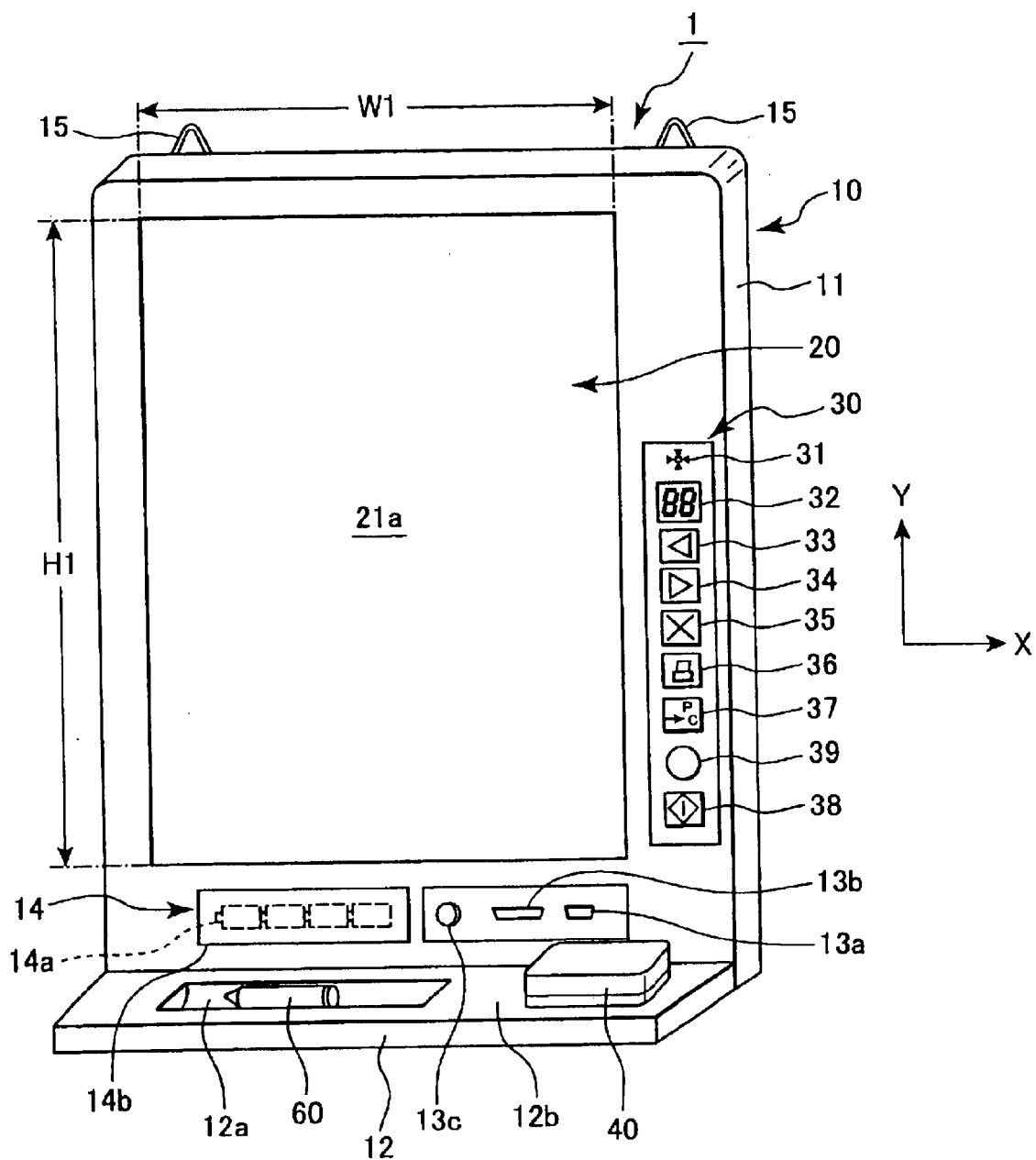
FIG. 2 is an external perspective view illustrating an essential configuration of an electronic white board according to a first embodiment of the present invention.
Figure 3:
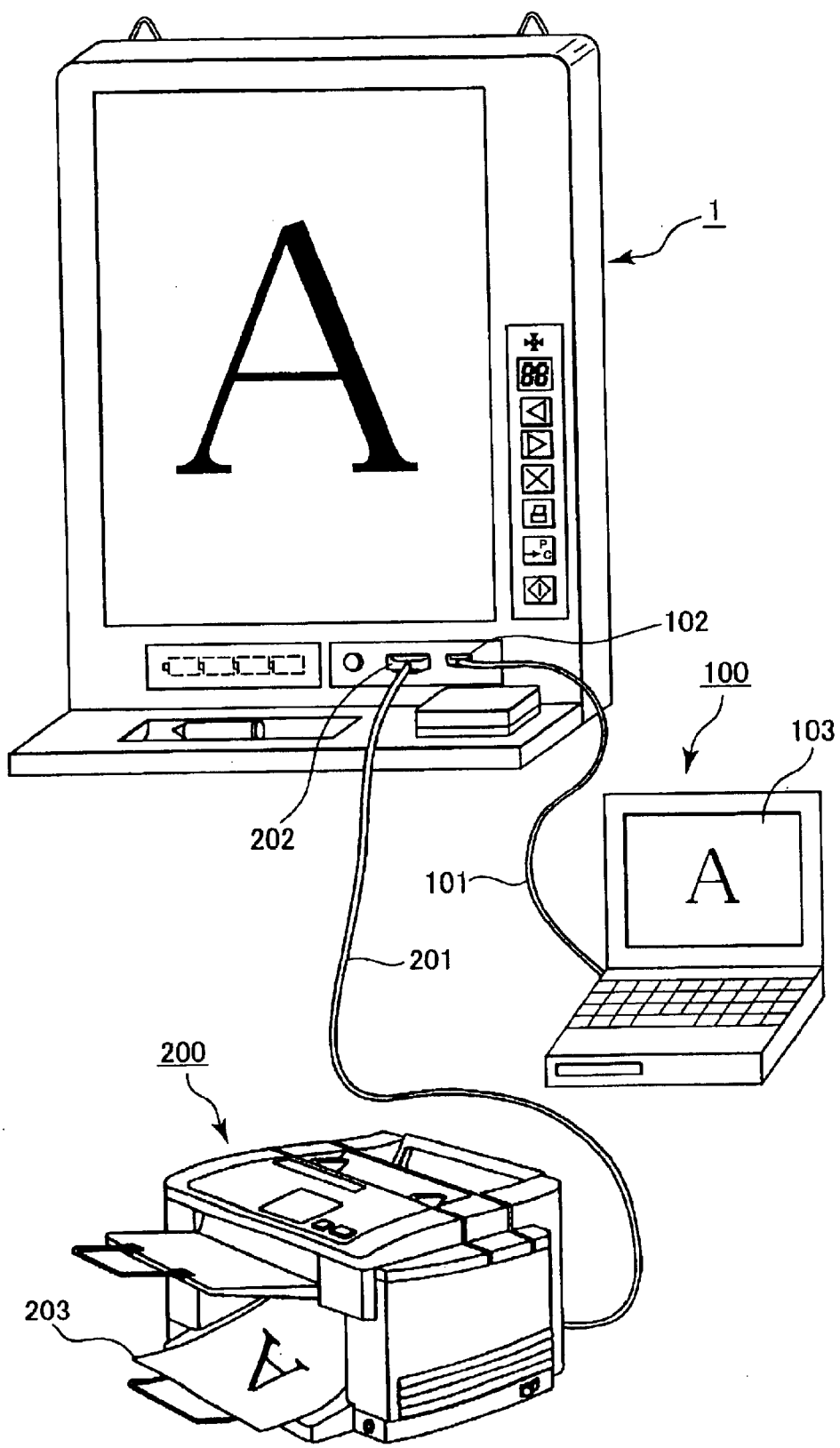
FIG. 3 is an illustration showing the electronic white board of FIG. 2 being electronically connected to a personal computer (PC) and a printer.

As shown in FIG. 2, the electronic white board 1 has a writing panel 10. A pen 60 and an eraser 40 are provided to the electronic white board 1. The pen 60 is for writing images, such as characters and/or figures, on the writing panel 10 and for allowing the electronic white board 1 to produce and store data indicative of the written images. The eraser 40 is for erasing the written images from the writing panel 10 and also for erasing the data indicative of the written images. The electronic white board 1 can be electrically connected to a personal computer (PC) 100 and a printer 200 as shown in FIG. 3.

Next, the configuration of the writing panel 10 will be described in greater detail below.

As shown in FIG. 2, the writing panel 10 includes a frame 11. A panel main body 20 is assembled within the frame 11. The panel main body 20 has a writing surface 21a, on which images, such as characters and/or figures, can be written by the pen 60. A plate-shaped stand 12 is attached to a lower end surface of the frame 11 and extends frontwardly from the frame 11. A concave 12a having a semicircular cross-section is formed in the upper surface of the stand 12 for supporting the pen 60. A flat portion 12b is formed to the right of the concave 12a. The eraser 40 is placed on the flat portion 12b.

An operation portion 30 is provided at the right side of the front surface of the frame 11. The operation portion 30 includes: a speaker 31, a page number display LED 32, a page reverse button 33, a page forward button 34, and erase button 35, a print output button 36, a PC output button 37, a power button 38, and a battery warning LED 39. The speaker 31 is for reproducing sounds such as operation sounds and warning sounds. The page number display LED 32 is constructed from a seven-segmented LED to display the number of pages of images, which are written on the writing surface 21a and whose data (which will be referred to as "written data" hereinafter) is stored in the electronic white board 1. The page reverse button 33 is used by a user to return one page at a time each time it is pressed. The page forward button 34 is used also by the user to feed one page at a time each time it is pressed. The erase button 35 is used to erase one page's worth of written data at a time each time it is pressed. The printer output button 36 is pressed to output the written data to the printer 200. The PC output button 37 is pressed to output the written data to the PC 100. The power button 38 is pressed by the user to start and stop operation of the electronic white board 1. The battery warning LED 39b is for warning when a battery 70 in the pen 60 (to be described later) runs out.

A battery case 14 is provided at the lower portion on the front surface of the frame 11. The battery case 14 is for storing four C batteries 14a, for example, which serve as a power source of the electronic white board 1. A lid 14b is openably and closably attached to the front surface of the battery case 14. A volume adjustment knob 13c is provided to the right of the battery case 14. The volume adjustment knob 13c is for adjusting volume of the sounds outputted from the speaker 31. A pair of connectors 13a and 13b are provided to the right of the volume adjustment knob 13c. As shown in FIG. 3, a plug 202 of a connection cable 20a from the printer 200 is connected to the connector 13b. A plug 102 of another connection cable 101 from the PC 100 is connected to the connector 13a. Thus, the written data indicative of the content written on the writing surface 21a can be outputted to the PC 100. Accordingly, the user can view the content written on the electronic white board 1 using a monitor 103 provided on the PC 100. The written data can also be outputted to the printer 200 so that the content written on the electronic white board 1 can be printed on a print sheet 203.

Next, the configuration of the panel main body 20, which is housed within the frame 11, will be described in greater detail. The panel main body 20 is housed within the frame 11. The panel main body 20 may be produced into any flexible or non-flexible sheet or plate shape.

Figure 4:
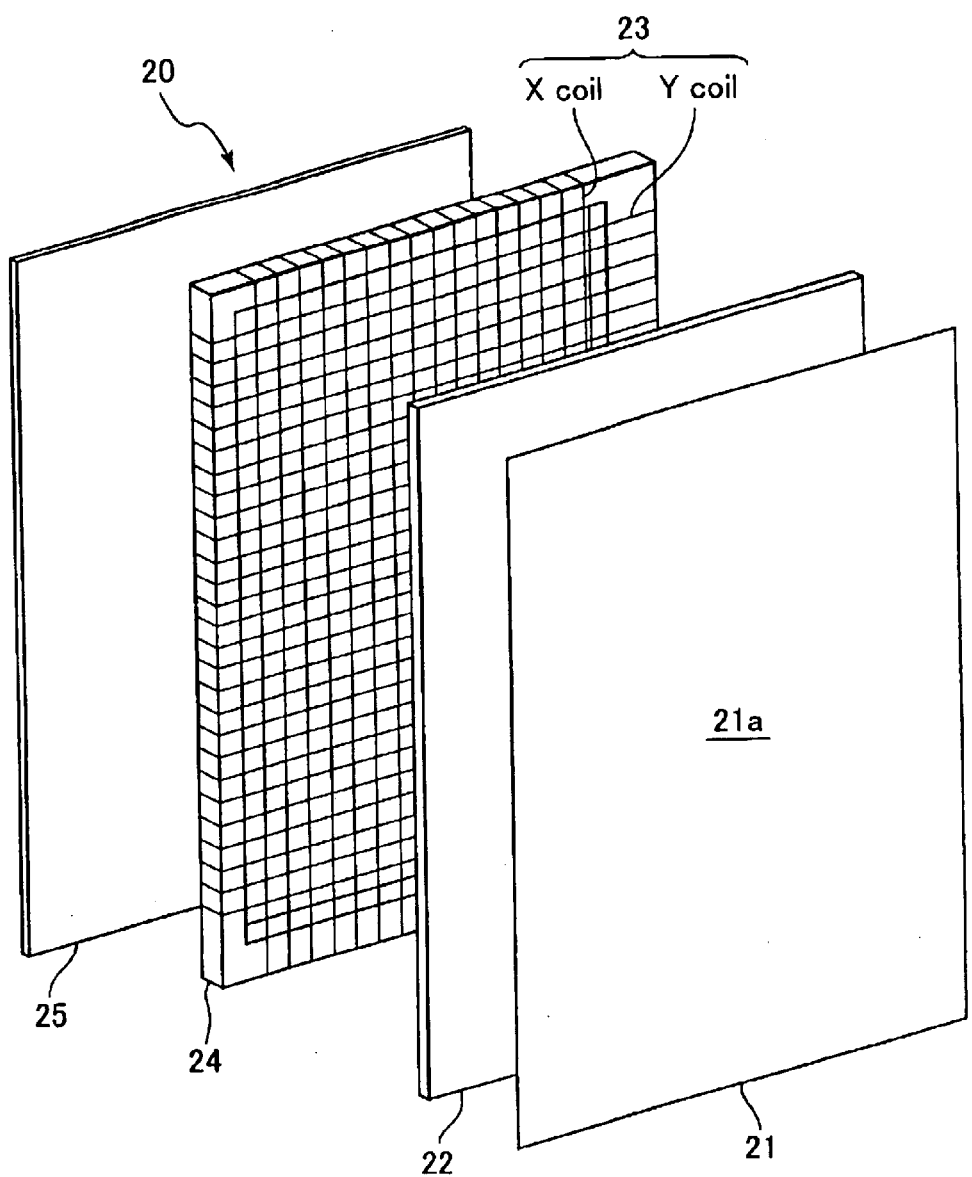
FIG. 4 is an exploded perspective view showing the components of a panel main body provided within the electronic white board.

FIG. 4 is an exploded perspective view showing the components of the panel main body 20. The panel main body 20 includes: a writing sheet 21, a plate-shaped panel 22, a frame-shaped attachment panel 24, and a plate-shaped back panel 25, all of which are mounted one on another in this order. The writing sheet 21 has the writing surface 21a on its one surface. The frame-shape attachment panel 22 is provided with a plurality of sense coils (loop wires or loop coils) 23 as will be described later. The plate-shaped back panel 25 is for blocking noises.

According to the present embodiment, the writing sheet 21 is made from several sheets of polyethylene terephthalate (PET) film which are attached together into a thickness of 0.1 mm. The panel 22 is formed to a thickness of 3.0 mm from acryl resin, acrylonitrile-butadiene-styrene copolymer (ABS), or polycarbonate (PC). The attachment panel 24 is formed to a thickness of 40 mm, for example, from a foam resin material such as cellular styrene. The back panel 25 is formed to a thickness of about 1 mm from electrically-conductive material such as aluminum. The overall thickness of the frame 11 that sandwiches all the components of the panel main body 20 is formed to a thickness of 50 mm.

As shown in FIG. 2, hooks 15, 15 are attached, at both sides, to the upper end of the back surface of the frame 11. Those hooks 15, 15 are used to hand the electronic white board 1 on the wall. According to the present embodiment, the writing surface 21a has a height H1 of 900 mm and a width W1 of 600 mm, for example. The frame 11 and the stand 12 are formed to light weight by synthetic resin such as polypropylene (PP). The total weight of the electronic white board 1 is less than 10 kg.

The electronic white board 1 can transmit the written data, indicative of the images written on the writing surface, 21a, to other electronic white boards 1 and other personal computers.

FIG. 5 is a black diagram showing configuration of a network for communicating written data between one electronic white board 1 and other electronic white boards and/or personal computers. In this example, it is assumed that a plurality of electronic white boards 1 are provided in a plurality of different rooms within the same company 2 and are provided also in other companies 5 and that written data is communicated between the plurality of rooms and also between different companies.

The company 2 includes several rooms 3 and one room 4. Each of the rooms 3, 4 includes the electronic white board 1 and the personal computer 100 in electrical connection with each other as shown in FIG. 3. In each room 3, the personal computer 100 is connected to a corresponding LAN board 103. The personal computer 100 in the room 4 is connected to a modem 108. The LAN board 103 provided to each room 3 is connected to a hub 105 by a corresponding LAN cable 104. The hub 105 is connected to a server 106. The server 106 can be connected to other companies 5 through the Internet 300. The modem 108 in the room 4 can be connected to other companies 5 through a telephone line 109 and a public communication exchange network 301. Although not shown in the drawings, the other companies 5 have the electronic white boards 1 that perform communication with personal computers 100 in the same manner as the company 2.

In the network having the above-described arrangement, written data stored in the electronic white board 1 in one room 3 is transmitted from the electronic white board 1 to the personal computer 100 via the connection cable 101, and then to the personal computer 100 in another designated room 3 through the LAN board 103 and the hub 105. A user who receives the written data can view the content of the received data by displaying the received data on the monitor 103 of the personal computer 100 or by printing out the received data onto a sheet using the printer 200 that is connected to the personal computer 100.

The written data can be transmitted also to other companies 5 from the server 106 across the Internet 300 as an image file, in Tag Image File Format (TIFF), appended to an e-mail message. In this case, the other companies 5 can view the content of the written data by decoding the image file, appended to the e-mail message, transmitted from the company 2.

Figure 6A:
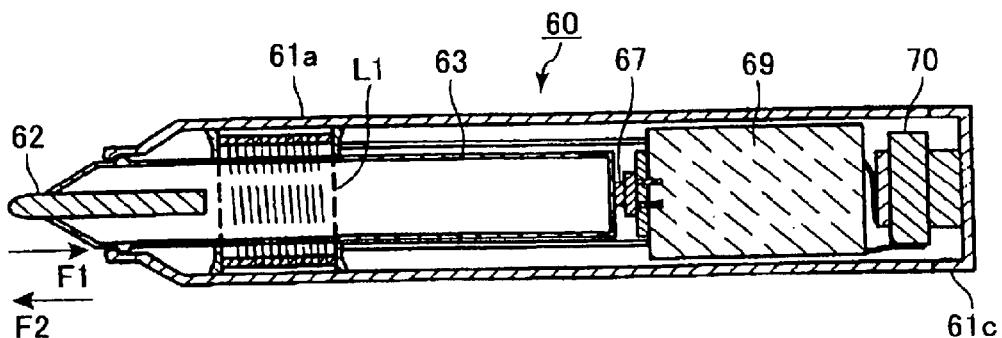
FIG. 6(a) is a cross-sectional view showing internal configuration of the pen 60.
Figure 6B:
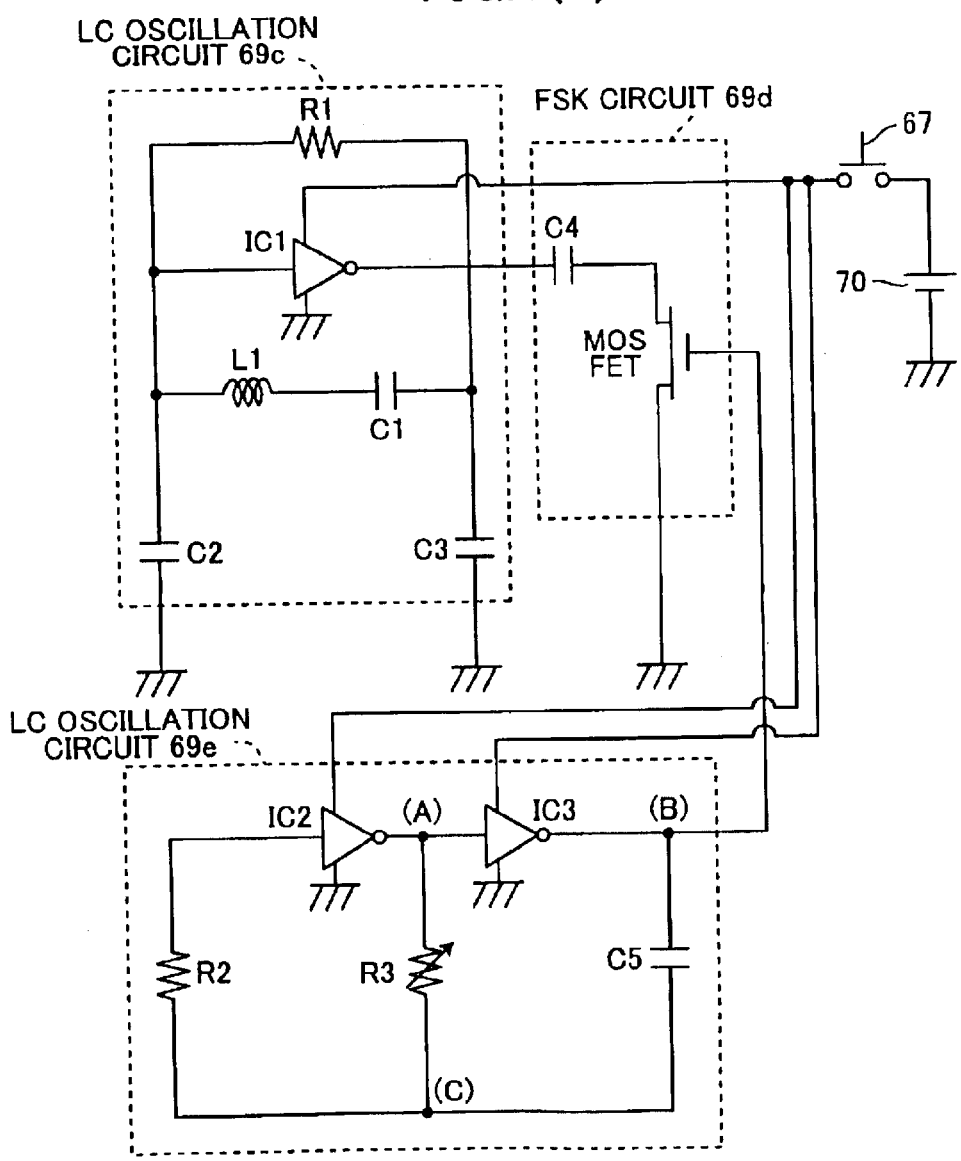
FIG. 6(b) is a circuit diagram showing electric configuration of the pen 60.

Next, essential configuration of the pen 60 will be explained while referring to FIGS. 6(a) and 6(b). FIG. 6(a) is a cross-sectional view showing internal configuration of the pen 60. FIG. 6(b) is a circuit diagram showing electric configuration of the pen 60.

As shown in FIG. 6(a), the pen 60 includes a cylindrical body (casing) 61a and a lid 61c which is detachably attached to one end of the body 61a. The body 61a houses a coil L1, an ink cartridge (marker portion) 63, a pen tip 62, a circuit board 69, and a battery 70. The ink cartridge 63 stores ink and is removable from the body 61a in a direction indicated by an arrow F2. The pen tip 62 is inserted into the ink cartridge 63. The circuit board 69 serves as an oscillation circuit for oscillating the coil L1 to generate an alternating magnetic field. The battery 70 serves as a power source for supplying electric power to the circuit board 69. In this example, the battery 70 is LR44 with a voltage of about 1.5V.

The coil L1 has a ring shape and is formed from a plurality of turns of windings. The coil L1 is mounted inside the pen 60 so that the coil L1 will be separated by some distance from the tip of the pen tip 62 when the tip of the pen tip 62 abuts against the writing surface 21a of the writing panel 10.

A push button switch 67 is provided between the ink cartridge 63 and the circuit board 69. The push button switch 67 is for supplying electric power from the battery 70 to the circuit board 69, and also for terminating supply of the electric power to the circuit board 69. When the pen tip 62 is pressed against the writing surface 21a, the ink cartridge 63 moves in a direction indicated by an arrow F1, as a result of which the push button switch 67 turns ON. When the pen tip 62 is separated away from the writing surface 21a, the ink cartridge 63 moves in the direction indicated by the arrow F2 by a spring (not shown) provided within the push button switch 67. As a result, the push button switch 67 turns OFF. Thus, an alternating magnetic field is generated from the coil L1 only when the pen 60 is pressed against the writing surface 21a to draw images such as characters and/or figures on the writing surface 21a.

As shown in FIG. 6(b), the circuit board 69 in the pen 60 includes: an LC oscillation circuit 69c, a CR oscillation circuit 69e, and a frequency shift keying (FSK) circuit 69d. The LC oscillation circuit 69c is for oscillating the alternating magnetic field as a carrier wave. The LC oscillation circuit 69c is constructed from: three condensers C1, C2, C3, a resistor R1, the coil L1, and an integrated circuit IC1, and is for causing the coil L1 to generate an alternating magnetic field (carrier wave). The carrier wave has a fixed oscillation frequency, whose amount is determined by capacitances of the condensers C1, C2, C3, the resistance of the resistor R1, and inductance of the coil L1. In this example, the integrated circuit IC1 is a TOSHIBA TC7SLU04F (trade name) produced by Toshiba Corporation. The resistor R1 has a resistance of 1 MΩ. The capacitor C1 has capacitance of 0.1 μF. Both of the capacitors C2 and C3 have capacitance of 0.0033 μF. The carrier wave (alternating magnetic field) has a frequency of 410 kHz.

The CR oscillation circuit 69e is for oscillating a signal, whose frequency is set with one of a plurality of different modulation frequencies fm in correspondence with a plurality of different attributes of the pen 60, as to color of ink stored in the ink cartridge 63 and thickness of the pen tip 62. That is, the CR oscillation circuit 69e, which is mounted in each pen 60, is set with one modulation frequency fm that corresponds to one attribute of the subject pen 60, as to color of ink stored in the corresponding ink cartridge 63 and thickness of the corresponding pen tip 62.

The CR oscillation circuit 69e is constructed from: a variable resistor R3, a resistor R2, a capacitor C5, and a pair of integrated circuits IC2 and IC3. The resistor R2 is an input protection resistor and has a resistance, whose amount is ten times greater than the resistance of the resistor R3 or more. In this example, both of the integrated circuits IC2 and IC3 are TOSHIBA TC7SLU04F (trade name) produced by Toshiba Corporation. It is noted that the integrated circuits IC2 and IC3 can be constructed from any other integrated circuits of a type "U04". The resistor R2 has resistance of 1 MΩ. The variable resistor R3 has a resistance range of 0 to 1 MΩ. The capacitor C5 has a capacitance of 100 pF.

With the above-described structure, as shown in FIG. 6(b), when the output (A) of the IC2 is low and the output (B) of the IC3 is high, the capacitor C5 is charged so that the electric potential at the point (B) becomes positive and that the electric potential at the point (C) becomes negative. When the electric potential at the point (C) becomes equal to or smaller than the threshold voltage $V_{TH}$ (½ Vcc) of the IC2, the circuit is reversed so that the point (A) becomes high and the point (B) becomes low.

Figures 6C, 6D:
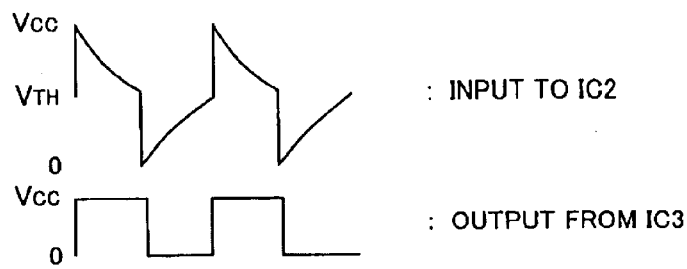
FIG. 6(c) shows waveforms of signals at the respective points in the CR oscillation circuit 69e in the circuit shown in FIG. 6(b)
FIG. 6(d) shows the relationship between pen attributes and modulation frequencies fm.

When the point (A) is high and the point (B) is low, the capacitor C5 is charged so that the electric potential at the point (B) becomes negative and that the electric potential at the point (C) becomes positive. When the electric potential at the point (C) becomes equal to or greater than the threshold voltage $V_{TH}$ (½ Vcc) of the IC2, the circuit is reversed again. Accordingly, the input to the IC2 and the output from the IC3 is as shown in FIG. 6(c).

It is noted that the modulation frequency fm is determined by resistance of the variable resistor R3 and capacitance of the capacitor C5. More specifically, the period T and the modulation frequency fm of the signal generated by the CR oscillation circuit 69e is determined as follows:

$$T=1/fm=2(0.69 \times R3 \times C5).$$

Thus, by selectively changing the values of the resistance of the variable resistor R3 and the capacitance of the capacitor C5, the Cr oscillation circuit 69e can oscillate a plurality of different modulation frequencies fm in correspondence with a plurality of different pen attributes.

According to the present embodiment, the relationship between several different pen attributes (ink color and pen tip thickness) and modulation frequencies fm is set as shown in FIG. 6(d). In FIG. 6(d), "fine" refers to the pen tip 62 with a fine or thin tip, "thick" refers to the pen tip 62 with a thick tip. For example, "black thick" refers to an attribute of a pen that employs a thick pen tip 62 and that stores black colored ink in its ink cartridge 63. Because pens 60 with different characters (attributes) are designed to oscillate with different modulation frequencies fm, when the pen 60 with some attribute is used to write characters on the electronic white board 1 and to generate the alternating magnetic field, the electronic white board 1 will recognize the character of the pen 60. For example, the frequency of the CR oscillation circuit 69e is set with a single modulation frequency fm of 4.1 kHz for black thick pen, that is, when ink stored in the ink cartridge 63 is black.

The signal thus oscillated by the CR oscillation circuit 69e is carried by the carrier wave (alternating magnetic field) oscillated by the LC oscillation circuit 69c. In other words, the FSK oscillation circuit 69d modulates the oscillation frequency of the LC oscillation circuit 69c by using the modulation frequency fm of the signal from the CR oscillation circuit 69e.

The FSK oscillation circuit 69d is constructed from: a condenser C4 and a MOS FET gate. The frequency deviation, by which the oscillation frequency of the carrier wave deviates by the FSK circuit 69d, is determined by capacitance of the condenser C4 in the FSK oscillation circuit 69d. In this example, the capacitor C4 has capacitance of 0.0015 μF. The FSK circuit 69d can deviate, by the deviation amount of ±20 kHz, the frequency of the carrier wave from its central frequency of 410 kHz.

With the above-described structure, when the push button switch 67 is turned ON, electric power from the battery 70 is supplied to the entire circuitry. Output from the integrated circuit IC3 in the CR oscillation circuit 69e switches the MOS FET gate in the FSK oscillation circuit 69d. The LC oscillation circuit 69c is controlled by the signal generated from the CR oscillation circuit 69e to oscillate a frequency-modulated carrier wave. Thus, the coil L1 generates an alternating magnetic field (carrier wave) whose frequency is modulated by the FSK circuit 69d.

Figure 6E:
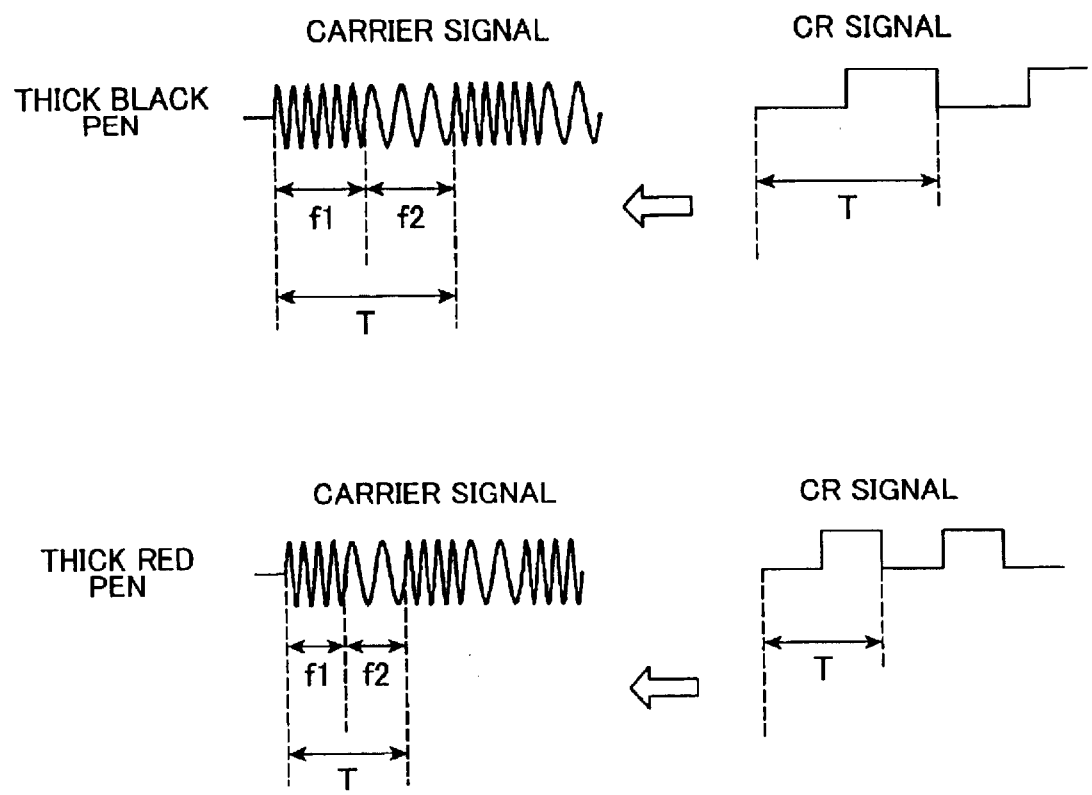
FIG. 6(e) are timing diagrams showing a CR signal outputted from the CR oscillation circuit 69e and a carrier signal modulated by the CR signal, for a black thick pen and a red thick pen.

For example, as shown in FIG. 6(e), for the black thick pen, the CR oscillation circuit 69e oscillates the CR signal with the modulation frequency fm of 4.1 kHz. Accordingly, the CR signal repeatedly changes its level between high and low levels with a period T of 1/4,100=244 (μs). As a result, the carrier wave (alternating magnetic field) is FSK modulated to be repeatedly changed into the high frequency state f1 and the low frequency state f2 with the modulation frequency fm of 4.1 kHz, that is, a period T of 1/4,100=244 (μs).

Contrarily, for the red thick pen, the CR oscillation circuit 69e oscillates the CR signal with the modulation frequency fm of 7.7 kHz. Accordingly, the CR signal repeatedly changes its level between high and low levels with a period T of 1/7,7000=130 (μs). As a result, the carrier wave (alternating magnetic field) is FSK modulated to be repeatedly changed into the high frequency state f1 and the low frequency state f2 with the modulation frequency fm of 7.7 kHz, that is, a period T of 1/7,700=130 (μs).

The eraser 40 shown in FIG. 2 also houses a coil, an oscillating circuit for oscillating the coil, and a battery that supplies electric power to the oscillating circuit. The coil generates an alternating magnetic field when being oscillated by the oscillating circuit. It is noted that as shown in FIG. 6(e), the eraser 40 is allocated with another modulation frequency fm, which is different from the modulation frequencies fm allocated to the pens 60, in order to allow the electronic white board 1 can recognize the eraser 40 when the eraser 40 is used to erase the images drawn on the electronic white board 1.

Figure 7A:
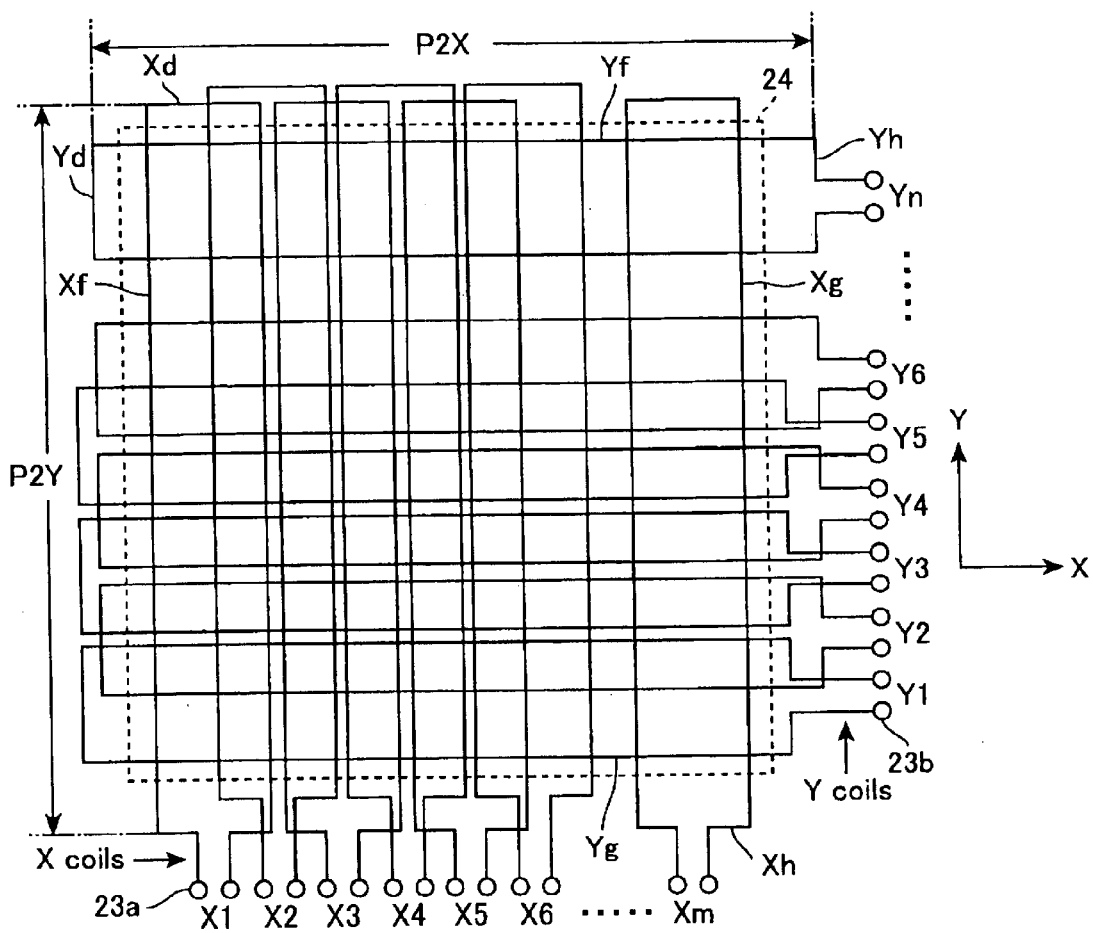
FIG. 7(a) illustrates how a plurality of sense coils 23 are arranged on the attachment panel 24, while omitting a part of the sense coils.
Figure 7B:
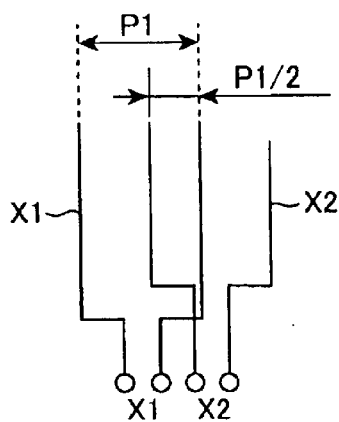
FIG. 7(b) illustrates a width of the sense coils 23 and a pitch, by which the sense coils 23 are arranged while being partly overlapped with one another.

As shown in FIGS. 4 and 7(a) and 7(b), the attachment panel 24 in the writing panel 10 is provided with the plurality of sense coils (loop coils or loop wires) 23. The sense coils 23 are for producing signals by magnetic coupling with the alternating magnetic field generated from the coil L1 in the pen 60 or generated from the coil in the eraser

40. The electronic white board 1 uses the signals thus produced by the sense coils 23 to determine the position of the pen 60 or the eraser 40. Thus, the electronic white board 1 can read the coordinates of successive points of images drawn by the pen 60 and can read the coordinates of points to be erased by the eraser 40. For example, each sense coil 23 is formed from a copper wire that has a diameter of 0.35 mm and that is covered with an insulation film, of enamel layer or nichrome plating layer, for example, on its outer surface.

The sense coils 23 include a plurality of X sense coils 23 and a plurality of Y sense coils 23 which are arranged on the attachment panel 24 as shown in FIG. 7(*a*). The plurality of X sense coils 23 are arranged in a direction of a predetermined X axis. As shown in FIG. 2, the X axis extends horizontally when the writing panel 10 is being used. In this example, as shown in FIG. 7(*a*), X coils X1 to Xm are disposed following the direction of the X axis. The total number of the X coils is "m" wherein "m" is an integer greater than one (1). In this example, m=22. The X coils X1 to Xm are for detecting the X coordinate in the coordinates (X, Y) of the pen 60 or the eraser 40 on the writing surface 21*a*.

The plurality of Y sense coils 23 are arranged in a direction of a predetermined Y axis that is perpendicular to the X axis. As shown in FIG. 2, the Y axis extends vertically when the writing panel 10 is being used. As shown in FIG. 7(*a*), in this example, Y coils Y1 to Yn are arranged along the Y axis. The total number of the Y coils is "n" where "n" is an integer greater than one (1). In this example, n=33. The Y coils Y1 to Yn are for detecting the Y coordinate in the coordinates (X, Y) of the pen 60 or the eraser 40.

Each of the X and Y coils 23 is formed in a loop-shaped coil (loop wire) with a single turn and has approximately a rectangular shape as shown in FIG. 7(*a*). Thus, each coil 23 has: a pair of short sides that are located opposite to each other, and a pair of long sides that extend between the pair of short sides. More specifically, each of the X coils X1–Xm has: a pair of short sides Xd and Xh that are located opposite to each other, and a pair of long sides Xf and Xg that extend between the pair of short sides Xd and Xh. Each of the Y coils Y1–Yn has: a pair of short sides Yd and Yh that are located opposite to each other, and a pair of long sides Yf and Yg that extend between the pair of short sides Yd and Yh. The short side Xh of each X coil X1–Xm is connected to a pair of coil terminal 23*a*, and the short side Yh of each Y coil Y1–Yh is connected to a pair of coil terminal 23*b*.

Each of the X coils 23 has a length of P2Y in the lengthwise direction of the rectangular shape. In other words, the long sides Xf and Xg of each X coil 23 has the length of P2Y. Each of the Y coils 23 has a length of P2X in the lengthwise direction of the rectangular shape. In other words, the long sides Yf and Yg of each Y coil 23 has the length of P2X.

As shown in FIG. 7(*b*), each of the X and Y coils 23 has a width of the same amount P1. Thus, each X coil 23 has a length P2Y along its long sides Xf and Xg, and has a width P1 along its short sides Xd and Xh. Each Y coil 23 has a length P2X along its long sides Yf and Yg, and has a width P1 along its short sides Yd and Yh. Adjacent X coils 23 are arranged along the X axis to overlap with one another by a half of the width P1, that is, P1/2. Similarly, adjacent Y coils 23 are arranged along the Y axis to overlap with one another also by a half of the width P1, that is, P1/2. In this example, P2X=680 mm, P2Y=980 mm, and P1=50 mm.

It is noted that in FIG. 7(*a*), for clarity and simplicity, the sides of the coils 23 are shifted from one another. However, actually, they are arranged to overlap with one another. For example, the long sides X1*g*, X2*g*, . . . , and Xm-2*g* of the X coils X1, X2, . . . , Xm-2 overlap with long sides X3*f*, X4*f*, . . . , Xmf of X coils X3, X4, . . . , Xm, respectively. Similarly, the long sides Y1*g*, Y2*g*, . . . , and Yn-2*g* of the Y coils Y1, Y2, . . . , Yn-2 overlap with long sides Y3*f*, Y4*f*, . . . , Ynf of Y coils Y3, Y4, . . . , Yn, respectively. Additionally, the short sides Yd of all the Y coils 23 overlap with the long side Xf of the X coil X1, and the short sides Yh of all the Y coils 23 overlap with the long side Xg of the X coil Xm. The short sides Xd of all the X coils 23 overlap with the long side Yf of the Y coil Y1, and the short sides Xh of all the X coils 23 overlap with the long side Yg of the Y coil Yn. Also, the pair of terminals 23*a* for each X coil 23 are configured to have the minimum interspacing therebetween. Similarly, the pair of terminals 23*b* for each Y coil 23 are configured to have the minimum interspacing therebetween.

Figure 8:
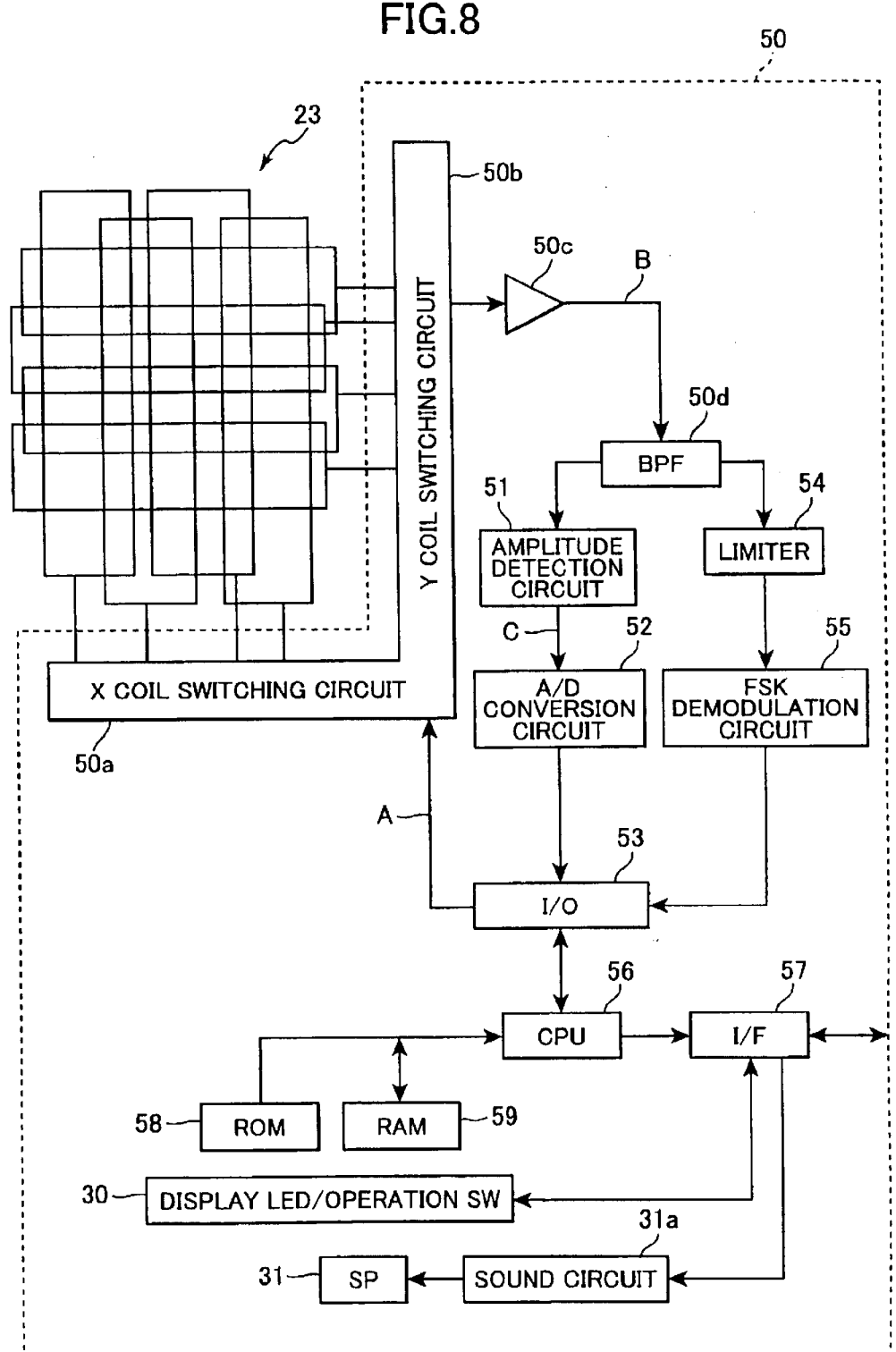
FIG. 8 is a block diagram showing an electrical configuration of the electronic white board.

As shown in FIG. 8, the pair of coil terminals 23*a* for each X coil 23 is connected to an X coil switching circuit 50*a*, which is provided in a control portion 50 of the electronic white board 1. Similarly, the pair of coil terminals 23*b* for each Y coil 23 is connected to a Y coil switching circuit 50*b*, which is also provided in the control portion 50 of the electronic white board 1.

Next, electrical configuration of the control portion 50 of the electronic white board 1 will be described while referring to the block diagram of FIG. 8.

The electronic white board 1 includes the control device 50 that is internally provided in the writing panel 10. The control device 50 includes: the X coil switching circuit 50*a* for switching the X coils X1 to Xm in this order to successively scan the X coils X1 to Xm; and a Y coil switching circuit 50*b* for switching the Y coils Y1 to Yn in this order to successively scan the Y coils Y1 to Yn. Although not shown in the drawing, each circuit 50*a*, 50*b* includes a switching element such as a transistor (MOS FET, for example).

The control portion 50 further includes: an amplifier 50*c*, a bandpass filter (BPF) 50*d*, an amplitude detection circuit 51, an analog-to-digital (A/D) conversion circuit 52, a limitter circuit 54, a FSK demodulation circuit 55, an input/output (I/O) circuit 53, a CPU 56, a ROM 58, a RAM 59, an interface (I/F) device 57, a sound circuit 31*a*.

Figure 9:
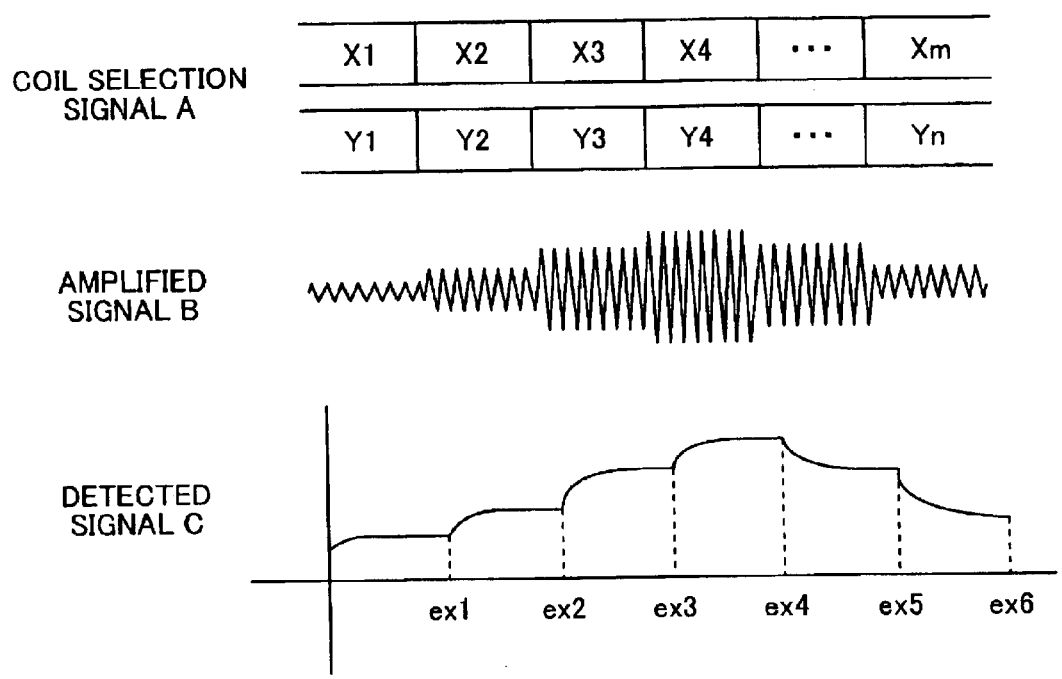
FIG. 9 illustrates signals A, B, and C in the block diagram of FIG. 8.

When the pen 60 is placed on the writing surface 21*a*, the X and Y sense coils 23 are magnetically coupled with the alternating magnetic field from the pen 60, and produces electric signals. The I/O circuit 53 is controlled by the CPU 56 to output coil selecting signals A, as shown in FIG. 9, to control the X and Y coil switching circuits 50*a* and 50*b* to successively scan the X coils X1–Xm and the Y coils Y1–Yn. As a result, the electric signals induced on the X coils X1–Xm and the Y coils Y1–Yn are scanned, and are inputted through the sense coil terminals 23*a* and 23*b* to the X and Y coil switching circuits 50*a* and 50*b*.

The amplifier 50*c* is for receiving the signals thus scanned by the X and Y coil switching circuits 50*a* and 50*b*, and for amplifying the received signals to produce amplified signals B shown in FIG. 9.

The bandpass filter (BPF) 50*d* is for filtering out portions of unnecessary bandwidths from the amplified signal B. The portion of the amplified signal B, only in a required bandwidth, passes through the bandpass filter (BPF) 50*d*. The resultant signals have the same waveform as that of the carrier signals (alternating magnetic field), which has been frequency-shift-keying modulated according to the modulation frequency fm and which has been transmitted from the pen 60.

The amplified signals, having passed through the BPF 50*d*, are received by the amplitude detection circuit 51. The amplitude detection circuit 51 is for detecting amplitudes (voltage values) of the thus amplified signals B, and produces detection amplitude signals C also shown in FIG. 9.

The A/D conversion circuit 52 is for converting those analog signals C, which are outputted from the amplitude detection circuit 51 and which are indicative of the amplitudes of the amplified signals, into digital signals that correspond to the amplitudes of the amplified signals. The CPU 56 receives the thus obtained digital signals through the I/O circuit 53.

The limitter circuit 54 and the FSK demodulation circuit 55 are for cooperating to detect the modulation frequency fm of the bandpass-filtered amplified signals, that is, the modulation frequency fm of the alternating magnetic-field from the pen 60, thereby detecting the attribute of the pen 60 now located on the writing surface 21*a*. That is, the amplified signal B having passed through the BPF 50*d* is received also by the limitter circuit 54. The limiter circuit 54 is for converting the filtered, amplified signal (frequency-shift-keying modulated carrier wave) B into square waveform pulses. The FSK demodulation circuit 55 is for demodulating the square waveform pulses and for obtaining output values (demodulated count number) indicative of the demodulated result. The CPU 56 receives the output values (demodulated count number) through the I/O circuit 53, and determines the attribute of the pen now being located on the writing surface 21*a*.

Figure 16:
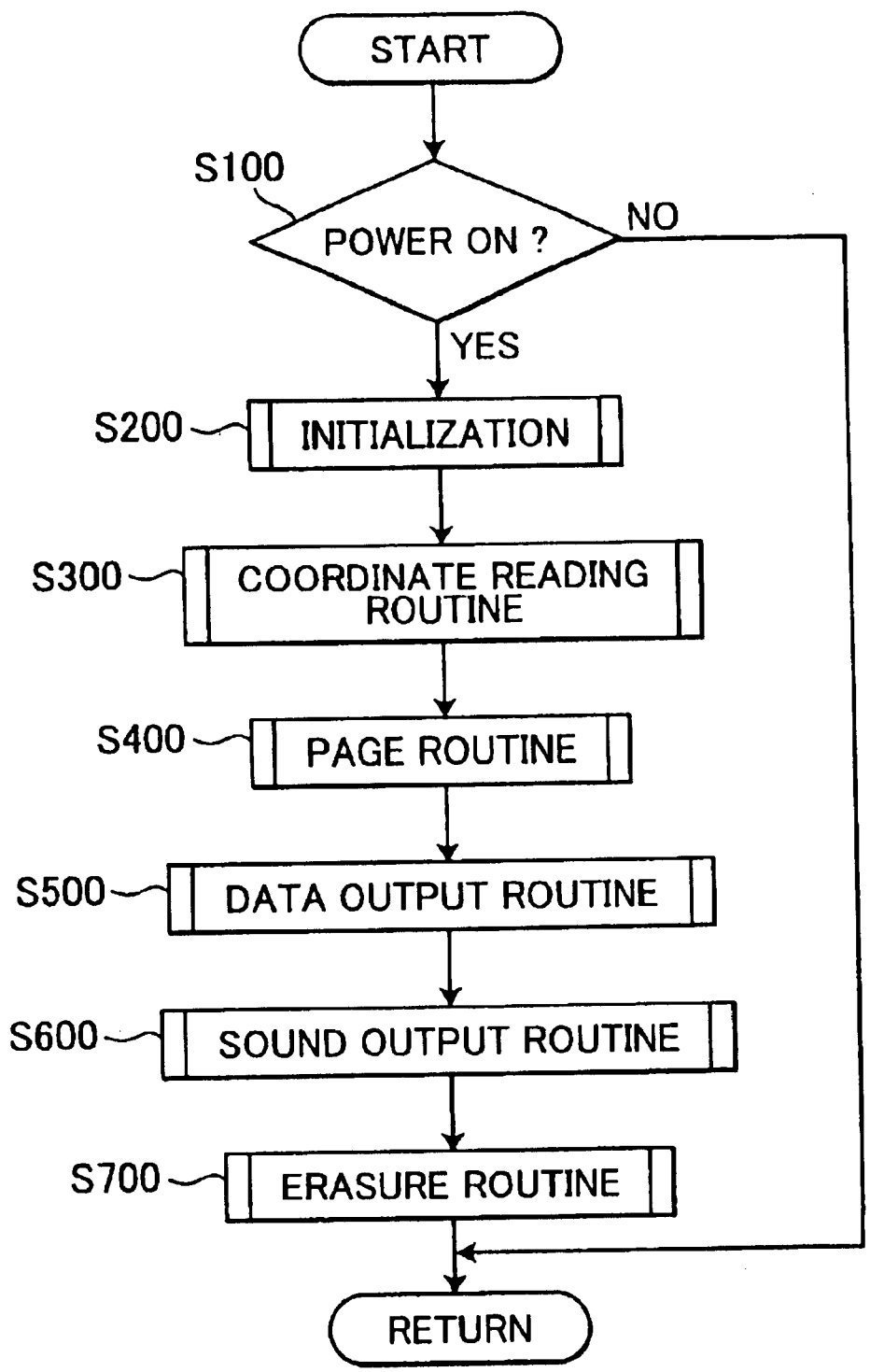
FIG. 16 is a flowchart of a main routine executed by the CPU in the control portion of FIG. 8.
Figure 17:
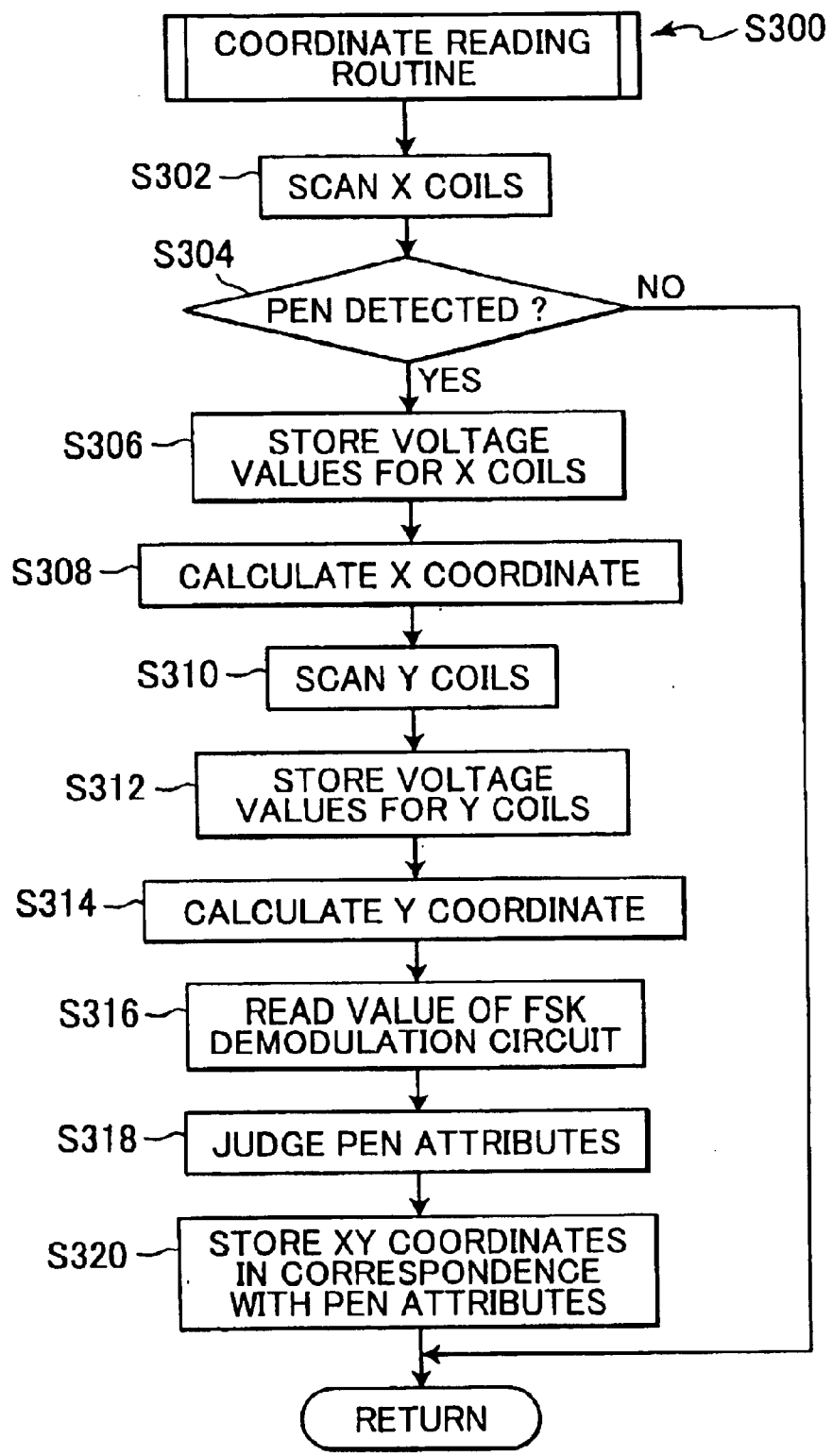
FIG. 17 is a flowchart of a coordinate reading process of S300 in FIG. 16.

The ROM 58 stores therein a variety of control programs to be executed by the CPU 56, such as the programs of the routines of FIGS. 16 and 17. The ROM 58 stores therein a position coordinate table 58*a* (FIG. 10(*b*)) as will be described later. The ROM 58 further stores therein an attribute table shown in FIG. 6(*d*) that stores the relationship between the plurality of pen attributes and the demodulation count numbers to be obtained by the FSK demodulation circuit 55.

The I/F device 57 is connected to the CPU 56 and to the control panel 30 (FIG. 2). When one of the page reverse button 33, the page forward button 34, and the erasure button 35 is pressed, then the CPU 56 will execute appropriate page process, such as, reversing, forwarding, or erasing the stored written data in page units. The sound circuit 31*a* is controlled by the CPU 56 to generate operational sounds, such as beeps, through the speaker (SP) 31 when one of the buttons on the operation panel 30 is pressed.

Next, the position coordinate table 58*a* will be described while referring to FIGS. 10(*a*) and 10(*b*).

The position coordinate table 58*a*, shown in FIG. 10(*b*), is used for detecting the coordinates indicative of the position of the pen 60 on the writing surface 21*a*. FIG. 10(*a*) is a graph representing the position coordinate table 58*a*.

The position coordinate table 58*a* is prepared in a manner described below.

As shown in FIG. 11(*a*), the X coils X1, X2, X3 have center lines c1, c2, and c3, respectively. Each center line c1, c2, c3 extends along the Y direction. If the pen 60 is positioned at some place near the X coils X1–X3 on the writing surface 21*a*, the X coils X1, X2, X3 generate voltages ex1, ex2, ex3, respectively, as shown in FIG. 11(*b*). FIG. 11(*b*) shows how the voltages induced at the loop coils X1–X3 change when the position of the pen 60 moves along the X direction. As apparent from FIG. 11(*b*), each of the voltages ex1 to ex3 becomes maximum when the pen 60 comes close to the corresponding center line c1 to c3, and gradually decreases as the pen 60 goes away from the corresponding center line toward the long sides Xf and Xg of the corresponding loop coil X1, X2, X3.

The voltage line ex1–ex3 for each X coil X1–X3 has a pair of null points where the voltage ex1–ex3 has a voltage of about zero (0) value. In other words, each X coil generates a voltage of zero value when the pen 60 is located on one of the null points along the X axis. According to the present embodiment, the X coils X1–Xm are arranged to overlap with adjacent X coils by a half of the width P1 so that each null point for each X coil will be located at a position that is separated from the corresponding center line by a distance greater than the half of the width P1. Accordingly, the null point for each X coil is separated away from the corresponding center line by a distance that is greater than the distance of the corresponding center line to the center lines of adjacent X coils. In this example shown in FIG. 11(*b*), the null points for the X coil X2 are separated away from the center line C2 by a distance that is greater than the distance from the center line C2 to the center lines C1 and C3 of the adjacent X coils X1 and X3.

It should be noted that in the drawings of FIGS. 11(*a*)–11(*c*), the width of the sense coils 23 is indicated slightly smaller than the actual size in order to facilitate understanding of the overlap between the sense coil 23.

FIG. 11(*c*) shows how the voltage difference between two adjacent loop coils 23 among the X loop coils X1 to X3 changes when the position of the pen 60 moves along the X axis. As shown in FIG. 11(*c*), the voltage difference is largest when the pen 60 is located at the center c1 to c3 of each sense coil, and becomes zero when the pen 60 is located at the position in the intermediate position defined between the center of each sense coil and a long side (Xg or Xf) of the corresponding sense coil. That is, the voltage difference is zero at the middle position in the area where two adjacent sense coils overlap with one another.

For example, FIG. 11(*c*) indicates, using a solid line, how the voltage difference value (ex1=ex2) between the voltages at the X coils X1 and X2 changes when the pen 60 goes away from the center C1 of the X coil X1 toward the intermediate point Q1 (FIG. 11(*a*)), which is the middle point in the area where the X coil X1 overlaps with the X coil X2. In this case, the distance ΔX of the pen 60 from the center C1 of the X coil X1 changes from a zero value toward a half of the intercoil pitch (P1/2), that is, P1/4. It is therefore apparent that the distance ΔX of the pen 60 from the center C1 can be known based on the voltage difference (ex1–ex2) between the voltages at the adjacent X coils X1 and X2.

For example, when the pen 60 is located at a position Q2 of FIG. 11(*a*), by detecting the voltage difference (ex1–ex2), the distance ΔX1 of the pen 60 from the center C1 can be determined, and the X coordinate of the point Q2 can be determined accordingly.

Figures 10A, 10B, 10C:
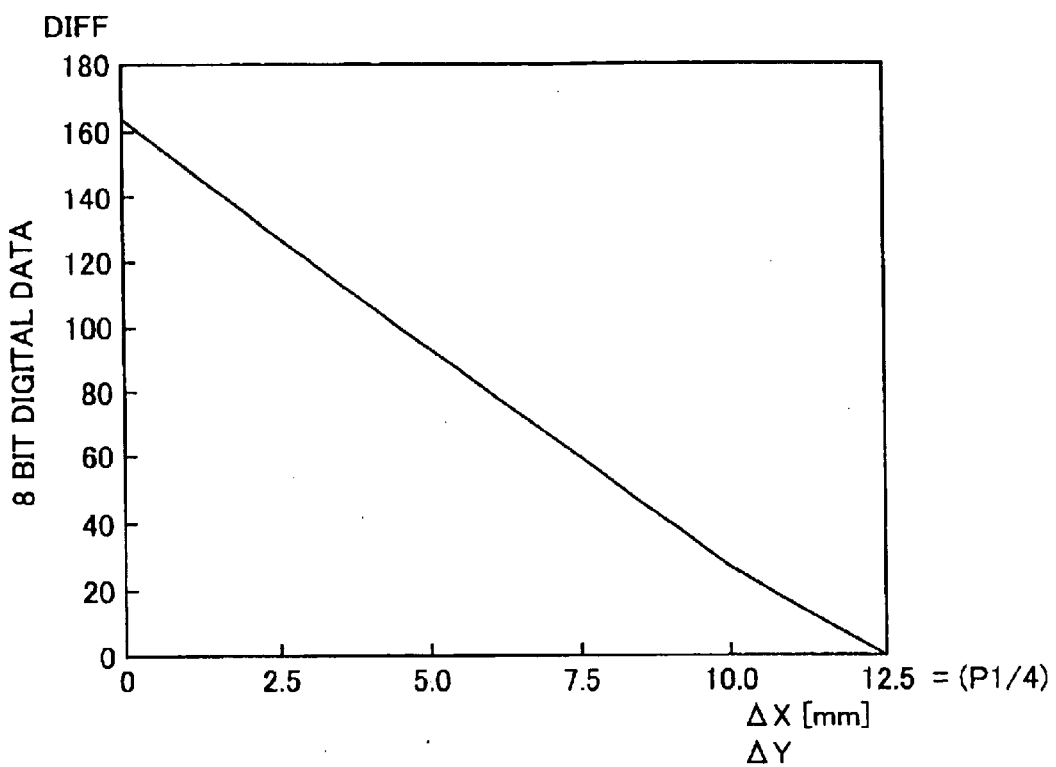

When the voltage difference (ex1–ex2) is expressed in digital data DIFF of eight bits, the relationship between the digital data DIFF and the distance ΔX [mm] from the center C1 can be indicated as shown in FIG. 10(*a*). More specifically, the graph of FIG. 10(*a*) is obtained when the pen 60 is located at some place in the area between the center line C1 and the middle line Q1. The voltages induced at the X coils X1 and X2 are scanned by the x-coil scanning circuit 50*a*, amplified by the amplifier 50*c*, filtered by the BPF 50*d*, detected by the amplitude detection circuit 51, and converted by the A/D converter 52 into eight-bit digital data. The digital data DIFF is obtained by calculating the difference between the eight-bit digital data for the voltages at the X coils X1 and X2. The relationship between the position ΔX [mm] of the pen 60 from the center line C1 and the digital difference data DIFF is shown in FIG. 10(a). The position coordinate table 58a of FIG. 10(b) is obtained simply by converting the graph of FIG. 10(a) into a table form.

Figure 11A:
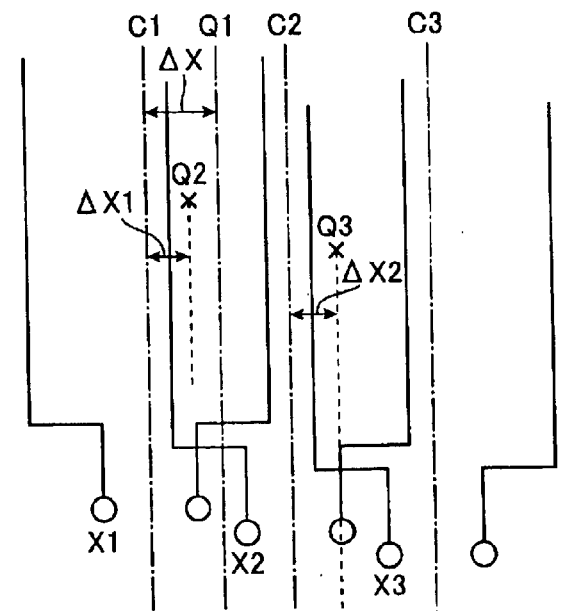
FIG. 11(a) illustrates a part of X coils X1–X3.
Figure 11B:
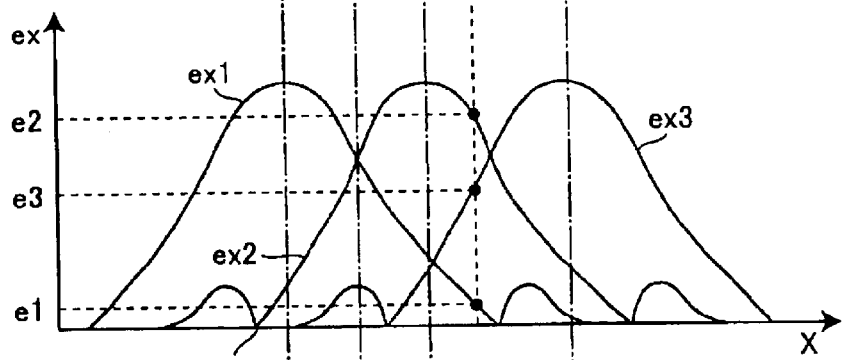
FIG. 11(b) shows how the voltages induced at the X coils X1–X3 change when the position of the pen 60 moves along the X direction.
Figure 11C:
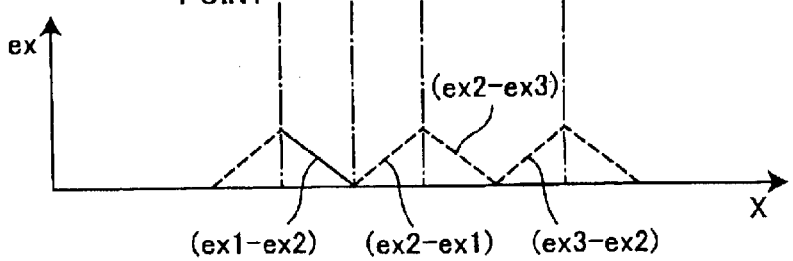
FIG. 11(c) shows how the voltage difference between two adjacent loop coils among the X loop coils X1 to X3 changes when the position of the pen 60 moves along the X axis.

As indicated by a solid line in FIG. 11(c), in the area from the center line C1 to the middle line Q1, the characteristic in FIG. 10(a) shows the relationship between the voltage difference (ex1−ex2) and the pen location ΔX [mm] from the center line C1 in the positive direction along the X axis. However, as indicated by broken lines in FIG. 11(c), in another area from the middle line Q1 to the center line C2, the same characteristic in FIG. 10(a) shows the relationship between the voltage difference (ex2−ex1) and the pen location ΔX [mm] that is now defined from the center line C2 in the negative direction along the X axis.

Thus, in the area from the center line Ci of each X coil Xi (where $1 \leq i \leq m-1$) to the middle line Qi, between the center line Ci and the center line Ci+1 of its next X coil Xi+1, the characteristic of FIG. 10(a) represents the relationship between the voltage difference (exi−exi+1) and the pen location ΔX [mm] that is defined from the center line Ci of the X coil Xi in the positive direction along the X axis. Contrarily, in the area from the middle line Qi to the center line Ci+1, the same characteristic of FIG. 10(a) represents the relationship between the voltage difference (exi+1−exi) and the pen location ΔX [mm] defined from the center line Ci+1 in the negative direction along the X axis.

Additionally, the same characteristic in FIGS. 11(a)–11(c) is obtained for the relationship between the voltages induced at the Y sense coils Y1–Yn and the position of the pen 60 in the Y axial direction. Accordingly, in the area from the center line Ci of each Y coil Yi (where $1 \leq i \leq n-1$) to the middle line Qi between the center line Ci of the subject Y coil Yi and the center line Ci+1 of the next Y coils Yi+1, the characteristic in FIG. 10(a) represents the relationship between the voltage difference (eyi−eyi+1) for the coils Yi and Yi+1 and the pen location ΔY [mm], that is defined from the center line Ci of the Y coil Yi in the positive direction along the Y axis. Contrarily, in the area from the middle line Qi to the center line Ci+1 of the Y coil Yi+1, the characteristic in FIG. 10(a) represents the relationship between the voltage difference (eyi+1−eyi) and the pen location ΔY [mm], which is defined from the center line Ci+1 in the negative direction along the Y axis.

As will be described later, when the pen 60 is located at some place on the writing surface 21a, the voltages induced at the X coils X1–Xm are scanned by the x-coil scanning circuit 50a, amplified by the amplifier 50c, filtered by the BPF 50d, detected by the amplitude detection circuit 51, and converted by the A/D converter 52 into eight-bit digital data. The thus obtained eight-bit digital data are stored in the RAM 59 at its voltage value storage area 59a as shown in FIG. 10(c). When the voltage at some X coil Xi is the largest among all the X coils X1–Xm and when the voltage at its adjacent coil Xi+1 is greater than the voltage at its other adjacent coil Xi−1, it can be known that the pen 60 is within the area between the center line Ci of that coil Xi and the middle line Qi between the center lines Ci and Ci+1. Accordingly, the X coordinate of the pen can be obtained by adding, to the X coordinate of the center line Ci, the distance ΔX [mm] that is indicated in the table of FIG. 10(b) in correspondence with one value DIFF that is most near to a difference value calculated between the digital data for the coils Xi and Xi+1.

Similarly, when the voltage at some X coil Xi is the largest among all the X coils X1–Xm and when the voltage at the adjacent coil Xi−1 is greater than that at the adjacent coil Xi+1, it can be known that the pen 60 is within the area between the center line Ci of that coil Xi and the middle line Qi−1 between the center lines Ci and Ci−1. Accordingly, the X coordinate of the pen can be obtained by subtracting, from the X coordinate of the center line Ci, the distance ΔX [mm] that is indicated in the table of FIG. 10(b) in correspondence with one value DIFF that is most near to a difference value calculated between the digital data for the coils Xi and Xi−1. Thus, the x coordinate of the pen 60 on the writing surface 21a can be determined.

In a similar manner, the y coordinate of the pen 60 on the writing surface 21a can be determined. That is, the voltages induced at the Y coils Y1–Yn are scanned by the y-coil scanning circuit 50b, filtered by the BPF 50d, amplified by the amplifier 50c, detected by the amplitude detection circuit 51, and converted by the A/D converter 52 into eight-bit digital data. The thus obtained eight-bit digital data are stored in the RAM 59 at its voltage value storage area 59a in the same manner as shown in FIG. 10(c). Then, in the same manner as described above for the x-coordinate, the y-coordinate of the pen 60 can be determined using the difference between the voltages of two adjacent Y coils that induce the largest and the second largest voltages and referring to the table 58a.

As described already, the position coordinate table 58a is stored in the ROM 58, and will be referred to as table data for determining coordinates of the position of the pen 60 using the detected induction voltages.

As described already, in the control portion 50 (FIG. 8), the portion of the amplified signal B, only in a required bandwidth, passes through the bandpass filter (BPF) 50d. Accordingly, the resultant signals have the same waveform as that of the carrier signals (alternating magnetic field) transmitted from the pen 60. It is noted that the carrier signals are frequency-shift-keying modulated according to the modulation frequency fm of the CR signal, and therefore have the waveform as shown in FIG. 13(a).

The amplified signals, having passed through the BPF 50d, are then received by both of the amplitude detection circuit 51 and the limitter circuit 54. Accordingly, the limiter circuit 54 converts the filtered, amplified signal (frequency-shift-keying modulated carrier wave) B into a square waveform (limitter output signal) shown in FIG. 13(a). The FSK demodulation circuit 55 demodulates the square wave of FIG. 13(a) and detects the period TA of the modulation frequency fm, at which the carrier wave is modulated.

Figure 12:
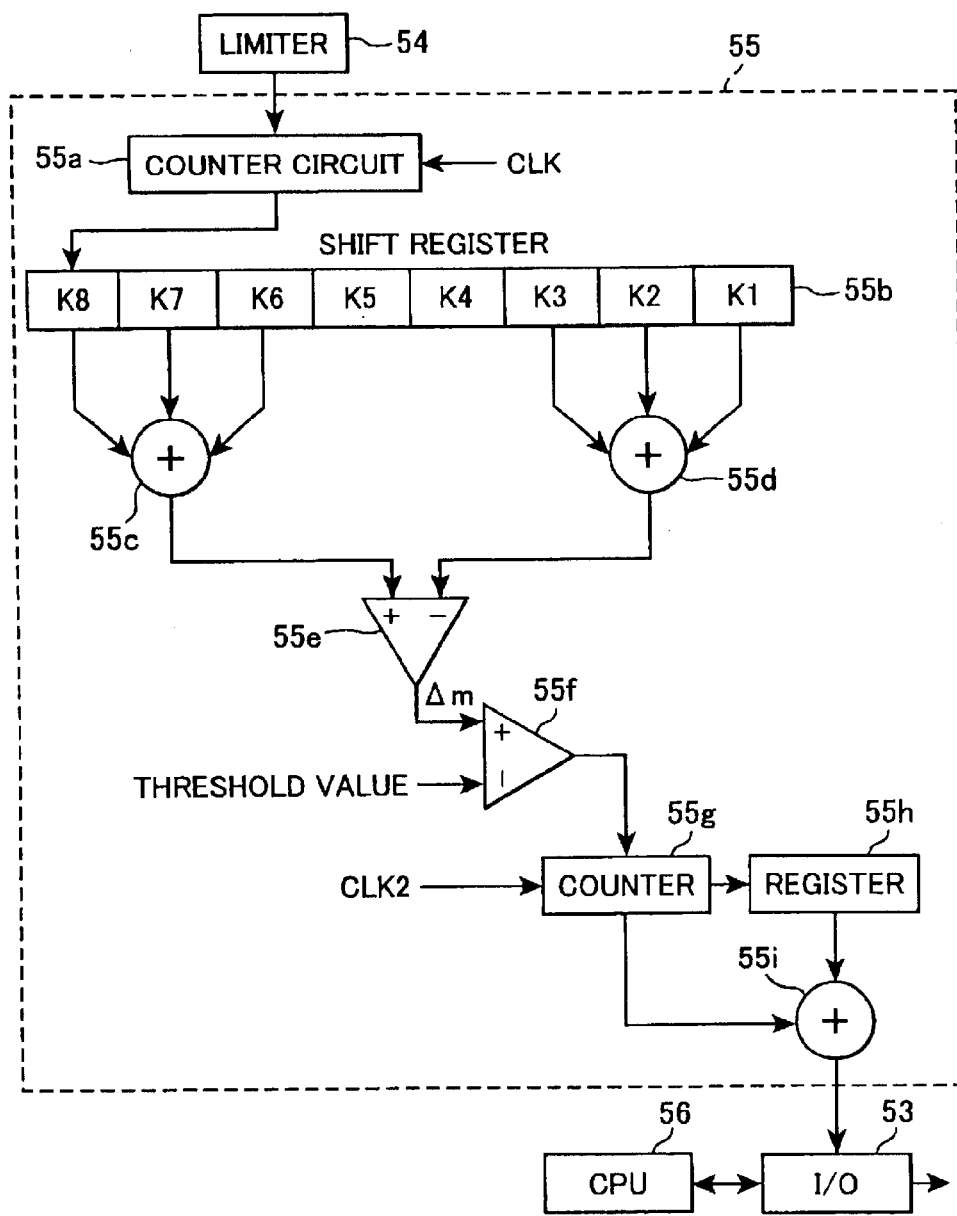
FIG. 12 is a block diagram showing an electrical configuration of a FSK demodulation circuit in the electronic white board of FIG. 8.

As shown in FIG. 12, the FSK demodulation circuit 55 includes: a counter circuit 55a, a shift register 55b, a first average calculating circuit 55c, a second average calculating circuit 55d, a subtraction circuit 55e, an absolute-value comparator 55f, a counter 55g, a register 55h, and an adding circuit 55i.

Figure 13A:
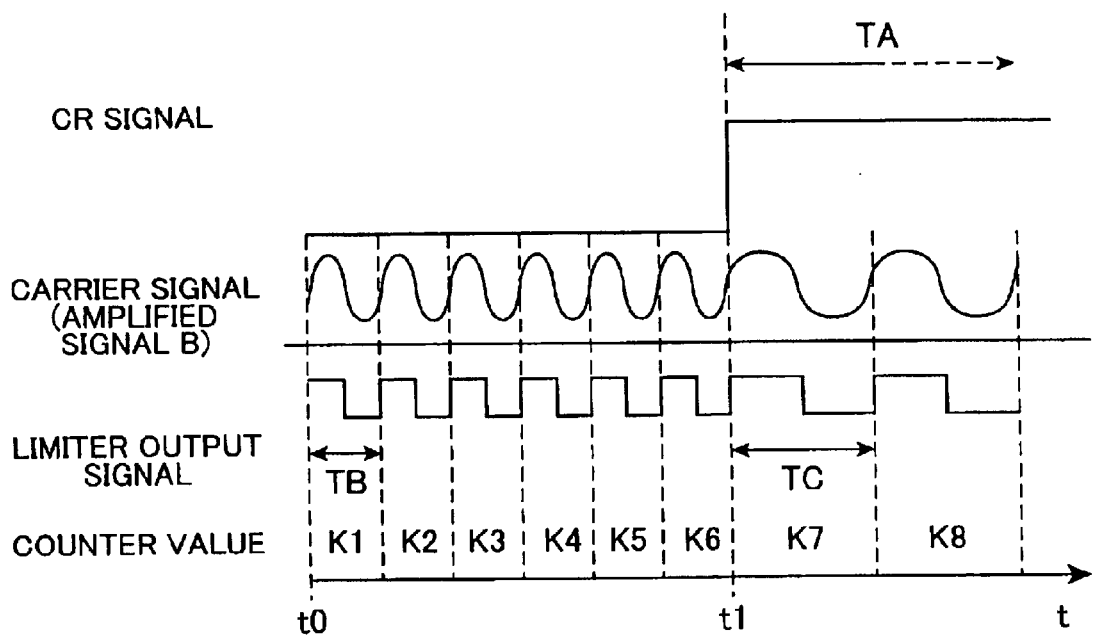

The counter circuit 55a is for counting the counter value K indicative of the duration of each period of the limitter output signal of FIG. 13(a). The shift register 55b, the first average calculating circuit 55c, the second average calculating circuit 55d, the subtraction circuit 55e, and the absolute-value comparator 55f are for cooperating to detect timing when the detected amount of the counter value K changes. The counter 55g, the register 55h, and the adder circuit 55i are for cooperating to measure the period from when the detected amount of the counter value K first changes, when the detected amount of the counter value K again changes, and until when the detected amount of the counter value K further changes, by calculating a sum (demodulated counter number) of count numbers of counting the system clock signals. The adding circuit 55i is connected to the CPU 56 via the I/O circuit 53. As described above, the ROM 58 stores the table shown in FIG. 6(*d*) that is indicative of a relationship between the several pen attributes and corresponding demodulated count numbers, each demodulated count number being indicative of the duration of a single period for the corresponding modulation frequency fm. Accordingly, the CPU 56 can refer to the table of FIG. 6(*d*) to judge the pen attribute of the pen 60 based on the demodulated count number outputted from the adding circuit 55*i*.

It is noted that in this example, as shown in FIG. 13(*a*), the FSK circuit 69*d* in the pen 60 (FIG. 6(*b*)) is designed to modulate the carrier signals (alternating magnetic field from the LC oscillation circuit 69*c*) to a high frequency of, for example, 430 kHz while the CR signal (from the CR oscillation circuit 69*e*) is in a low level, and to a lower frequency of, for example, 390 kHz when the CR signal is in a high level. The amplified signals B having passed through the BPF 50*d* (FIG. 8) have the save waveform with the carrier signals (alternating magnetic field) modulated by the FSK circuit 69*d* and outputted from the pen 60. Accordingly, the limiter circuit 54 outputs the limiter output signal shown in FIG. 13(*a*) that has a period TB during a low level period of the CR signal (from the CR oscillation circuit 69*e*) and a period TC during the high level period of the CR signal (from the CR oscillation circuit 69*e*). The period TC is longer than the period TB.

It is also noted that the carrier signal is modulated with its central frequency being 410 kHz and its frequency deviation being ±20 kHz. However, in order to facilitate explanation, the carrier signal is shown in FIG. 13(*a*) with exaggerated frequency shift. Also, it is assumed in this example that a thick black pen 60 is used for drawing on the writing surface 21*a*.

The FSK demodulation circuit 55 will be described below in greater detail.

Figure 15:
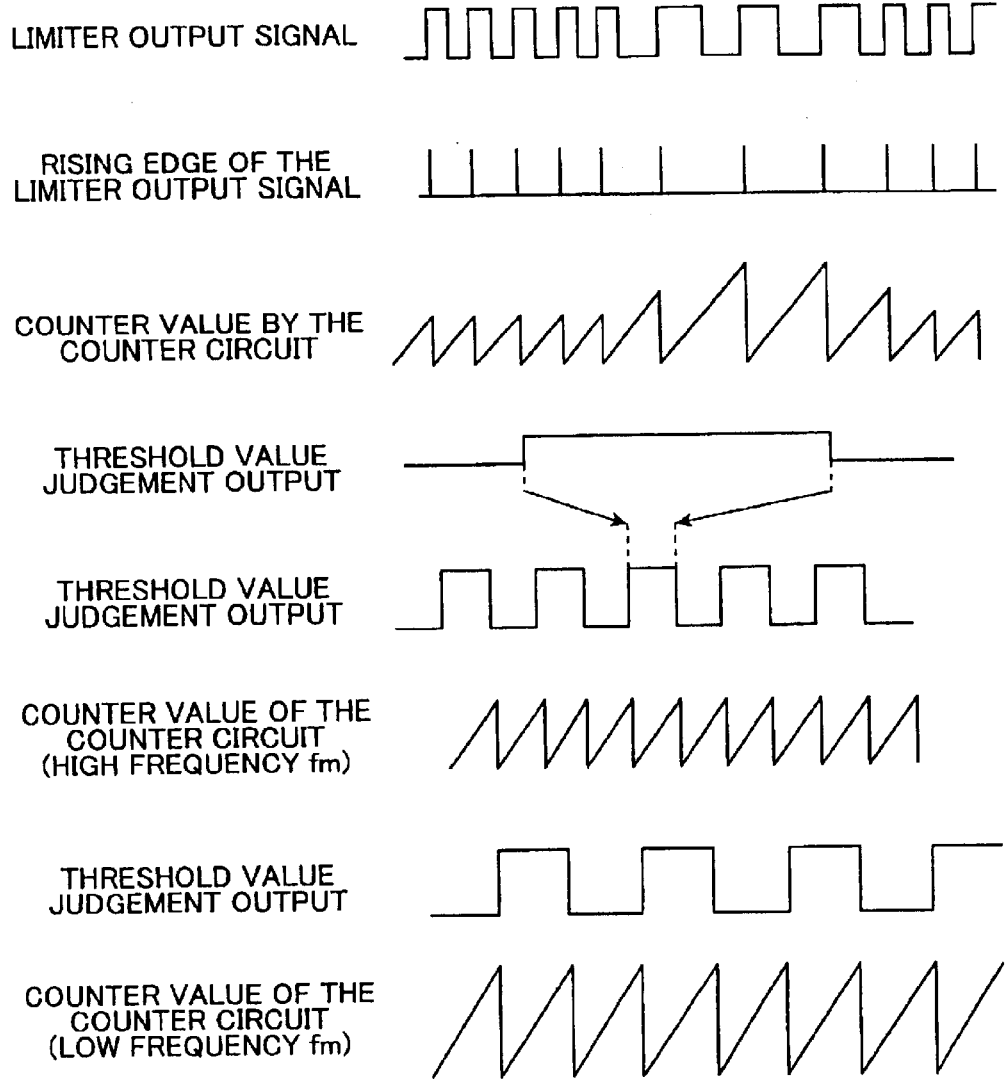
FIG. 15 illustrates several signals that appear in the respective portions in the FSK demodulation circuit 55.

The counter circuit 55*a* is for measuring each period TB or TC of the limiter output signal. That is, the counter circuit 55*a* counts, using a system clock (CLK) provided by the CPU 56, the number K of the system clock signals (counter value) indicative of each period TB or TC of the limiter output signals. More specifically, as shown in FIG. 15, when a rising edge of the limiter output signal is detected, the counter circuit 55*a* starts measuring the period until the next rising edge of the limiter output signal is detected. The counter circuit 55*a* then outputs the counter value K to the shift register 55*b*, and resets the counter value K to start the next counting. Thus, the counter circuit 55*a* measures the length TB or TC of one period of the limiter output signals.

The counter value K thus measured by the counter circuit 55*a* is either one of the values corresponding to the lengths TB and TC. The counter values K increases from a value corresponding to the length TB to the other value corresponding to the length TC when the CR signal changes from its low level to its high level. The counter value K decreases from the value corresponding to the length TC to the value corresponding to the length TB when the CR signal changes from the high level to the low level.

Accordingly, by detecting the timing at which the counter value K changes, the timing of the rising edge and the lowering edge of the CR signal can be detected. The time duration from when the counter value K changes to when it changes again is equivalent to a half of a single period of the CR signal. Therefore, by measuring the time from when the counter value K changes first time until when the counter value K changes third time, the duration of a single period of the CR signal can be determined. Accordingly, the modulation frequency fm can be determined, and the attribute of the pen 60 can be determined in accordance with the relationship between the modulation frequencies fm and the pen attributes (FIG. 6(*d*)).

According to the present embodiment, the shift register 55*b* is configured, as shown in FIG. 13(*b*), to store counter values K counted by the counter circuit 55*a* for eight successive periods Ki−7 to Ki of the limiter output signal. Each time a new counter value K (i+1) is inputted from the counter circuit 55*a* to the shift register 55*b*, all of the counter values K in the shift register 55*b* shift by one position and the counter value K (i−7) counted in the oldest period among the eight successive periods is discarded.

The first average calculating circuit 55*c* is for calculating an average of the latest counter value Ki, the second latest counter value Ki−1, and the third latest counter value Ki−2, and outputs the calculated average to the subtraction circuit 55*e* as a first mean value. The second average calculating circuit 55*d* is for calculating an average of the older counter value Ki−7, the second oldest counter value Ki−6, and the third oldest counter value Ki−5, and outputs the calculated average to the subtraction circuit 55*e* as a second mean.

The subtraction circuit 55*e* is for calculating a difference Δm between the first mean and the second mean, and outputs the difference Δm to the absolute-value comparator 55*f*. In the example shown in FIG. 13(*b*), at a first timing, the first average calculating circuit 55*c* calculates the mean value of the counter values K6 to K8. The second average calculating circuit 55*d* calculates the mean value of the counter values K1 to K3. In this case, each of the counter values K7 and K8, indicative of the length of the period TC, is longer than each of the counter values K1–K3 and K6, indicative of the length of the period TB. Therefore, the first mean value will be larger than the second mean value. Accordingly, when it is detected that the difference between the second mean value and the first mean value is thus large, then it is known that the level of the CR signal changes between the low level and the high level. By thus detecting the timing when the CR signal changes, the period of the CR signal, that is, the period of the modulation frequency fm can be detected.

It is noted that each of the average circuits 55*c* and 55*d* is designed to calculate an average of three counter values K which are obtained at three different timings separated from one another. Accordingly, even if one of the counter values K have been effected by noise, the overall effects of the noise will be small by the calculation of the average.

The first average circuit 55*c* and the second average circuit 55*d* are designed depending on the complexity of the circuitry and on the ratio between the frequency of the carrier wave (oscillation frequency of the LC oscillation circuit 69*c*) and the modulation frequency fm. The shift register 55*b* is designed to hold the total number of counter values K, indicative of the total number of periods of the limitter output signal, dependently on the ratio of the system clock frequency to the carrier wave frequency. The system clock frequency is set to a frequency that enables sufficient distinction in changes in frequency of the carrier wave. For example, the system clock frequency is preferably set to 16 MHz that is about forty times as high as the frequency of the carrier signal.

The absolute-value comparator 55*f* is for comparing an absolute value of the difference Δm, outputted from the subtractor 55*e*, with a preset threshold value Th, to thereby judge whether or not the absolute value of he difference Δm is equal to or greater than the threshold value Th, the absolute-value comparator 55*f* outputs a threshold value judgement output in one of two different levels (high level and low level) according to the judgement results as shown in FIG. 15. More specifically, when the absolute value of the different Δm is judged to be greater than or equal to the threshold value Th, the absolute-value comparator 55*f* changes the threshold value judgement output between a low level and a high level. Thus, the absolute value comparator 55*f* judges that the period of the limiter output signal has changed or said differently detects the rising or lowering edge of the Cr signal.

For example, it is assumed that the counter circuit 55*a* counts the counter value K of ten (10) for the short period TB of the limiter output signal and counts the counter value K of sixteen (16) for the longer period TC. In the first row of FIG. 13(*b*), the calculation range by the first average circuit 55*c* and the second average circuit 55*d* reaches the timing of the rising edge of the CR signal. In this case, all of the counter values K1 to K6 shown in FIG. 13(*a*) are ten (10). Therefore, the second mean value is equal to 10 ((K1+K2+K3)/3=10). Also, because the counter value K7 and the counter value K8 are both equal to 16, then the first mean value will be equal to 14 ((K6+K7+K8)/3=42/3=14). Therefore, the difference Δm obtained by the subtraction circuit 55*e* will be equal to −4 (10−14=−4).

If the threshold value Th is set to two (2), because 4 (absolute value of the difference Δm) is greater than 2 (threshold value m1), the threshold judgement output is changed between a low level and a high level. For example, the threshold judgement output is changed from a low level to a high level. This level condition of the threshold value judgement output will be maintained until the absolute value comparator 55*f* judges that the absolute value of the difference Δm becomes equal to or greater than the threshold value Th next.

When the calculation range by the first average circuit 55*c* and the second average circuit 55*d* again reaches the edge timing of the CR signal, the absolute value of the difference Δm becomes greater than the threshold value Th again, and the threshold judgement output is changed again between a low level and a high level.

The counter 55*g* is for using the system clock (CLK2), provided by the CPU 56, to count the number of the system clock signals to thereby measure the time that the threshold judgement output is maintained at one of high and low levels, that is, a half period of the threshold judgement output. That is, when change in the threshold value judgement output is detected between a low level and a high level, the counter 55*g* starts counting until the threshold judgement output again changes between the high and low levels.

Figure 14A:
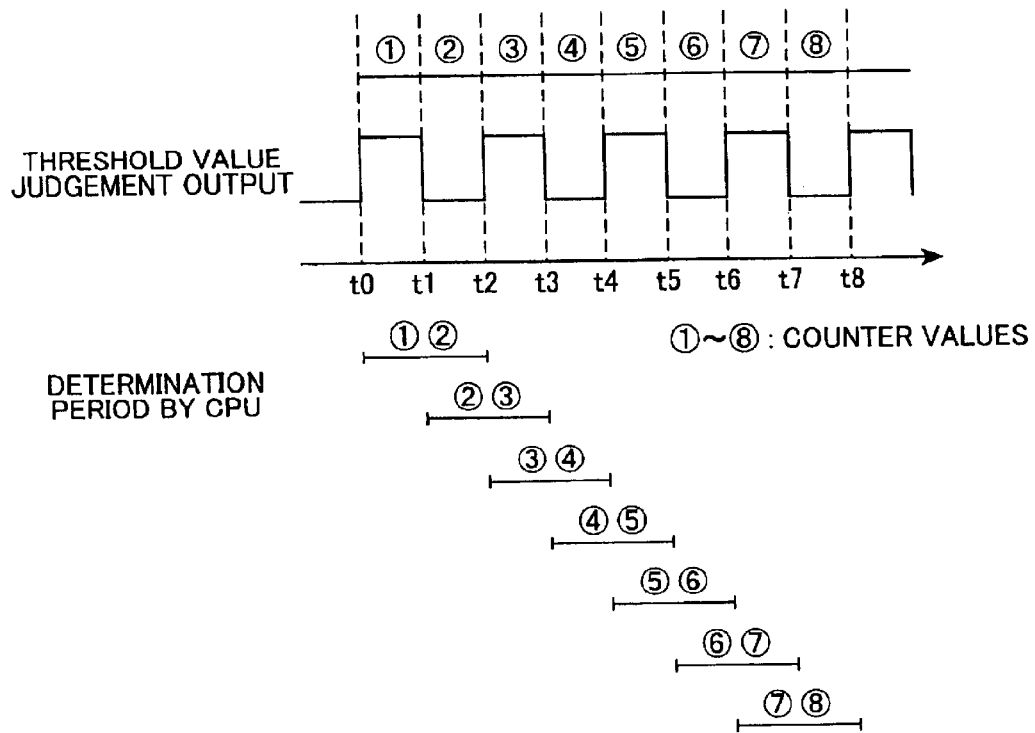
FIG. 14(a) shows the relationship between the threshold value judgement output by the absolute-value comparator 55f and the determination period by CPU.
Figure 14B:
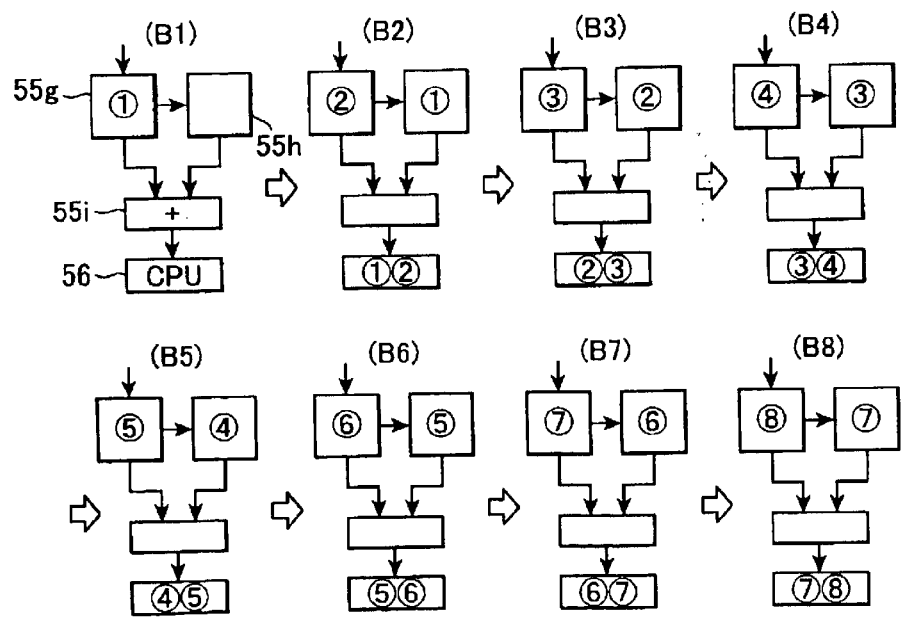
FIG. 14(b) illustrates how counter value K counted by counter 55g moves.

As shown in FIG. 14(*a*), it is assumed that the absolute-value comparator 55*f* first judges at a timing t0 that the absolute value of the difference Δm becomes equal to or greater than the threshold value Th. In other words, at the timing t0, the absolute value comparator 55*f* determines that the period of the limiter output signal has changed, and recognizes the rising edge of the CR signal. The absolute-value comparator 55*f* changes the threshold value judgement output from a low level to a high level. The absolute-value comparator 55*f* again judges at timing t1 that the absolute value of the difference Δm becomes equal to or greater than the threshold value Th. In other words, at the timing t1, the absolute value comparator 55*f* determines that the period of the limiter output signal has changed again, and recognizes the lowering edge of the CR signal. The absolute-value comparator 55*f* changes the threshold value judgement output from a high level to a low level. The counter value K counted by the counter circuit 55*g* between the timings t0 and t1 is ①as indicated in (B1) of FIG. 14(*b*). At the timing t1, the counter 55*g* then outputs the counter value ① to the register 55*h* as shown in (B2) of FIG. 14(*b*). The counter 55*g* then resets the counter value ①, and again counts a half period of the threshold value judgement output, that is, the time that the threshold value judgement output is maintained at a low level until the timing t2 when the threshold value judgement output again changes. In this example, the counter value measured between the timings t1 and t2 is indicated by ②.

Thus, the counter 55*g* will measure the lengths of successive periods t0–t1, t1–t2, t2–t3, . . . , and t7–t8, to thereby output counter values ① to ⑧ indicative of the lengths of the periods t0–t1, t1–t2, t2–t3, . . . , and t7–t8, respectively. In each period t0–t1, t1–t2, t2–t3, . . . , and t7–t8, the threshold judgment output is maintained at either the low or high level.

The adding circuit 55*i* determines that an adding timing has arrived when the counter values K have been held in both of the counter 55*g* and the register 55*h*. In this example, at the timing t2 when the counter value ① is held in the register 55*h* and the counter value ② is determined in the counter 55*g*, the adding circuit 55*i* adds the counter value ② held in the counter 55*g* and the counter value ① held in the register 55*h*, and outputs the sum ①+②, as a demodulated counter value, to the CPU 56. At the same time, the counter 55*g* outputs the counter value ② to the register 55*h* as indicated in (B3) of FIG. 14(*b*).

Thus, the CPU 56 reads the demodulated counter value (sum value ①+②) from the FSK demodulation circuit 55 via the input/output circuit 56, and judges the pen attribute based on the received demodulated counter value (sum value ①°②) while referring to the table shown in FIG. 6(*d*). For example, if the sum ①+② is 245, then the CPU 56 will judge the pen attributes to be black and thick as indicated in the table of FIG. 6(*d*).

In the same manner as described above, the adding circuit 55*i* adds the counter value ② for the duration t1–t2, now registered in the register 55*h*, to the counter value ③ for the duration t2–t3, newly counted in the counter 55*g*, and outputs the sum to the CPU 56 as indicated in (B3) in FIG. 14(*b*). These processes are repeated so that every time the threshold value judgement output changes between low and high levels, the counter value K of the counter 55*g* is outputted to the register 55*h*, and the adding circuit 55*i* adds the counter value K in the counter 55*g* to the counter value K held in the register 55*h* and outputs the sum to the CPU 56. That is, as shown in FIG. 14(*b*), the adding circuit 55*i* adds the counter value K, which is counted during the latest duration by the counter 55*g*, to the counter value K, which is counted during the duration immediately prior to the latest duration and which is held in the register 55*h*, and the sum is outputted to the CPU 56. For this reason, as shown in FIG. 14(*a*), the CPU 56 judges the pen attributes, based on the sum of the latest counter value K and the preceding counter value K, each half period of the threshold value judgement output. Accordingly, even if the scanning operation of the loop coils 23 is performed at a timing between times t0 and t1 shown in FIG. 14(*a*), it is unnecessary to wait for the next period of t2–t4. The counter sum can be determined for the time t1 to t3 that is after a half period elapsed from the time t1. Accordingly, the pen attribute can be judged immediately.

Accordingly, when the period of the limitter output signal changes as shown in FIG. 15, the counter circuit 55*a* starts counting the system clock signals each time a rising edge of the limitter output signal is detected. The absolute-value comparator 55*f* produces the threshold judgement output whose level changes in correspondence with the timing when the period of the limitter output signal changes. The counter 55g counts the system clock signals each time the level of the threshold judgement output changes. The adding circuit 55i calculates the duration of the successive two periods, during which the threshold judgement output is in high and low levels. The duration is indicative of the length of a single period required by the threshold judgement output to change two times. Thus, duration is indicative of the length of a single period of the CR signal where the level of the CR signal changes two times, and accordingly is indicative of the modulation frequency fm of the CR signal. Thus, if the modulation frequency fm of the CR signal is high, the level of the threshold judgement output highly frequently changes, and therefore the counter value counted by the counter 55g will be small. When the modulation frequency fm of the Cr signal is less, the level of the threshold judgement output changes less frequently, and therefore the counter value counted by the counter 55g is large.

With the above-described structure, the CPU 56 controls the entire device 1. More specifically, the CPU 56 executes the main routine as shown in FIG. 16.

When the CPU 56 detects that the power button 38 is pressed down to be turned ON (S100:YES), then in S200, the CPU 56 executes initialization processes. During the initialization processes, the CPU 56 loads the various control programs from the ROM 58 into a work area of the RAM 59. The CPU 56 also loads the position coordinate table 58a of FIG. 10(b) and the pen attribute table of FIG. 6(d) from the ROM 58 into the work area of the RAM 59.

Next, the CPU 56 executes a coordinate reading process in S300 to read X and Y coordinates of the position of the pen 60 on the writing surface 21a, and to store data of the read X and Y coordinates in the RAM 59. As the coordinate reading process of S300 is repeatedly executed, the pen is repeatedly detected by the sense coils 23 and the X and Y coordinates of the position of the pen 60 are repeatedly determined, and stored in the RAM 59. The thus successively-determined position coordinate data of the pen 60 constitute a set of written data that is indicative of an image (characters and/or figures) drawn on the writing surface 21a by the pen 60. A plurality of sets of written data, indicative of a plurality of pages' worth of images, can be stored in the RAM 59, wherein each set of written data indicates a corresponding page image.

Next, the CPU 56 executes a page process in S400. During the page process of S400, when the user presses down either one of the page reverse button 33, the page forward button 34, and the erasure button 35, the CPU 50 executes appropriate page process, such as a page reversing process, a page forwarding process, or a page erasing process, in page units onto the written data now stored in the RAM 59. More specifically, the CPU 56 receives, through the I/O circuit 57, a switching signal which is generated in response to an operation of some button on the operation portion 30, and executes the page processes. For example, the CPU 56 reverses or forwards, by page units, the written data stored in the RAM 59. Or, the CPU 56 erases the written data also in page units.

In S500, the CPU 56 executes a data output process to convert all the written data (pen position coordinate data) of the user's desired page, that is now stored in the RAM 59, into an appropriate format and to output the resultant data to the PC 100 or the printer 200. In S600, the CPU 56 executes a sound output routine for generating operational sounds, such as beeps, by operating the sound circuit 31a in response to the switching signals, which are generated when one of the buttons is pressed, and by controlling the speaker (SP) 31 accordingly.

Then, the routine proceeds to S700. In S700, if the eraser 40 is located on the writing surface 21a and is detected by the sense coils 23, the CPU 56 determines the X and Y coordinates of the eraser 40, in the same manner as in the pen coordinate reading process of S300, based on values of the voltages generated by the X and Y coils 23 that are magnetically coupled with the alternating magnetic field from the coil in the eraser 40. The CPU 56 then determines the course followed by the eraser 40. The CPU 56 deletes, from the RAM 59, some pen coordinate data (written data) that corresponds to the course followed by the eraser 40.

After process of S700 is completed, one series of processes represented by the flowchart in FIG. 16 are completed, whereupon the program returns to S100 and repeats the processes in S100 to S700.

The coordinate reading process of S300 in FIG. 16 is performed as shown in FIG. 17.

That is, when the coordinate reading routine is started, the X coils are first scanned in S302. More specifically, the X coils X1 to Xm are scanned by the coil selection signal A (FIG. 9) in this order. If no pen 60 is detected (S304:NO), then the coordinate reading process of S300 is ended, and the routine proceeds to the page routine of S400 (FIG. 16). If the pen 60 is detected (S304:YES), then in S306, the voltage values of all the X coils and Y coils are stored in the RAM 59. More specifically, the voltage values ex(1)–ex(m) from the X coils X1–Xm are stored in association with the corresponding coil numbers (1)–(m) in the voltage value storage area 59a as shown in FIG. 10(c). Once the voltage values for the X coils are thus stored in S306, then the X coordinate calculation routine is performed in S308.

When the X coordinate is obtained in S308, then Y coils are scanned in S310. More specifically, the Y coils Y1 to Yn are scanned by the coil selection signal A (FIG. 9) in this order. Then, in S312, the voltage values ey(1)–ey(n) from the Y coils Y1–Yn are stored in association with the corresponding coil numbers (1)–(n) in the temporary storage area 59a. Once the voltage values for the Y coils are thus stored in S312, then the Y coordinate calculation routine is performed in S314.

When the Y coordinate calculation routine of S314 is completed, then the routine for reading values from the FSK demodulation circuit 55 is performed in S316, and a routine for determining the pen attribute is performed in S318.

Then, in S320, the CPU 56 stores the pen attributes in association with the X and Y coordinates n the RAM 59. Then, the coordinate reading process of S300 is ended.

Next, operations of the X coordinate calculation routine in S308 will be described below.

The calculation in S308 is executed using the voltage values e(I) to e(m) that are stored in the voltage value storage area 59a.

More specifically, the CPU 56 first selects the largest voltage value e(max) among all the voltage values e1 to em stored in the voltage value storage area 59a, where $1 \leq max \leq m$. The CPU 56 then determines the coil number "max" of the X coil X(max) that has generated the largest voltage value e(max). The CPU 56 stores the determined coil number "max" in the RAM 59.

For example, if the pen 60 is located at a position Q3 shown in FIG. 11(a), the X coils X1, X2, X3 generate voltage values e1, e2, e3, respectively, as shown in FIG. 11(b). In this case, the CPU 56 selects the voltage value e2 as the largest voltage value e(max). The CPU 56 selects the coil number (2) of the X coil X2 as the coil number "max", and stores the coil number (2) in RAM 59.

The CPU 56 then compares voltage values e(max+1) and e(max−1) with each other. The voltage value e(max+1) is the value of a voltage induced at a X coil X(max+1) that is located adjacent to and in the right side of the maximum coil X(max). In other words, the X coil X(max+1) is located in the positive direction from the X coil X(max) along the X axis. The voltage value e(max−1) is the value of a voltage induced at another X coil X(max−1) that is located adjacent to and in the left side of the maximum coil X(max). In other words, the X coil X(max−1) is located in the negative direction from the X coil X(max) along the X axis. The CPU 56 selects one of the voltage values e(max+1) and e(max−1) that is greater than the other. The CPU 56 then stores, in the RAM 59, the coil number (max2) of the X coil that has generated the selected greater voltage value e(max+1) or e(max−1). The thus selected X coil (max2) is the second maximum voltage coil that has induced the second largest voltage among all the X coils (X coil (1)–X coil (m)).

In the example shown in FIGS. 11(a) and 11(b), because the maximum coil number (max) is equal to 2, the voltage value e1 (e(max−1)) of the X coil X1 and the voltage value e3 (e(max+1)) of the X coil X3 are compared with each other. Because e3 is greater than e1 for the position of Q3, the corresponding coil number (3) of the X coil X3 is stored in the RAM 59 as the coil number (max2).

Next, the CPU 56 compares the value of the coil number (max) and the coil number (max2) which are now stored in the RAM 59. The CPU 56 then judges whether or not the coil number (max2) is greater than or equal to the coil number (max). In other words, the CPU 56 judges whether the coil X(max2) exists in the positive direction (rightside) or in the negative direction (leftside) from the coil X(max) along the X axis.

When the max2≧max, it is determined that the coil X(max2) exists in the positive direction (rightside) from the coil X(max) along the X axis. Accordingly, a variable "SIDE" is set to 1. On the other hand, when max2<max, it is determined that the coil X(max2) exists in the negative direction (leftside) from the coil X(max) along the X axis. Accordingly, the valuable "SIDE" is set to −1.

In the example of FIGS. 11(a) and 11(b), because max=2 and max2=3, max2>max, and therefore the variable SIDE is set to 1.

Next, the CPU 56 calculates a difference voltage "DIFF" between the voltages e(max) and e(max2) by calculating the following formula (1):

$$DIFF = e(max) - e(max2) \quad (1)$$

Next, the CPU 56 retrieves, from the position coordinate table 58a (FIG. 10(b)) now stored in the RAM 59, a coordinate offset amount ΔX that corresponds to a value DIFF that is closest to the calculated different value DIFF. The CPU 56 sets the retrieved coordinate offset amount ΔX as a value "OFFSET".

The CPU 56 then determines the X coordinate X1 of the pen 60 by calculating the following formula (2)

$$X1 = (P1/2) \times (max) + OFFSET \times SIDE \quad (2)$$

wherein the value of "(P1/2)×(max)" represents the X coordinate of the center line of the maximum voltage-inducing coil X(max).

In the example shown in FIGS. 11(a)–11(c), X1 of the pen 60 at the location Q3 is calculated as being equal to (P1/2)×2+(e2−e3)×1. Thus, it is known that the position Q3 is separated, in the positive direction along the X axis, from the center line C2 of the X coil X2 by the distance ΔX2 that corresponds to the voltage value difference (e2−e3).

The y coordinate of the pen 60 is calculated in S314 in the same manner as in the process of S308.

Next will be described the process of S316 (FIG. 17) to read demodulation counter values from the FSK demodulation circuit 55.

Figure 18A:
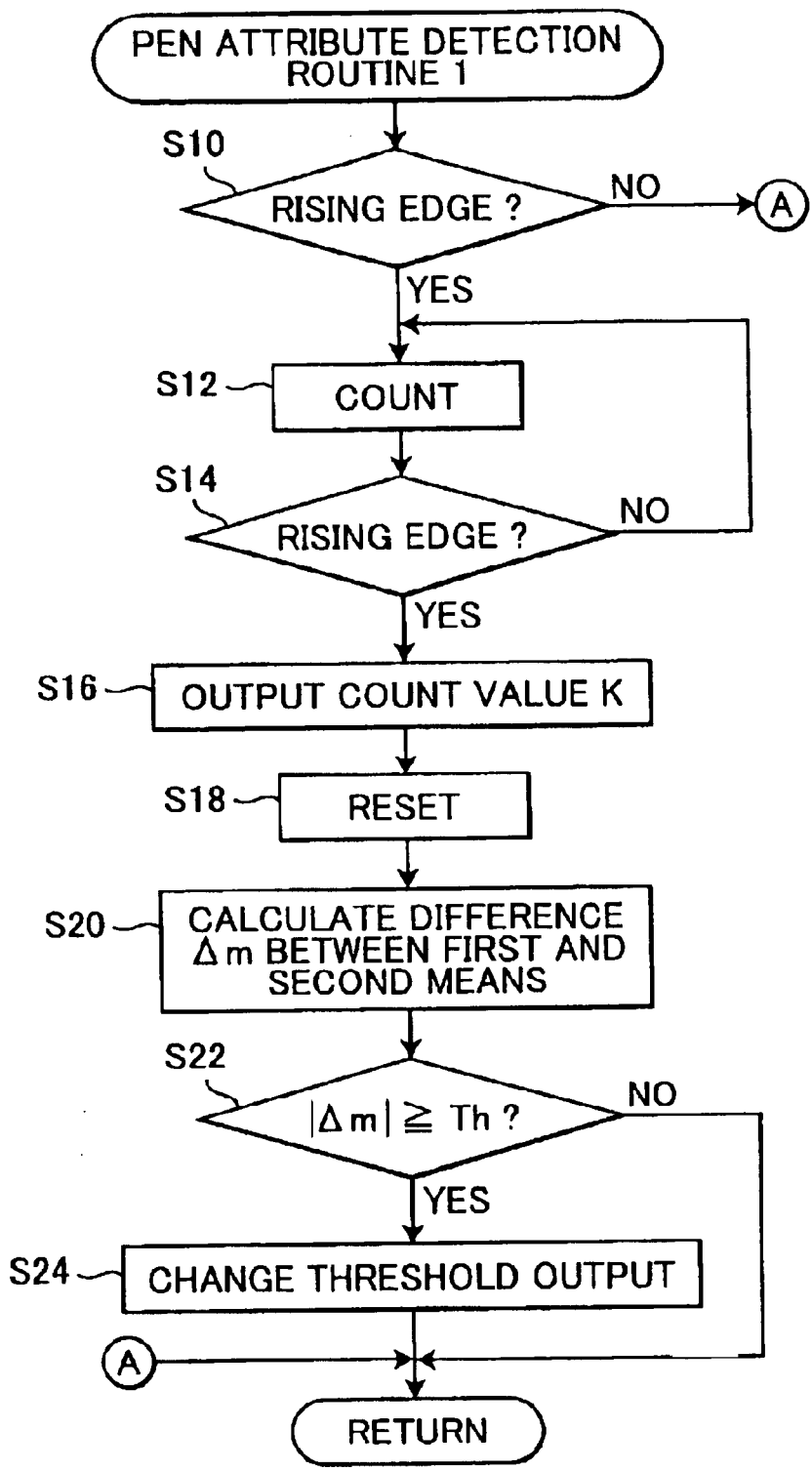
FIG. 18(a) is a flowchart of a first pen attribute detection process executed by the counter circuit 55a, the shift register 55b, the average calculating circuit 55c, 55d, the subtracting circuit 55e, and the absolute-value comparator 55f in the FSK demodulation circuit 55.

In the FSK demodulation circuit 55, the counter circuit 55a, the shift register 55b, the average calculating circuit 55c, 55d, the subtracting circuit 55e, and the absolute-value comparator 55f perform a first pen attribute detection process shown in FIG. 18(a). The counter 55g, the register 55h, and the adding circuit 55i perform a second pen attribute detection process shown in FIG. 18(b).

The first and second pen attribute detection processes will be described while referring to FIGS. 18(a) and 18(b).

As described already, the amplified signals having passed through the band pass filter 50d are supplied not only to the amplitude detection circuit 51 but also to the limiter circuit 54. The signals are converted by the limiter circuit 54 into a limiter output signal with the square waveform shown in FIG. 13(a). The limiter output signal is supplied to the FSK demodulation circuit 55.

As shown in FIG. 18(a), when the FSK demodulation circuit 55 detects a rising edge of the limiter output signal (S10:YES), then in S12, the counter circuit 55a starts counting the number of the system clock (CLK) to measure the period of the limiter output signals. When the next rising edge of the limiter output signals is detected (S14:YES), then in S16, the counter value K by the counter circuit 55a is outputted to the shift register 55b. Then, in S18, the counter value K of the counter circuit 55a is reset. Thus, the counter circuit 55a measures the length TB or TC of a single period of limiter output signal shown in FIG. 13(a).

The thus newly produced counter value K is inputted into the shift register 55b so that counter values K obtained during eight successive periods are stored in the shift register 55b. Each time the new counter value K is inputted to the shift register 55b, all of the counter values K in the shift register 55b are shifted one position and the oldest counter value K is discarded. The first average circuit 55c calculates an average from the latest counter value K to the third latest counter value K, and outputs the calculated mean value to the subtraction circuit 55e as the first mean value. The second average calculating circuit 55d calculates an average of the oldest counter value K to the third oldest counter value K, and outputs the calculated mean value to the subtraction circuit 55e as a second mean value.

Next, in S20, the subtraction circuit 55e calculates the different Δm between the first mean value and the second means value, and outputs the difference Δm to the absolute-value comparator 55f. Then, in S22, the absolute-value comparator 55f compares the absolute value of the difference Δm with the preset threshold value Th to judge whether or not the absolute value of the difference Δm is equal to or greater than the threshold value Th. If the absolute value of the difference Δm is judged to be greater than or equal to the threshold value Th (S22:YES), then in S24, a threshold value judgement output, to be outputted from the absolute-value comparator 55f, is changed between a low level and a high level.

Figure 18B:
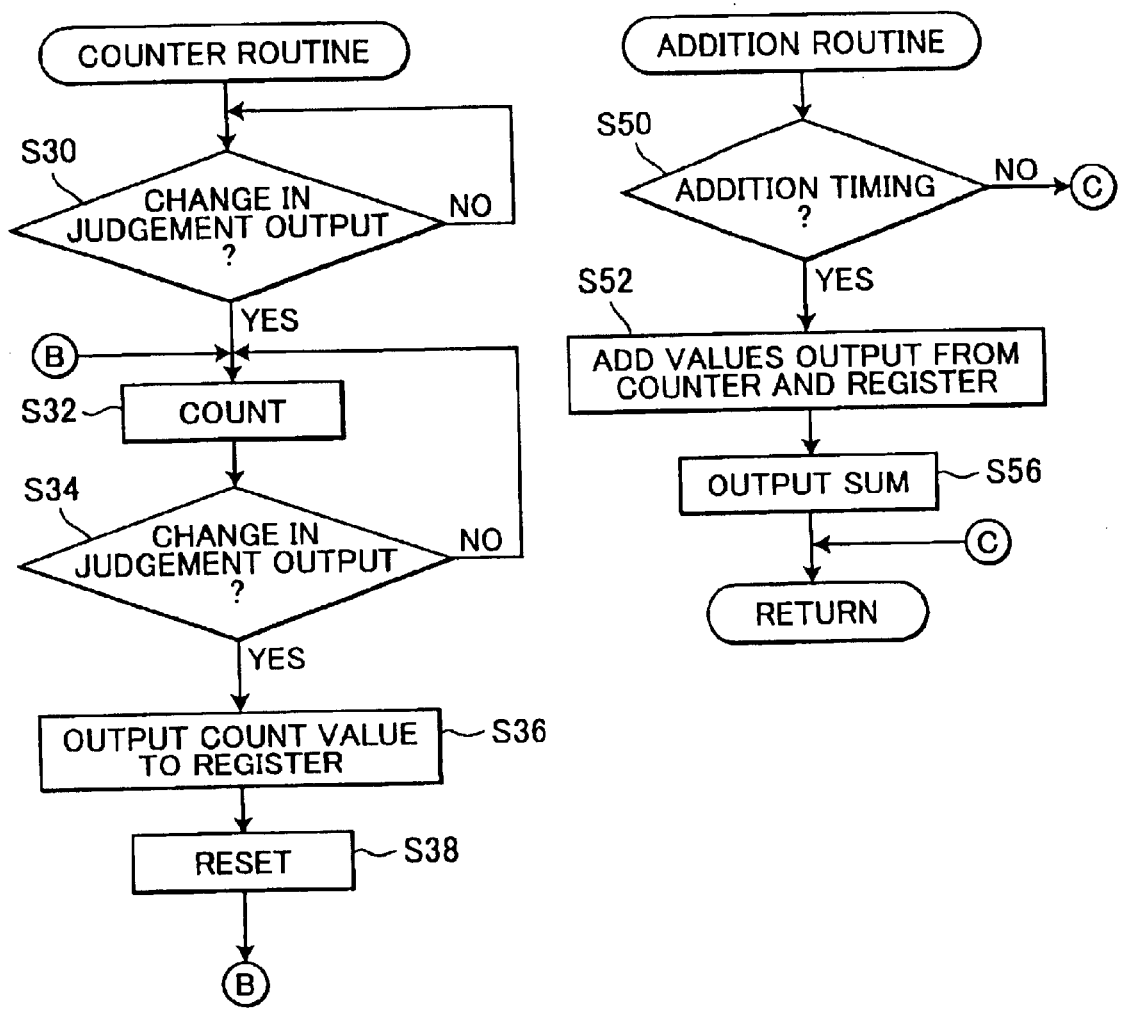
FIG. 18(b) shows the flowcharts of a second pen attribute detection process, which includes a counting process by the counter 55g and an adding process by the adder 55i.

As shown in FIG. 18(b), when the counter 55g detects the change in the threshold judgment output between a low level and a high level (S30:YES), then in S32, the counter 55g starts counting the system clock (CLK2) pulses to measure the time that the threshold judgement output is maintained at the present level, that is, the half period of the threshold judgement output.

When the absolute value converter 55f again judges that the absolute value of the difference Δm is equal to or greater than the threshold value Th (S22:YES), then in S24, the absolute value comparator 55f again changes the threshold value judgement output between a high level and a low level. At the same time, the counter 55g detects in S34 that the threshold value judgement output changes again (S34:YES). Then, in S36 the counter 55g outputs its counter value to the register 55h. Next, in S38, the counter 55g resets the counter value. The counter 55g then again starts counting in S32 the half period of the threshold value judgement output, that is, the time that the threshold value judgement output is maintained at the present level.

The adding circuit 55i determines whether the adding timing has arrived by detecting the timing when the counter values are inputted to both the counter 55g and the register 55h. When counter values are inputted to both the counter 55g and the register 55h for a certain timing (S50: YES), then in S52, the adding circuit 55i adds the counter value now held in the counter 55g to the counter value now held in the register 55h. The adding circuit 55i then outputs the sum value to the CPU 56 in S56. At this time, the counter 55g outputs in S36 the next counter value to the register 55h.

Accordingly, in S316 (FIG. 17), the CPU 56 reads the sum value from the adding circuit 55i, that is, the demodulation counter value of the FSK demodulation circuit 55, through the input/output circuit 53.

In S318, the CPU 56 determines the pen attributes based on the retrieved sum value while referring to the table of FIG. 6(d). For example, if the sum value is 245, then the CPU 56 will judge the pen attributes to be black and thick.

Then, in S320, the CPU 56 stores the pen attributes in association with the X and Y coordinates in the RAM 59. The thus stored written data (X and Y coordinate data and the pen attribute data) will be outputted to the printer 200. for example, which in turn prints the characters or figures in a manner corresponding to the pen attribute. For example, if the pen attribute is black and thick, the printer 200 will print the characters or figures in thick black font. Also, the written data could be outputted to the personal computer 100 and displayed on the monitor 103 in the thick black font. Thus, the written data is reproduced according to the attributes of the pen 60.

It is noted that the circuit board 69 in the pen 60 (FIG. 6(b)) is designed to start oscillating and modulating the alternating magnetic field (carrier wave) when the pen 60 is pressed against the writing surface 21a of the electronic white board 1. It is preferable that the circuit board 69 continues oscillating and modulating the alternating magnetic field (carrier wave) for a predetermined length of time after the start of the oscillation and modulation. The length of the predetermined time is preset as a duration of time that is sufficiently long for the electronic white board 1 to detect the period T of the modulation frequency fm. More specifically, the circuit board 69 is preferably provided with a timer (not shown) for measuring a time length from the timing when the pen 60 first contacts the writing surface 21a. When the measured time length reaches and exceeds the predetermined time length, the circuit board 69 stops generating the alternating magnetic field (carrier wave). According to this modification, the pen 60 can consume less power to transmit attribute information to the electronic white board 1.

As described above, according to the present embodiment, the oscillation circuit mounted in the circuit board 69 of the pen 60 includes: the CR oscillation circuit 69e; the LC oscillation circuit 69c; and the FSK circuit 69d. The CR oscillation circuit 69e oscillates a signal with one of a plurality of different modulation frequencies fm that correspond to a plurality of different attributes, such as ink colors, pen tip thickness, and the like, of the pen. The LC oscillation circuit 69c is for oscillating a carrier wave (alternating magnetic field) for transmitting the signal oscillated by the CR oscillation circuit 69e. The FSK circuit 69d is for FSK modulating the oscillation frequency of the LC oscillation circuit 69c in accordance with the modulation frequency of the CR oscillation circuit 69e. The receiving side or the electronic white board 1 measures a time period at which the frequency of the carrier wave changes, thereby determining the period of the modulation frequency fm to know the pen attribute. Because it is sufficient to receive the signal from the pen for at least one period of time thereof, it is possible to shorten the time required to recognize the pen attributes.

Thus, the pen 60 transmits a CR signal, with its period corresponding to attributes of the pen 60, to the electronic white board 1. The electronic white board 1 can determine the attributes of the pen 60 by measuring the single period of the CR signal. Therefore, less time is required to distinguish the attributes of the pen 60 than in the conceivable manner wherein the code train has to be transmitted for a plurality of periods.

Figure 1B:
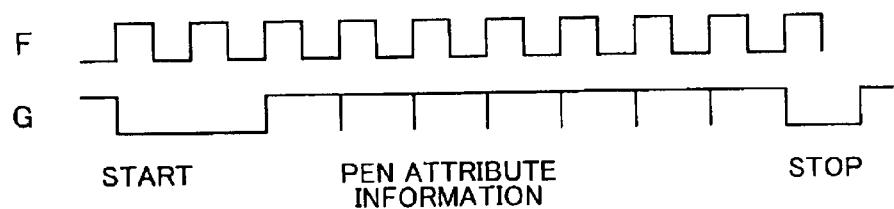
FIG. 1(b) illustrates a code train transmitted from a pen.

For example, if the CR oscillation circuit 69e has a modulation frequency fm of 5 kHz, then the time required to distinguish a single period of the CR signal will be $1/5,000=$ 200 ($\mu$s) at shortest. On the other hand, if the conceivable coordinate reading device shown in FIG. 1 transmits the code train with the same frequency of 5 kHz, then 200 $\mu$s is required to transmit each bit. Since a total of 10 bits are transmitted in the conceivable code train, then 2,000 $\mu$s (200 $\mu$s×10=2,000 $\mu$s) is required to transmit the entire code train that indicates pen attributes in the conceivable situation. Thus, the electronic white board 1 according to the present embodiment can distinguish pen attributes in $1/10$ the time ($200/2,000=1/10$) of the time required in the conceivable situation.

Even if the period of the CR signal changes slightly, this change will appear as a change of the period of the limiter output signal. This change is detected by the FSK demodulation circuit 55 and further by the CPU 56. Accordingly, even when the period of the CR signal is changed slightly according to the respective pen attributes, the white board 1 can properly recognize the pen attribute.

In the above description, the count circuit 55a counts the periods TB and TC of the limiter output signal based on the system clock. If the period of the limiter output signal changes by at least one period of the system clock, the count circuit 55a will count a different value, and so will be able to recognize the pen attributes. Therefore, attributes for each pen can be indicated by only slightly changing the period of the CR signal by only one or more periods of system clock. Accordingly, a great number of pen attributes can be set.

Further, because the pen attributes are recognized based on measuring the period of the CR signal, there is no need to synchronize the operation clock of the electronic white board 1 with the operation clock of the pen 60. Therefore, the pen need not be provided with a divider or other circuitries for generating an operation clock. Therefore, the pen 60 can have a single circuitry configuration.

The CR signal can be repeatedly transmitted at the fixed period. Therefore, even if the sense coils are scanned in the middle of a CR signal period, the pen attributes can be determined by measuring the next single period. Therefore, there is no need to wait for the next start bit or to receive the code train from the start bit for a plurality of successive periods until the stop bit as in the conceivable situation. Therefore, the time required to recognize the pen attributes can be shortened.

Furthermore, because the carrier wave from the LC oscillation circuit 69c has its frequency modulated by the CR signal, even if the amplitude of the carrier wave is changed, the period of the CR signal will not change. Therefore, there is no danger that the pen attribute information indicated by the period of the CR signal will change. For example, even if the voltage of the battery 70 in the pen 60 drops, so that the strength of the alternating magnetic field (carrier wave) generated by the coil L1 also drops, the attribute information of the pen 60 can be reliably and accurately transmitted.

Next, a modification of the present embodiment will be described while referring to FIG. 19.

The electronic white board according to the present modification scans every other X coil and Y coil to retrieve X and Y coordinates rapidly.

Figure 19:
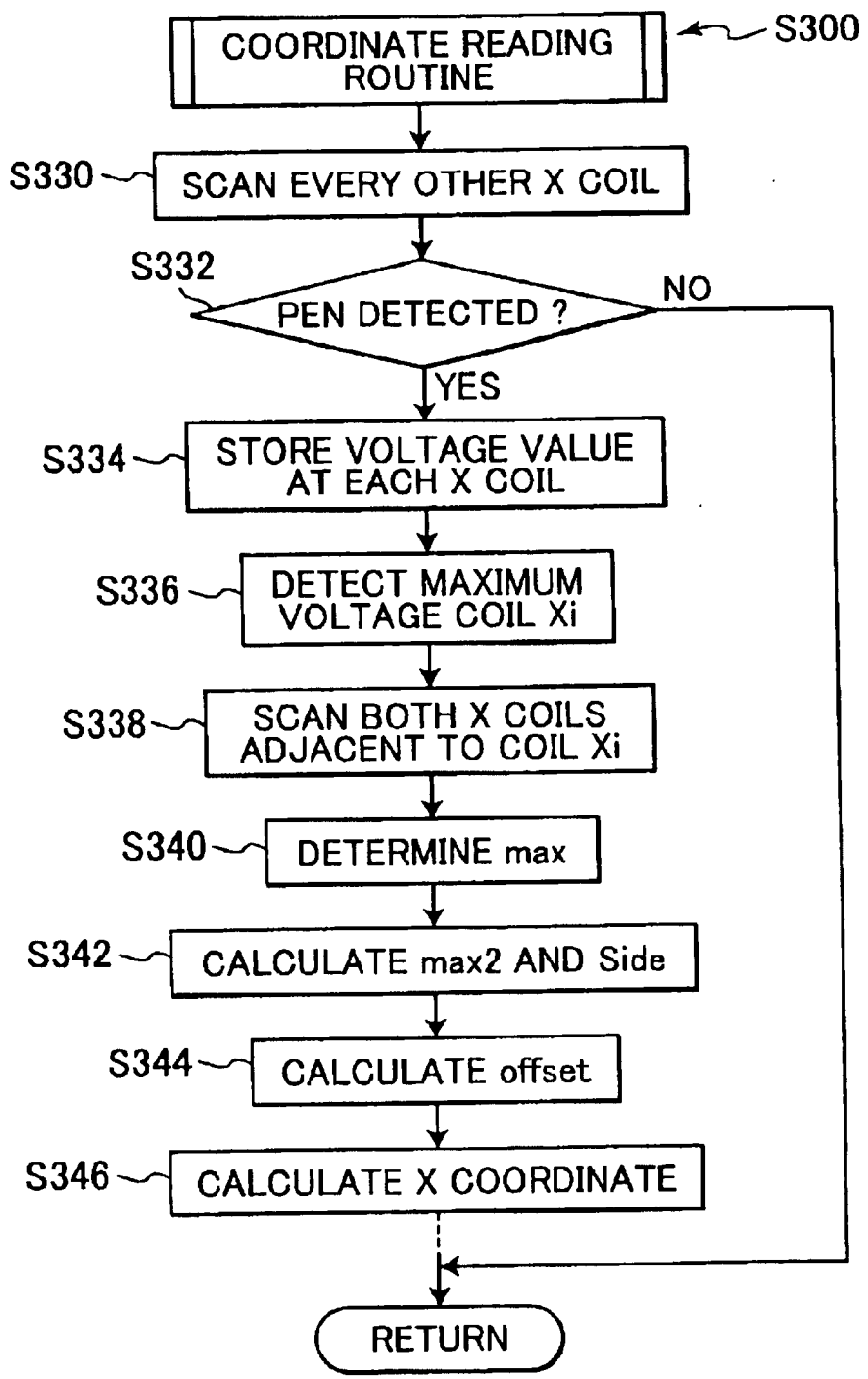
FIG. 19 is a flowchart showing flow of a coordinate reading routine of S300 according to a modification of the first embodiment.

The electronic white board 1 according to the present modification is the same as that of the above-described present embodiment except that the electronic white board 1 of the present modification executes the coordinate reading process of S300 as shown in FIG. 19.

FIG. 19 is a flowchart showing flow of a coordinate reading routine of S300 executed by the CPU 56 provided to the electric black board of the present modification.

As shown in FIG. 19, when the coordinate reading routine of S300 starts, first, in S330, the CPU 56 scans every other X coil. If the pen 60 is detected (S332:YES), then in S334, the CPU 56 serially stores voltage values of the thus detected X coils into the voltage value memory area 59a of the RAM 59. Next, in S336, the CPU 56 detects an X coil Xi that has generated the largest voltage value e(max) among the voltage values e(l) to e(m) now stored in the voltage value memory area 59a. Then, the CPU 56 scans the X coils (Xi−1) and (Xi+1) that are located on either side of the X coil Xi. That is, because every other X coil has been scanned in S330, the X coils (Xi−1) and Xi+1) have not been scanned. Those X coils (Xi−1) and (Xi+1) are adjacent to the X coil Xi, and therefore one of the X coils (Xi−1) and (Xi+1) might possibly have a voltage that is higher than the voltage of the X coil Xi. Taking this into account, the X coils (Xi−1) and (Xi+1) are scanned in S338.

Next, in S340, the CPU 56 selects the maximum voltage X coil among the three X coils (Xi−1), Xi (Xi+1), and then stores the coil number of the maximum voltage coil, as coil number (max), in the RAM 59. Next, in S342, the CPU 56 selects an X coil with the second largest voltage value among two X coils that are located adjacent to the X coil (max), and stores the corresponding coil number, as coil number (max2), in the RAM 59. The CPU 56 compares the coil number (max) to the coil number (max2) stored in the RAM 59, and judges whether the coil number (max2) is in the positive or negative direction along the X axis from the coil number (max). If max2 ≧max, then the variable SIDE is set to 1. On the other hand, if max2<max, then the variable SIDE is set to −1.

Next, in S344, the CPU 56 uses equation (1) described in the first embodiment to calculate the voltage difference DIFF, reads the position coordinate Δx, corresponding to a value DIFF that is nearest to the calculated voltage difference DIFF, from the position coordinate table 58a stored in the ROM 58, and sets this value as the OFFSET. Next, the CPU 56 determines the X coordinate X1 using the equation (2) described already in the present embodiment.

Although not shown in the drawing, the CPU 56 also scans every other Y coil and calculates the Y coordinate Y1 using the same procedures used for determining the X coordinate in S332 to S346.

For example, when there are 22 X coils, and the CPU 56 scans every other X coil in S330, the CPU 56 will scan only 11 times (22/2=11). Then, the CPU 56 will perform two additional scans in S338 for a total of 13 scans (11+2=13). Accordingly, because the present modification requires only thirteen scans where the already-described present embodiment requires 22 scans, the time required for scanning the X coils can be reduced by the number required to scan nine coils (9=22−13).

Thus, the electronic white board according to the present modification has the same good effect as in the present embodiment of requiring less time to distinguish pen attributes. In addition, the electronic white board according to the present modification requires less time to scan the sense coils 23 so is that much faster.

In the above-described embodiment and modification, pen attributes are determined based on the length of a single period of the CR signal. However, when the duty ratio of the CR signal is fixed to 50%, then the pen attributes can be determined based on the half period of the CR signal. In this case, the time required to determine pen attributes can be further reduced to one half of the time required for the above-described configuration.

<Second Embodiment>

A second embodiment will be described below with reference to FIGS. 20(a)–26(d).

The electronic white board 1 of the present embodiment is the same as that of the first embodiment except for the points described below.

Figure 20A:
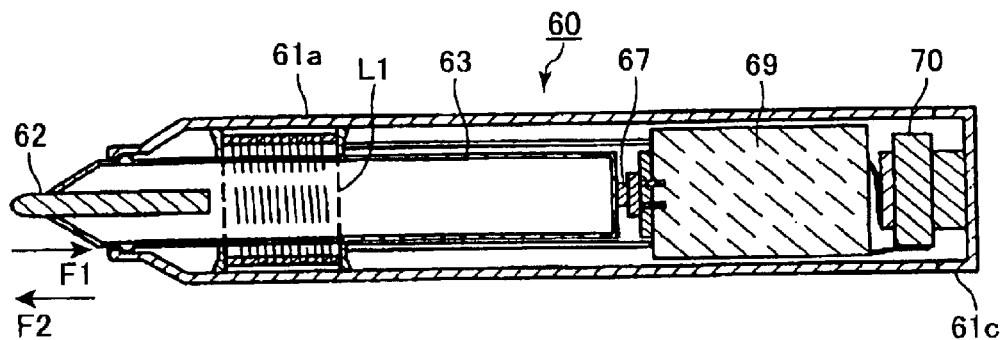
FIG. 20(a) is a cross-sectional view showing internal configuration of the pen 60 according to a second embodiment.

According to the present embodiment, as shown in FIG. 20(a), a pen pressure sensor 68 is additionally provided for detecting pen pressure, that is, the pressing force of the pen 60 against the writing surface 21a. The pen pressure sensor 68 is provided between the switch 67 and the circuit 69. The pen pressure sensor 68 is made from a pressure sensor whose resistance value changes according to the pen pressure. Such a pressure sensor is desirable because of its long life and its compact size, and also because it is suitable for use in a pen that is frequently placed in contact with and removed from the surface of the writing surface 21a. For example, the pen pressure sensor 68 is made from a variable resistor-type film sensor. The film sensor is thin, and so does not take up a great deal of space inside the pen 60. FIG. 20(c) is a plan view showing the configuration of the film sensor 68. The film sensor 68 includes: a PET film 68a; an electrode pattern 68b printed in silver paste on the PET film 68a; and a carbon film 68c pressed onto the electrode pattern 68b.

Figure 20B:
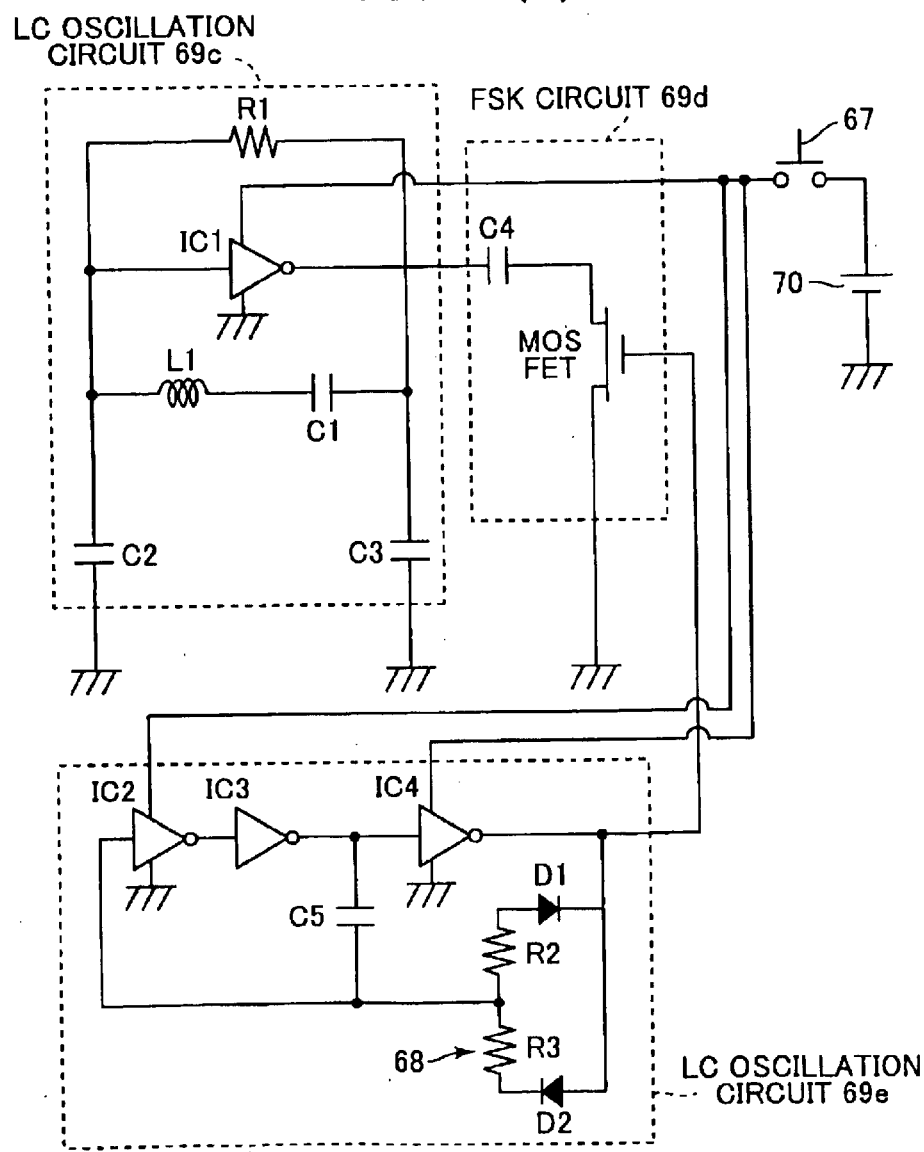
FIG. 20(b) is a circuit diagram showing electric configuration of the pen 60 of FIG. 20(a)
Figure 20C:
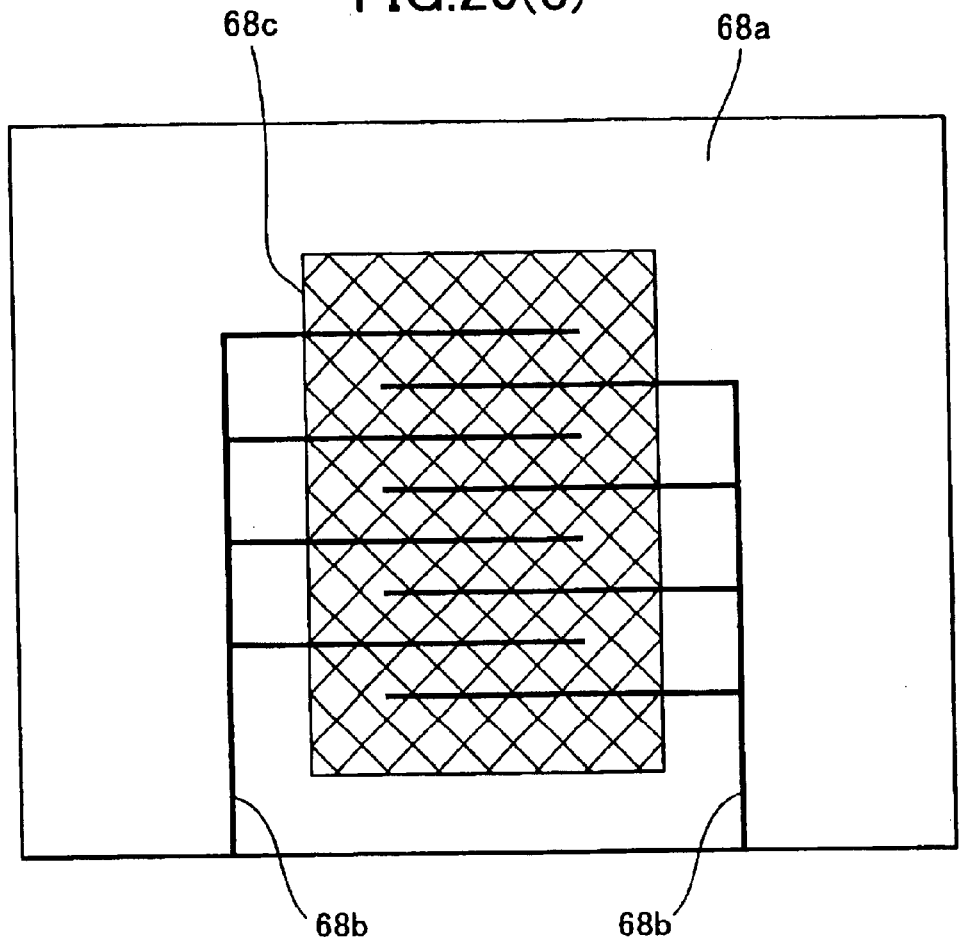
FIG. 20(c) is a plan view showing the configuration of a film sensor 68.

According to the present embodiment, therefore, the CR oscillation circuit 69e has a circuit structure as shown in FIG. 20(b). That is, the CR oscillation circuit 69e is constructed from: a capacitor C5, a resistor R2, a variable resister R3, a pair of diodes D1 and D2, and three integrated circuits IC2, IC3, and IC4. In this example, the variable resistor R3 is constructed from the pressure sensor 68 of FIG. 20(c). The variable range of the variable resistor R3 is 100 kΩ to 1 MΩ. The capacitor C5 has a capacitance of 100 pF. All of the integrated circuits IC2, IC3, and IC4 are TOSHIBA TC7SLU04F (trade name) produced by Toshiba Corporation. It is noted that the integrated circuits IC2 and IC3 can be constructed from any other integrated circuits of a type "U04". The resistor R2 has resistance of 1 MΩ.

Figure 20D:
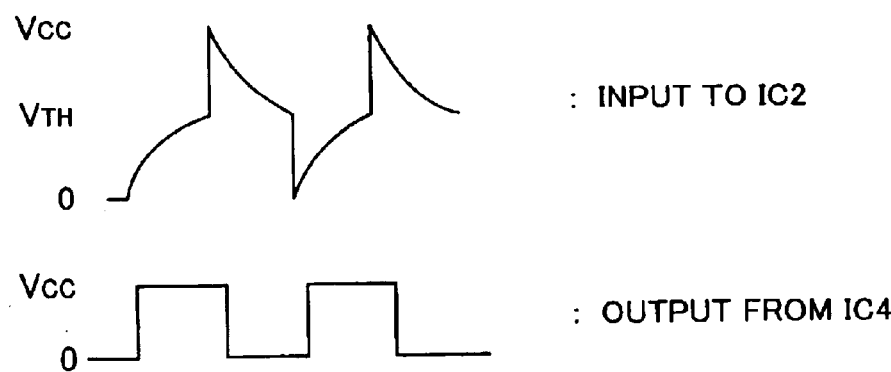
FIG. 20(d) shows waveforms of signals at the respective points in the CR oscillation circuit 69e in the circuit shown in FIG. 20(b)

With the above-described structure, the CR oscillation circuit 69e operates in the same manner as the CR oscillation circuit 69e of the first embodiment. Accordingly, the input to the IC2 and the output from the IC4 is as shown in FIG. 20(d). The modulation frequency fm of the CR signal is determined dependently on the values of the capacitance of the capacitor C5, the resistances of the resistors R2 and R3, and the resistances of the diodes D1 and D2.

Figure 21A:
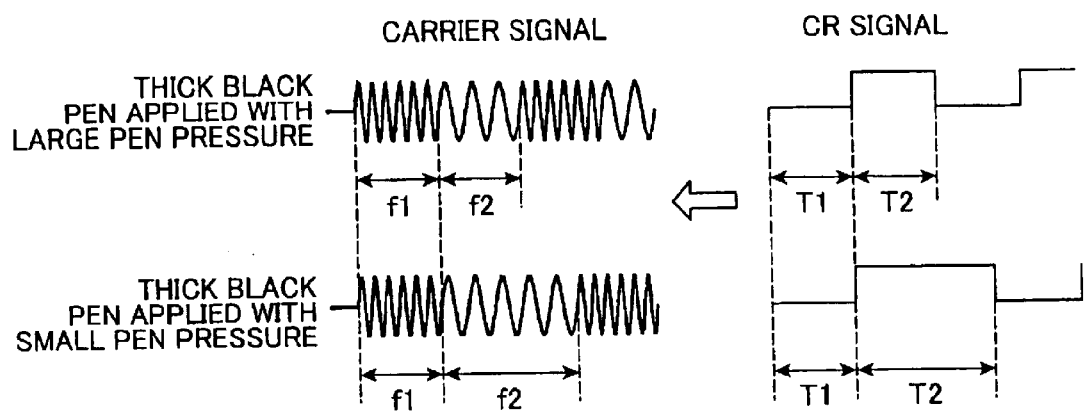
Figure 21B:
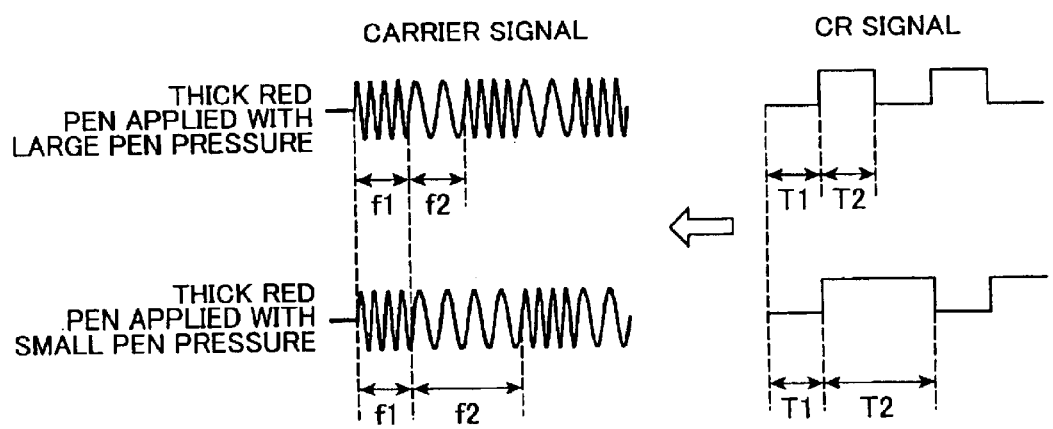

It is noted that according to the present configuration, when the output at the IC4 is in the high level, the diode D1 is brought into an off condition and the diode D2 is brought into an on condition. Accordingly, the time duration T2, where the CR signal is maintained in a high level as shown in FIGS. 21(a)–21(b), is determined by the following formula:

$$T2=0.69 \times C5 \times R3.$$

Additionally, when the output at the IC4 is in the low level, the diode D1 is brought into an on condition and the diode D2 is brought into an off condition. Accordingly, the time duration T1, where the CR signal is maintained in a low level as shown in FIGS. 21(a)–21(b), is determined by the following formula:

$$T1=0.69 \times C5 \times R2.$$

Because the resistor R2 has a fixed amount of resistance, the time length of the period T1 can be determined according to the amount of the capacitance of the capacitor C5. Therefore, according to the present embodiment, the capacitance of the capacitor C5 is set as different for the different attribute of the pen 60. Thus, the time length of the low level period T1 is set as indicative of the pen attribute.

The time length of the period T2 changes according to the amount of the resistance of the variable resistor R3, that is, the pressure sensor 68. Because the resistance of the variable resistor R3 changes in accordance with the pen pressure, the time length of the high level period T2 will change as indicative of the pen pressure.

With the above-described structure, the CR oscillation circuit 69e oscillates a CR signal, as shown in FIG. 21(a) and 21(b), not only according to the pen attribute, as to the ink color and the pen tip thickness, but also according to the pressure with which the pen 60 is pressed against the writing surface 21a. More specifically, the CR signal is generated so that its low level is maintained for the first period T1 and its high level is maintained for the second period T2. Accordingly, as also shown in the figures, the carrier signal (alternating magnetic field) is FSK modulated by the CR signal so that its high frequency f1 is maintained for the first period T1 and its low frequency f2 is maintained for the second period T2.

According to the structure of the CR oscillation circuit 69e, the first period T1 is set according to the pen attribute and the second period T2 is determined according to the pen pressure.

For example, for a thick black pen, as shown in FIG. 21 (a), the first period T1 is set to a value of 0.24 mS. Contrarily, for a thick red pen, as shown in FIG. 21(b), the first period T1 is set to a value of 0.13 mS. As the pen pressure decreases, the length of the second period T2 increases. Accordingly, when the thick black pen 60 is pressed against the writing surface 21a with a large pen pressure and a small pen pressure to draw characters and figures on the writing surface 21a, the CR signal is generated and the carrier signal (alternating magnetic field) is modulated as shown in FIG. 21(a). Similarly, when a thick red pen 60 is pressed against the writing surface 21a with a large pen pressure and a small pen pressure, the CR signal is generated and the carrier signal (alternating magnetic field) is modulated as shown in FIG. 21(b).

Figure 22:
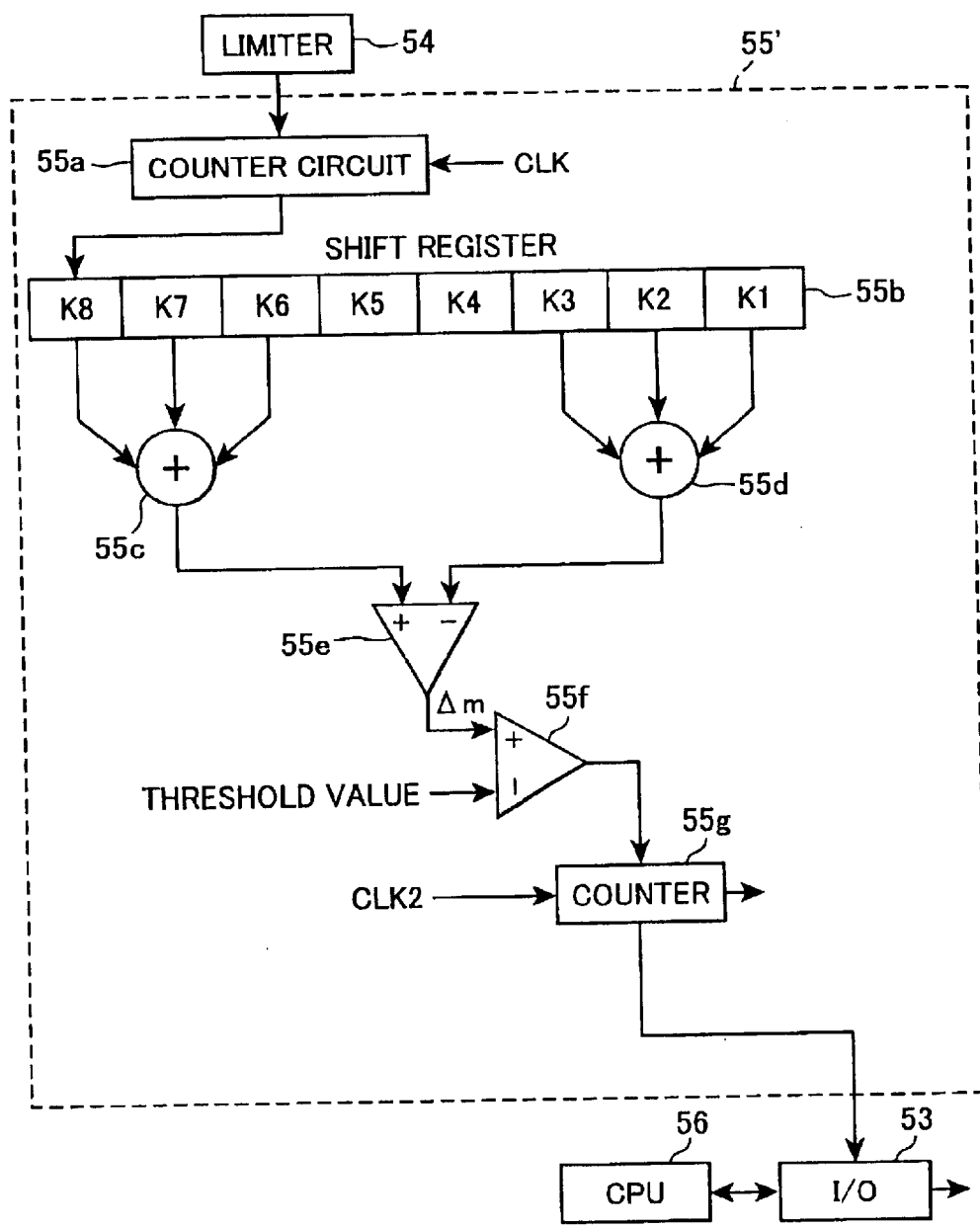
FIG. 22 is a circuit diagram showing electrical configuration of a FSK demodulation circuit 55' according to the second embodiment.

According to the present embodiment, the FSK demodulation circuit 55 in the control portion 50 of the electronic white board 1 is modified as shown in FIG. 22. The FSK demodulation circuit 55 of the present embodiment will be referred to as FSK demodulation circuit 55' hereinafter. According to the present embodiment, as shown in FIG. 22, the FSK demodulation circuit 55' does not have the register 55h or the adding circuit 55i. The counter circuit 55g is directly connected to the I/O circuit 53.

Figures 23A, 23B:
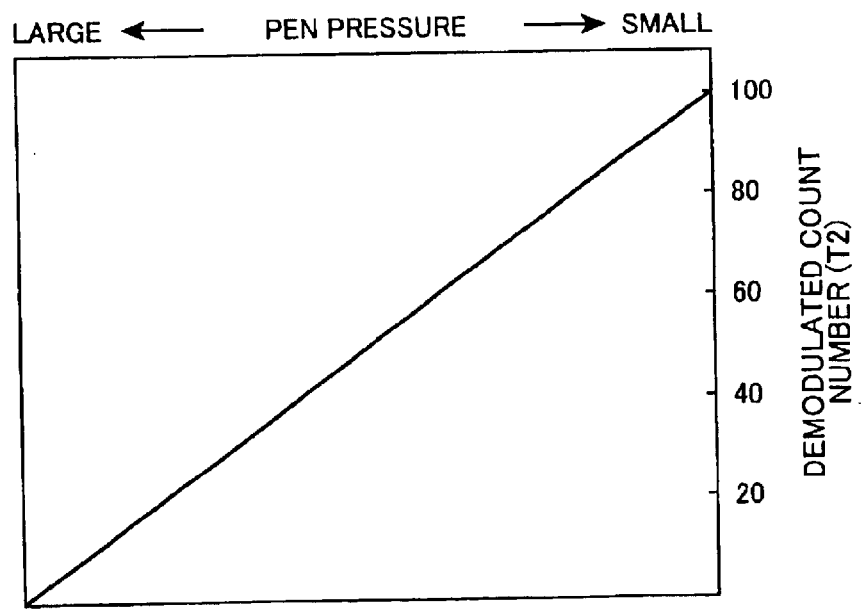
FIG. 23(a) shows the relationship between pen attributes and the first period T1.
FIG. 23(b) shows the relationship between the pen pressure and the second period T2.

The ROM 58 prestores a pen attribute table shown in FIG. 23(a) and a pressure table 58b shown in FIG. 23(b). The pen attribute table of FIG. 23(a) stores data indicative of the relationship between the plurality of different pen attributes and the corresponding time lengths of the first period T1 in terms of the demodulated counted value, counted by the counter 55g. The pressure table 58b stores data indicative of the relationship between pen pressure and the corresponding time lengths of the second period T2 in terms of the demodulated counted value, counted by the counter 55g.

With the above-described structure, the CPU 56 in the electronic white board 1 executes the coordinate reading routine of S300 as shown in FIG. 24. That is, the CPU 56 executes the processes of S302–S314 in the same manner as in the first embodiment (FIG. 17). Then, the CPU 56 executes the process of S316 to read data from the FSK demodulation circuit 55. Then, the CPU 56 executes the pen attribute judgement process of S318 and a pen pressure judgement process of S319, before the storage process of S320.

According to the present embodiment, the FSK demodulation circuit 55' executes operations to detect the lengths of the periods T1 and T2, shown in FIG. 21(a) and 21(b), in a manner described below.

In the same manner as the FSK demodulation circuit 55 of the first embodiment, the FSK demodulation circuit 55' can known the timings of the rising edge and of the lowering edge of the CR signal by detecting the timings when the count value k counted by the counter circuit 55a changes between its larger value and its smaller value. The duration of time when the counter value k is maintained at the larger value corresponds to a half period between the rising edge and the lowering edge of the CR signal. Thus, this half period corresponds to the length of the period T2. By detecting this period, therefore, it is possible to know the pen pressure.

Similarly, the duration of time when the counter value k is maintained at the smaller corresponds to the other half period between the lower edge and the rising edge of the CR signal. Thus, this half period corresponds to the length of the period T1. By detecting this period, it is possible to know the pen attribute.

Figure 25:
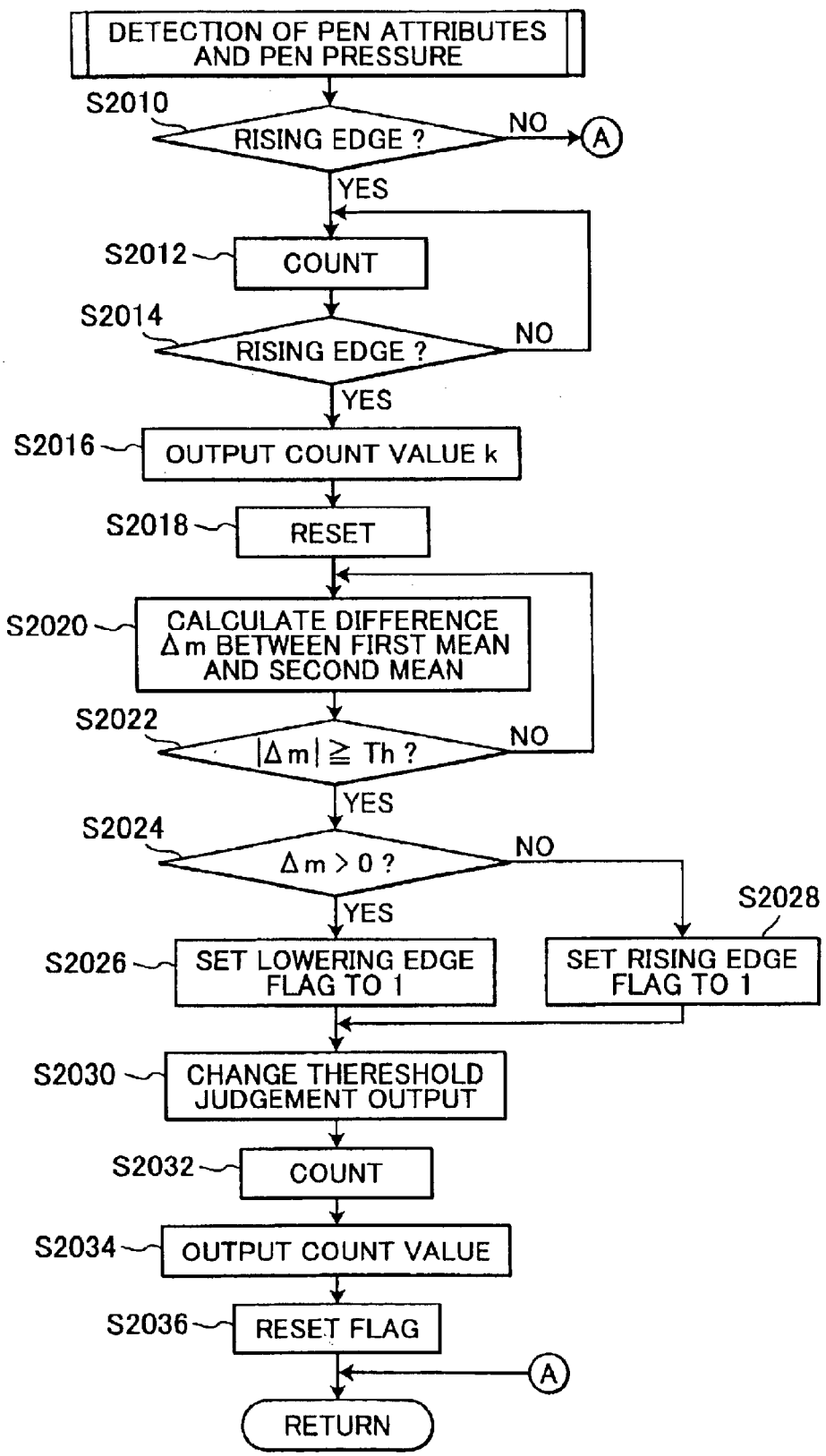
FIG. 25 is a flowchart showing processes of pen attributes and pen pressure detection process performed by the FSK demodulation circuit 55'.

More specifically, the FSK demodulation circuit 55' of the present embodiment operates as shown in FIG. 25.

First, in S2010–S2018, the FSK demodulation circuit 55' executes the same processes with the processes of S10–S18 in FIG. 18(a) in the first embodiment. That is, when the FSK demodulation circuit 55' detects a rising edge of the limiter output signal (S2010,YES), then in S2012, the counter circuit 55a starts counting the number of the system clock (CLK) to measure the period of the limiter output signal. When the next rising edge of the limiter output signals is detected (S2014:YES), then in S2016, the counter value K by the counter circuit 55a is outputted to the shift register 55b. Then, in S2018, the counter value K of the counter circuit 55a is reset. Thus, the counter circuit 55a measures the length TB or TC of a single period of limiter output signal shown in FIG. 13(a).

The thus newly produced counter value K is inputted into the shift resister 55b so that counter values K obtained during eight successive periods are stored in the shift register 55b. Each time the new counter value K is inputted to the shift register 55b, all of the counter values K in the shift register 55b are shifted one position and the oldest counter value K is discarded.

The first average circuit 55c calculates an average from the latest counter value K to the third latest counter value K, and outputs the calculated mean value to the subtraction circuit 55a as the first mean value. The second average calculating circuit 55d calculates an average of the oldest counter value K to the third oldest counter value K, and outputs the calculated mean value to the subtraction circuit 55e as a second mean value.

Next, in S2020, the subtraction circuit 55e calculates the difference Δm between the first mean value and the second mean value, and outputs the difference Δm to the absolute-value comparator 55f. More specifically, the subtraction circuit 55e subtracts the first mean value from the second mean value, and outputs the resultant value Δm to the absolute-value comparator 55f.

Figure 13B:
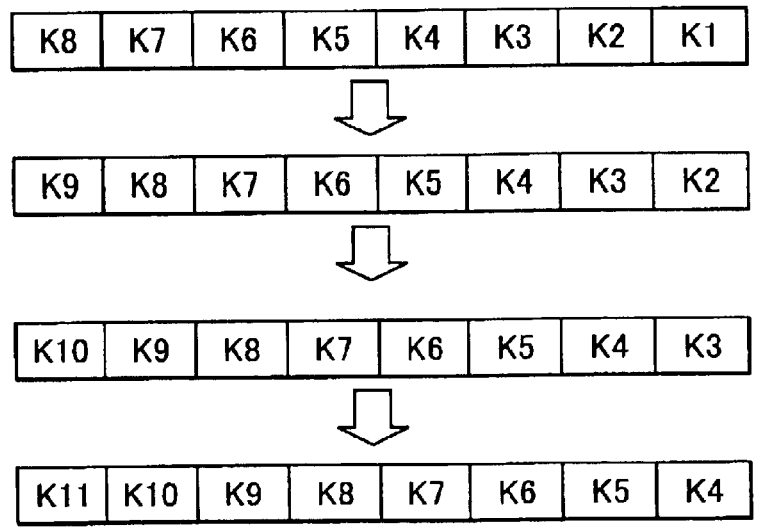
FIG. 13(b) illustrates how the counter values held in the shift register 55b are shifted.

For example, in the first row of FIG. 13(b), the first average circuit 55c calculates the first average value for the counter values k6–k8, while the second average circuit 55d calculates the second average value for the counter values k1–k3. Accordingly, the first average value becomes greater than the second average value. When it is detected that the first average value becomes greater than the second average value, it can be known that the calculation range by the first average circuit 55c and the second average circuit 55d reaches the timing of the rising edge of the CR signal. Similarly, when it is detected that the first average value becomes smaller than the second average value, it can be known that the calculation range by the first average circuit 55c and the second average circuit 55d reaches the timing of the lowering edge of the CR signal.

Then, in S2022, the absolute-value comparator 55f compares the absolute value of the difference Δm with the preset threshold value Th to judge whether or not the absolute value of the difference Δm is equal to or greater than the threshold value Th. If the absolute value of the difference Δm is judged to be greater than or equal to the threshold value Th (S2022:YES), then the program proceeds to S2024.

In S2024, it is determined whether or not the difference Δm calculated in S2020 is a positive value. If the difference Δm is a positive value (S2024:YES), then in S2026, a lowering edge flag is set which shows that this is a lowering edge of the CR signal. On the other hand, when the difference Δm is not a positive value, that is, when it is a negative value (S2024:NO), then in S2028, a rising edge flange is set to show that this is the rising edge of the CR signal.

For example, it is assumed that the counter circuit 55a counts the counter value K of ten (10) for the short period TB of the limiter output signal and counts the counter value K of sixteen (16) for the longer period TC. In the first row of FIG. 13(b), all of the counter values K1 to K6 are ten (10). Therefore, the second mean value is equal to 10 ((K1+K2+K3)/3=10). Also, because the counter value K7 and the counter value K8 are both equal to 16, then the first mean value will be equal to 14 ((K6+K7+K8)/3=42/3=14). Therefore, the difference Δm obtained by the subtraction circuit 55e will be equal to −4 (10−14=−4). Accordingly, the rising edge flag is set in S2028.

Then, in S2030, a threshold value judgement output, to be outputted from the absolute-value comparator 55f, is changed between a low level and a high level. In other words, the absolute-value comparator 55f outputs its detection of the rising edge or the lowering edge of the CR signal, i.e., the timing when the period of the limitter signal has changed.

In the present example, the absolute value of the difference Δm (=4) is greater than the threshold value Th (=2), and the threshold value judgement output changes from the low level to the high level in S2030.

When the calculation range by the first average circuit 55c and the second average circuit 55d is shifted from the edge timing of the CR signal and reaches the timing when the period of the limiter output signal is fixed, both the average calculating circuits 55c, 55d will calculate average values for the counter values K from the same periods. Therefore, the subtraction results by the subtraction circuit 55e will be equal to zero (0) (no in S2022). In this case, the threshold value judgement output from the absolute-value comparator 55f will be continued unchanged as shown in FIG. 15.

Next, in S2032, the counter 55g uses the system clock (CLK2) to count an interval, which is how long the judgement output from the absolute value comparator 55f is at the present level (high level in this example). Next in S2034, the counter 55g outputs the count value together with the flag data set in S2026 or S2028 to the CPU 56 through the input/output circuit 53. In S2036, the flag that has been set in S2026 or S2028 is reset in S2036.

Accordingly, the CPU 56 receives the counter value data and the flag data in S316 of FIG. 24. Then, in S318 and S320, the CPU 56 judges the pen attributes and the pen pressure based on the count value and the flag data. For example, if the counter 55g first outputs flag data of a lowering edge flag, and then subsequently outputs flag data of a rising edge flag, then the CPU 56 judges that the counter value inputted between these two sets of flag data represents the period T1 of the CR signal shown in FIG. 21. The period T1 indicates pen attributes. For example, when the count value is 245, the CPU 56 judges that pen has a thick tip and holds black ink, while referring to the table of FIG. 23(a).

The CPU 56 also uses the received count value and flag data to judge pen pressure in S319. For example, when the flag data inputted first from the counter 55g is for a rising edge flag, and the subsequently inputted flag data is for a lowering edge flag, then the count value inputted between these two sets of flag data represents the period T2 of the CR signal as shown in FIG. 21. The period T2 indicates pen pressure. The CPU 56 therefore refers to the pen pressure table of FIG. 23(b), and determines the amount of the pen pressure that is stored in correspondence with the detected count value.

Next, in S320, the CPU 56 stores pen attributes, pen pressure, and the X/Y coordinates in association in a predetermined memory region of the RAM 59. The written data thus stored in this form can either be outputted to the printer 200 and printed out on a sheet, or outputted to the personal computer 100 and displayed on the monitor 103. In the above-described example, thick black characters or symbols are displayed or printed out, with a density that corresponds to the detected pen pressure. Thus, the written data is reproduced with the detected attributes of the pen 60 and in the detected pen pressure.

As described above, according to the present embodiment, the period T1, which is how long the carrier signal is at the first (high) frequency f1 after changing from the second (low) frequency f2, differs depending on the attributes of the pen 60. Moreover, the electronic white board 1 measures the period T1 using the system clock, and detects attributes based on the measured value. Therefore, it is possible to discriminate between different values of the period T1 if the difference in the values of the period T1 is equal to or greater than at least a single period of the system clock. Accordingly, a great number of attributes can be discriminated by setting a great number of different values for the period T1.

Also, the period T2, which is how long the carrier signal is at the second (low) frequency f2 after changing from the first (high) frequency f1, changes in accordance with pen pressure of the pen 60. Moreover, the electronic white board 1 uses the system clock to measure the period T2 in the same manner as it uses the system clock to measure the period T1. Accordingly, when the pen pressure changes gradually, the value of the period T2 also gradually changes in accordance with the change in the pen pressure. Even in this case, the amount of the consecutive change in the length of the period T2 can be detected at a resolution that corresponds to the system clock.

Next, a modification of the present embodiment will be described while referring to FIGS. 26(a) to 26(d).

According to this modification, not only the time lengths of T1 and T2 of the CR signal but also the duty ratio of the CR signal can be changed. For example, as shown in FIGS. 26(b) and 26(c), the time length of a single period T(=T1+T2) can be set dependently on the attribute of the pen, and the duty ratio (T1/T) can change according to the pen pressure.

Figure 26A:
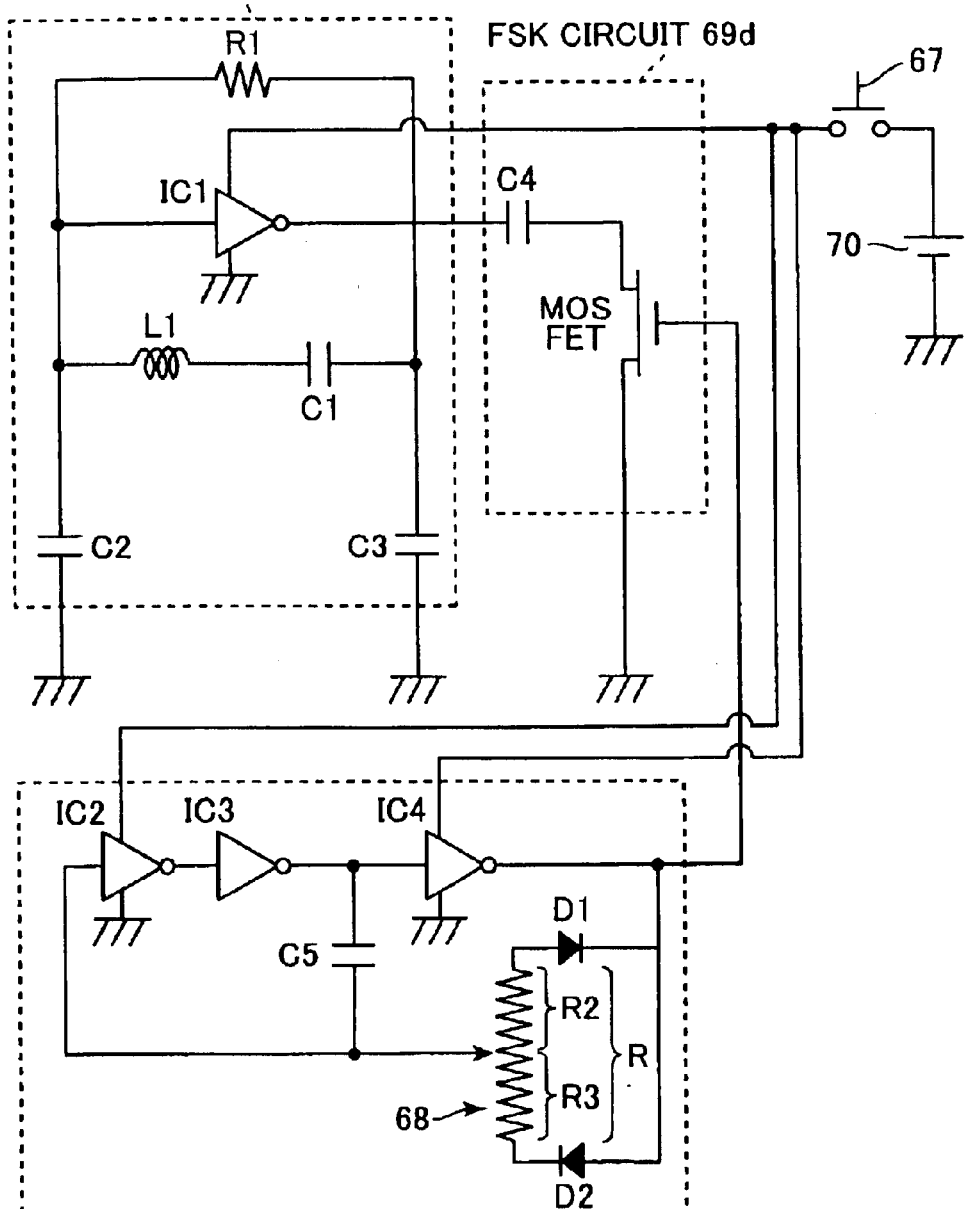
FIG. 26(a) is a circuit diagram showing electric configuration of the pen 60 according to a modification of the second embodiment.
Figure 26B:
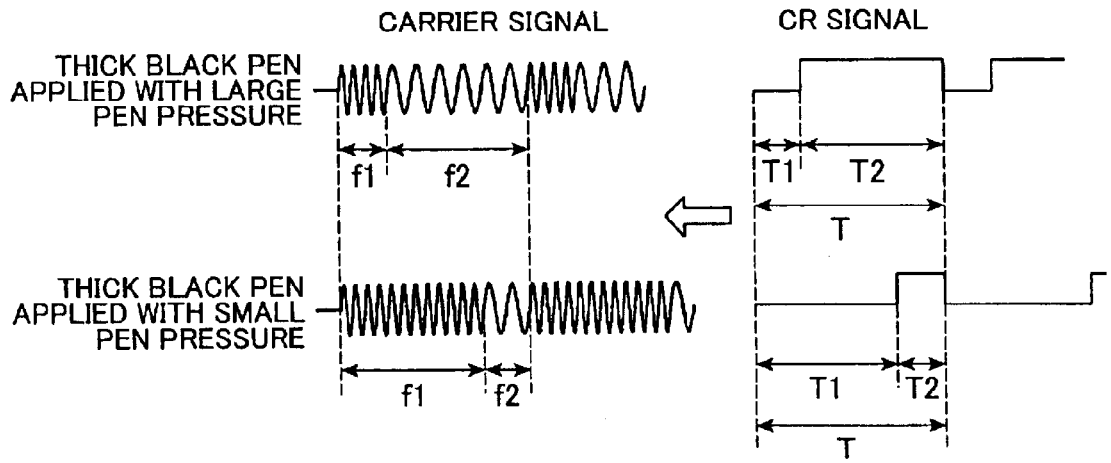
FIGS. 26(b) and 26(c) are timing charts showing a carrier signal and a CR signal generated in the pen of FIG. 26(a), wherein FIG. 26(b) are timing charts showing the carrier signal and the CR signal when a thick black pen is used to write with a large pen pressure and with a small pen pressure.
Figure 26C:
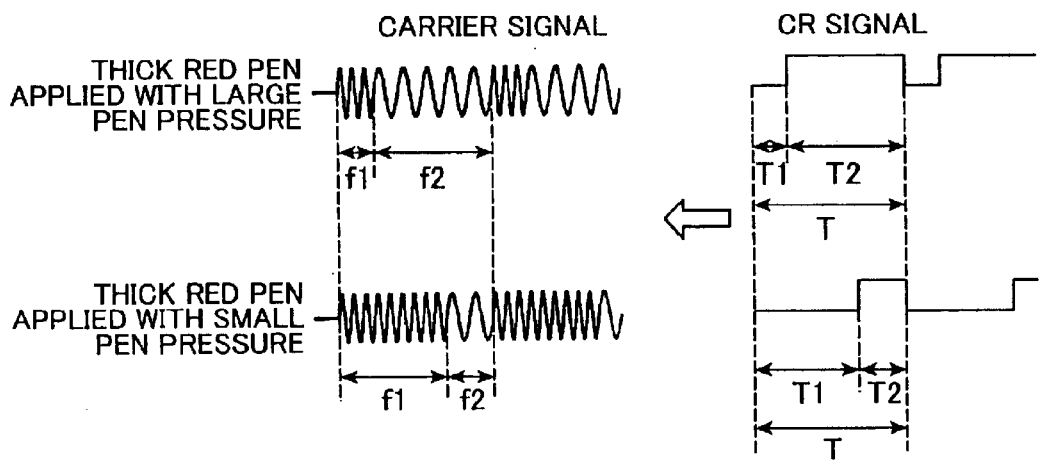

More specifically, according to this modification, the CR oscillation circuit 69a is constructed as shown in FIG. 26(a). According to this modification, the pressure sensor 68 (shown in FIG. 20(a)) is constructed from: a resistor R (a pair of variable resistors R2 and R3), and a spring or other member (not shown), which is provided for changing the position of the contact point between the capacitor C5 and the resistor R, according to the amount of the pressure applied from the ink cartridge 63 against the pressure sensor 68. Thus, the pressure sensor 68 changes the position of the separating point between the resistors R2 and R3, according to the amount of the pen pressure. Therefore, according to the pen pressure, the lengths of the resistors R2 and R3 are changed, while the total length of the resistors R2 and R3 (length of R) are maintained as being fixed.

Because the sum of the resistances of the variable resistors R2 and R3 is thus set as being fixed, the duty ratio D(=T1/T) and the time length of the single period T (=T1+T2) of the CR signal can be determined as follows:

$D = R3/(R2+R3)$.

$T = 0.69 \times C5 \times (R2+R3)$.

According to the present modification, therefore, the capacitance of the capacitor C5 is set differently for the different pen attribute. As a result, the time length of the period T is set different for the different pen attribute. According to the present modification, data of the time length of the period T, thus set for each pen attribute, is prestored in the same manner as in FIG. 6(d) of the first embodiment.

When the pressure of the pen 60 against the writing surface 21a changes, the resistance of the resistors R2 and R3 change while maintaining their sum value. As a result, the duty ratio D changes. According to this modification, data of the duty ratio D in correspondence with various amounts of the pen pressure is also stored in the same manner as in FIG. 23(b) of the present embodiment.

Thus, according to the present modification, the pen attribute information is indicated by the period T, that is, the sum of the periods T1 and T2. The period T corresponds to the modulation frequency fm. The pen pressure is indicated by the duty ratio D of (T1/T). Accordingly, the FSK demodulation circuit 55' (FIG. 22), provided in the electronic white board 1, uses the system clock to measure the periods T1 and T2 in the same manner as described above in the present embodiment. In S318, the CPU 56 calculates the sum of the periods T1 and T2, to thereby determine the period T. Then, the CPU 56 determines the pen attribute based on the determined period T. In S319, the CPU 56 calculates the duty ratio T1/T, to thereby determine the pen pressure.

According to this modification, in the same manner as described already in the present embodiment, the modulation frequency fm (period T) of the carrier signal is set different for each pen attribute. Moreover, the electronic white board 1 uses the system clock to measure the period T (modulation frequency fm), and so can detect pen attribute based on the measured period T. Therefore, if the difference in period T is equal to or less than at least one period of the system clock, the pen attributes can be detected. Therefore, an extremely large number of attributes can be set.

Additionally, the duty ratio (T1/T) is changed in accordance with pen pressure. Moreover, the duty ratio T1/T can be measured by the system clock in the same manner as the period T. Therefore, even if pen pressure gradually changes, the amount of these gradual changes can be detected using the duty ratio, at a resolution that corresponds to the system clock.

In addition to the pen attributes as to ink color and the thickness of the pen tip, an ID number for distinguishing the user of the pen can also be set as an additional attribute for each pen.

Also, a piezoelectric element could be used as the pen pressure sensor 68, instead of the pressure sensor shown in FIG. 20(c).

Figure 26D:
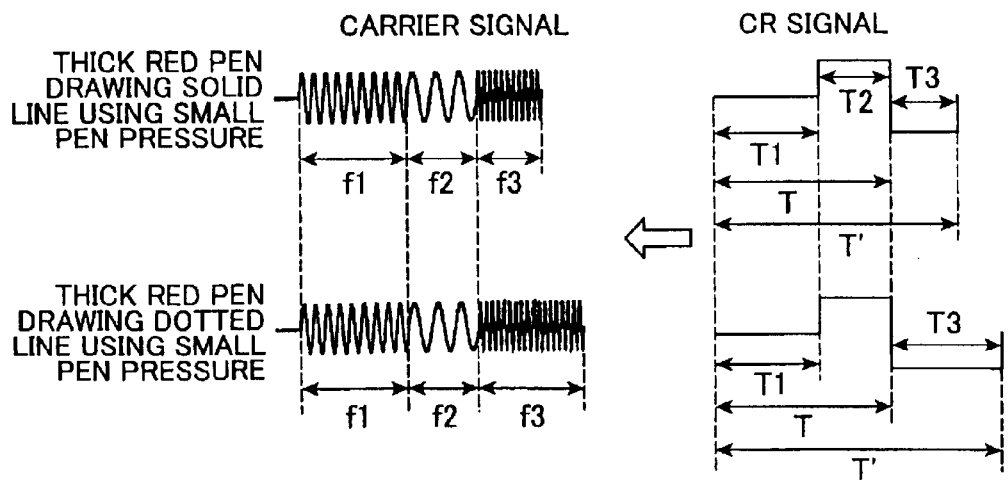
FIG. 26(d) are timing charts, according to another modification of the second embodiment, showing the carrier signal and the CR signal when a thick red pen is used to write a solid line and a dotted line with a large pen pressure and a small pen pressure.

In the above description, the carrier signal is modulated in two frequencies f1, f2. However, the carrier signal can be modulated into three or more different frequencies. For example, as shown in FIG. 26(d), each of three different characteristics, such as: (1) ink color and pen tip thickness, (2) pen pressure, and (3) the character of a line (solid line or broken line) drawn by the pen, can be distinguished by changing the time durations T1, T2, and T3 where the frequency is maintained at first, second and third frequencies f1–f3. In this case, the CR signal should be generated as a multi-value signal with a plurality of different amplitudes. With this configuration, a great number of different kinds of information can be efficiently transmitted to the electronic white board 1. A great number of different kinds of information can be efficiently designated by the time lengths and the duty ratios.

As described above, according to the present embodiment, as shown in FIG. 21, the signal is frequency-shift-keying modulated at first frequency f1 for the period of T1 and is frequency-shift-keying modulated at second frequency f2 for the period of T2. The period T1 is set different for different attributes, such as thickness of the pen tip and color of ink of the pen 60. For example, a thick black pen, that is, its pen tip 62 is thick and the color of the ink is black, is set for the period T1 of 0.24 mS. A thick red pen is set with a period T1 of 0.13 mS.

The FSK demodulation circuit 55', provided in the electronic white board 1, uses the system clock to measure the period T1 of the signal transmitted from the pen 60. The CPU 56 detects the attributes of the pen 60 based on the measured values. Accordingly, the total number of attributes capable of being transmitted is not limited to the frequency bands that can be transmitted and received, so a great number of attributes can be set.

The length of the period T2 changes depending on pressure placed on the tip of the pen 60. Because the period T2 can be measured using the system clock of the electronic white board 1 in the same manner as the period T1, even if the length of the period T2 consecutively changes in accordance with pen pressure, the consecutively-changing amount can be accurately detected. Accordingly, the pen pressure that consecutively changes can be detected. Thus, according to the present embodiment, various intervals at which the frequency changes can be employed in correspondence with various types of information. In this way, the pen or coordinate input device can transmit information indicating a variety of attributers and consecutively-changing amounts to the coordinate reading device.

In the modification shown in FIGS. 26(a) to 26(c), the duty ratio (T1/T) is differentiated according to the pen pressure of the pen 60, wherein T1 is the period wherein the frequency of the frequency-shift-keying modulated signal is at the first frequency f1, and T is the interval from the time when the frequency of the frequency-shift-keying modulated signal changes into the first frequency f1, through the time when the frequency changes into the second frequency f2, until the time when the frequency changes back to the first frequency f1.

The FSK demodulation circuit 55' uses the system clock to measure the periods T1 and T (sum or T1 and T2) of the signal transmitted from the pen 60. The CPU 56 calculates the duty ratio (T1/T) based on the measured values. The pen pressure is determined based on the duty ratio. Accordingly, the pen pressure can be detected even if the pen pressure consecutively changes. By outputting the FSK modulated signal by a corresponding duty ratio, the coordinate input device is capable of transmitting information on a consecutively-changing amount.

In this case, the period T is set different for different attributes of the pen, such as the color of the ink and a thickness of the pen tip. For example, a thick black pen is set to 4.1 kHz and a thick red pen in set to 7.7 kHz. The FSK demodulation circuit 55' uses the system clock to measure the period T. The CPU 56 detects attributes of the pen 60 based on the measured values. Accordingly, a great number of attributes can be set without any restriction by the frequency bands that can be transmitted and received.

<Third Embodiment>

A third embodiment will be described below with reference to FIGS. 27(a)–32(d).

The electronic white board 1 of the present embodiment is the same as that of the first embodiment except for the points described below.

Figure 27A:
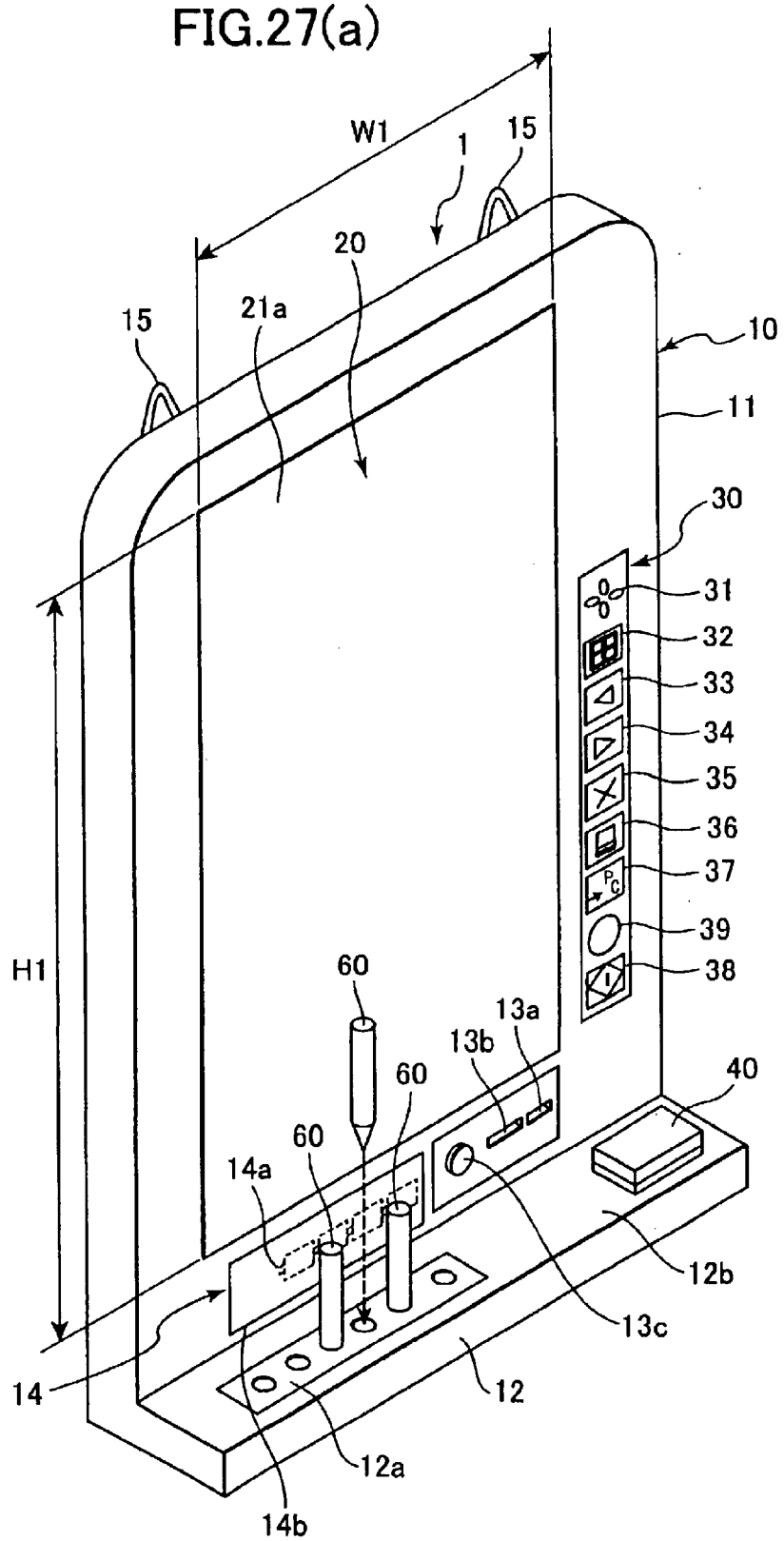
FIG. 27(a) is an external perspective view illustrating an essential configuration of an electronic white board according to a third embodiment of the present invention.
Figure 27B:
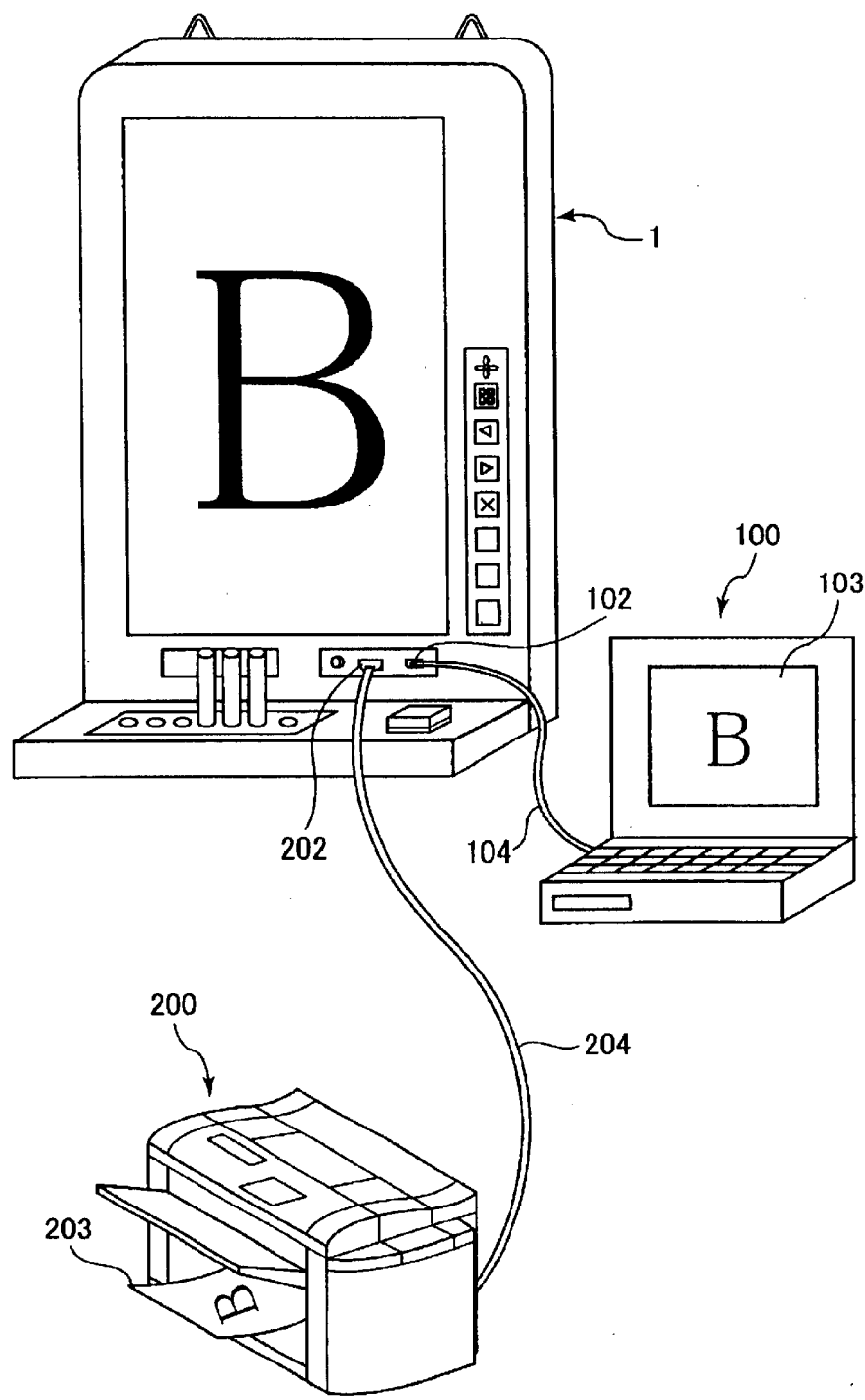
FIG. 27(b) is an illustration showing the electronic white board of FIG. 27(a) being electrically connected to a personal computer (PC) and a printer.

According to the present embodiment, as shown in FIGS. 27(a) and 27(b), several holes or concaves 12a are formed in the upper surface of the stand 12 for supporting several pens 60.

Figure 28A:
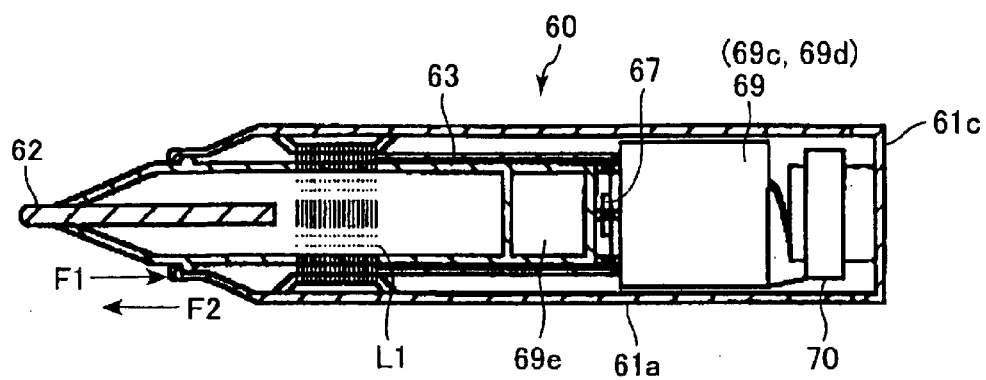
FIG. 28(a) is a cross-sectional view showing internal configuration of the pen 60 according to the third embodiment.
Figure 28B:
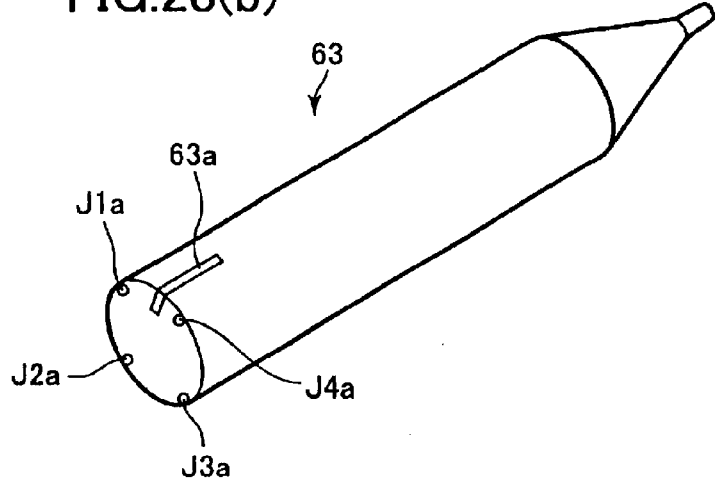
FIG. 28(b) is a perspective view showing the ink cartridge 63 from its rear side.
Figure 28C:
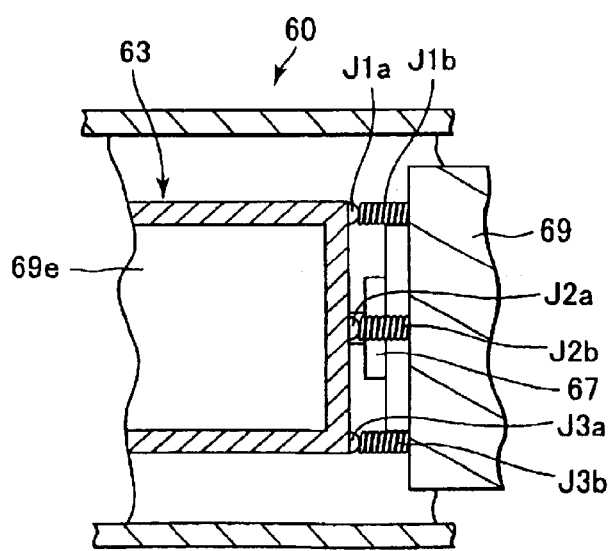
FIG. 28(c) illustrates a connection between the ink cartridge and a circuit board 69.
Figure 28D:
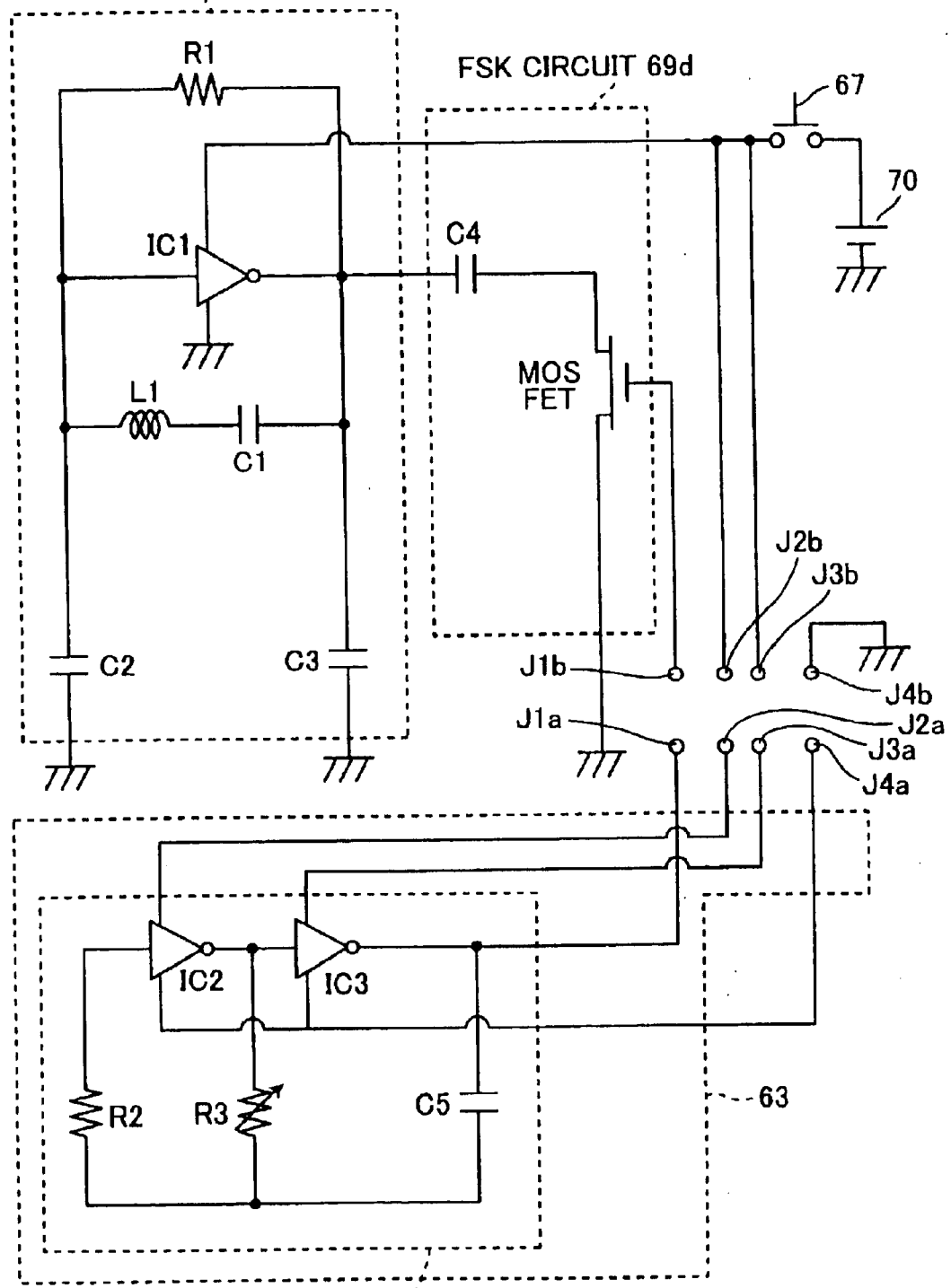
FIG. 28(d) is a circuit diagram showing electric configuration of the pen 60.

According to the present embodiment, as shown in FIG. 28(a), the CR oscillation circuit 69e is not disposed on the circuit board 69, but is disposed in the rear portion of the ink cartridge 63. More specifically, as shown in FIG. 28(d), the CR oscillation circuit 69e is mounted in the ink cartridge 63 The CR oscillation circuit 69e is for generating the CR signal with a modulation frequency fm that depends on the pen attribute, such as ink color and pen tip thickness. The LC circuit 69c and the FSK circuit 69d are provided on the circuit board 69 that is mounted inside the cylindrical body portion 61a.

As shown in FIG. 28(d), a plurality of contact points J1a, J2a, J3a, J4a are provided in the CR oscillation circuit 69e. The plurality of contact points J1a, J2a, J3a, J4a are exposed on the outer surface of the ink cartridge 63 as shown in FIGS. 28(b) and 28(c). As shown in FIG. 28(d), the circuit board 69 is provided with a plurality of contact points J1b to J4b. The contact points J1a to J4a in the ink cartridge 63 side are for establishing an electrical connection with corresponding ones of the contact points J1b to J4b provided on the circuit board 69.

More specifically, as shown in FIG. 28(b), the contact points J1a to J4a are provided at four positions on the outer peripheral end edge at the rear side of the ink cartridge 63. A groove 63a is provided also on the rear side of the ink cartridge 63. The groove 63a is for regulating the posture of the ink cartridge 63 relative to the cylindrical body portion 61a, so that the contact points J1a to J4a properly connect with the contact points J1b to J4b provided on the circuit board 69 in the cylindrical body portion 61a.

As shown in FIG. 28(c), each of the contact points J1b to J4b is provided with a coil spring that is for pressing, with resilient force, against the corresponding one of the contact points J1a to J4a. With this configuration, the contact points J1a to J4a will be maintained in stable contact with the contact points J1b to J4b, even while the user draws or writes on the electronic white board 1 so that the ink cartridge 63 moves in the direction F1 and the button switch 67 is pressed.

As described already in the first embodiment, the modulation frequency fm, identifying the ink color and the line thickness (pen tip thickness), is determined by the condenser C5 and the resistor R3 in the CR oscillation circuit 69e. Accordingly, when the ink cartridge 63 is exchanged for a different one, the capacitor C5 and the resistor R3 of the CR oscillation circuit 69e are also automatically exchanged. As a result, the modulation frequency fm that indicates the line thickness produced by the type of pen tip 62, and that also indicates the color of ink stored in the ink cartridge 63, will also be exchanged.

Thus, when the ink cartridge 63 is exchanged, then the coil L1 will generate an ID signal (carrier wave) with a modulation frequency fm being automatically designated by the CR oscillation circuit 69e in the new ink cartridge 63. The electronic white board 1 will receive the ID signal, and will be able to recognize line color, thickness, and other attributes of the pen according to the modulation frequency fm of the ID signal.

As described above, according to the present embodiment, the pen 60 is provided with the cylindrical body portion (case portion) 61a. The coil L1, the ink cartridge 63, the circuit board 69, the switch 67, and the battery 70 are mounted inside the cylindrical body portion 61a. The ink cartridge 63 is detachably mounted to the case portion 62a so as to be capable of being taken away from the case portion 61a in the direction indicated by the arrow F2. The circuit board 69 is provided with the oscillation circuit for oscillating the coil L1. The switch 67 is of the pressing button type. When the pen 60 is used to write letters or characters on the writing surface 21a, the coil L1 generates an alternating magnetic field, whereby the electronic white board 1 detects the position of the pen 60. The ink cartridge 63 is provided with the CR oscillation circuit 69e that oscillates a modulation frequency fm to indicate the color and thickness of the pen 60. When the ink cartridge 63 is replaced with a new one, the CR oscillation circuit 69e is also changed with a new one, and oscillates a modulation frequency fm that properly corresponds to the color and thickness of a line to be written by the new ink cartridge 63.

Accordingly, a desired one of a plurality of ink cartridges 63 with different color and thickness can be simply mounted to the single body portion 61a in single action. Further, because the CR oscillation circuit 69e, which determines modulation frequency fm that enables the electronic white board 1 to determine attributes, such as ink color and thickness, is provided to the ink cartridge 63 itself, the patterns and characters drawn on the writing surface 21a will always match the data produced in the electronic white board 1. Because all the circuit elements other than the CR oscillation circuit 69e are used commonly for all the ink cartridges 63, the costs for producing the pen 60 can be kept low.

Various modifications of the present embodiment will be described below.

Because the modulation frequency fm of the ID signal, which represents line thickness and ink color of the ink cartridge 63, is determined by the capacitor C5 and the resistor R3 of the CR oscillation circuit 69e, the modulation frequency fm will change when the capacitor C5, the resister R3, or any combination of these is changed. Therefore, instead of mounting the entire CR oscillation circuit 69e in the ink cartridge 63, only one of or any combination of the capacitor C5 and the resistor R3 may be disposed in the ink cartridge 63.

For example, only the capacitor C5 may be disposed in the ink cartridge 63, but the remaining portion of the CR oscillation circuit 69e can be disposed on the circuit board 69.

Or, only the resister R3 may be disposed in the ink cartridge 63, but the remaining portion of the CR oscillation circuit 69e can be disposed on the circuit board 69. In this case, both of the resisters R2 and R3 may be disposed in the ink cartridge 63, but the remaining portion of the CR oscillation circuit 69e can be disposed on the circuit board 69. Or, all of the condenser C5 and the resisters R2 and R3 may be disposed in the ink cartridge 63, but the remaining portion of the CR oscillation circuit 69e can be disposed on the circuit board 69.

Or, the entire circuit board 69 may be disposed in the ink cartridge 63, but a remaining portion of the entire circuitry, including the battery 70, may be disposed in the cylindrical body 61a. The battery 70 could also be provided internally in the ink cartridge 63.

Thus, any desired one of the circuit elements, including the power source (battery) 70, and the circuit portions, such as the coil L1, the CR oscillation circuit 69e, the LC oscillation circuit 69c, and the FSK circuit 69d, may be disposed in the ink cartridge 63, while a remaining portion of the entire circuitry being disposed in the cylindrical body portion 61a.

Figure 29A:
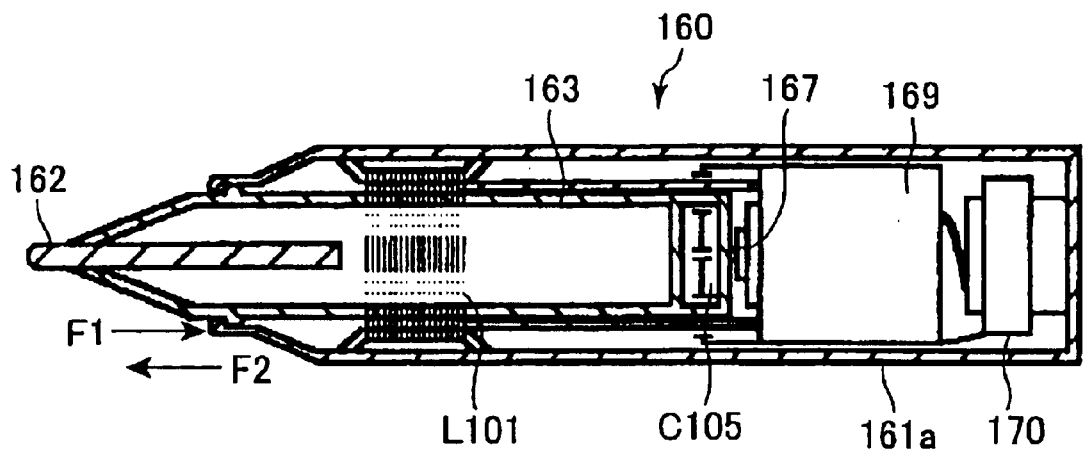
FIG. 29(a) is a cross-sectional view showing internal configuration of a pen 160 according to a first modification of the third embodiment.
Figure 29B:
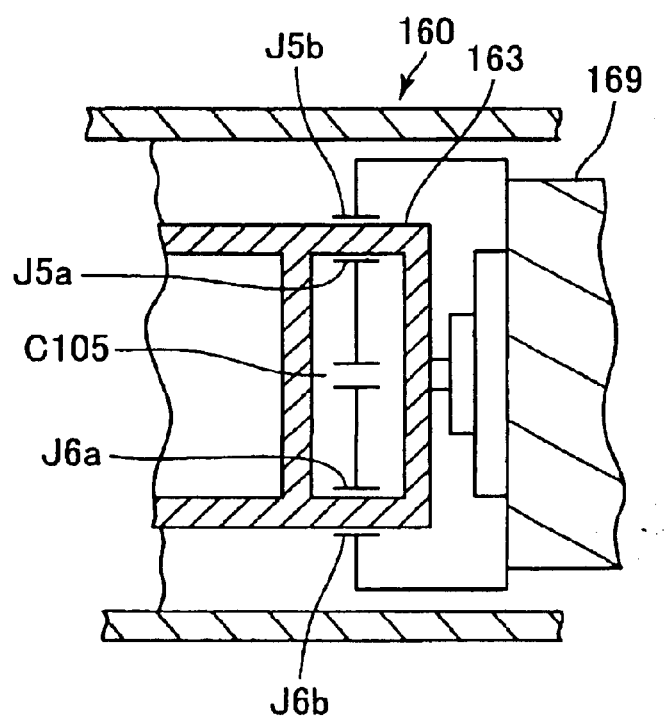
FIG. 29(b) illustrates a connection between the ink cartridge and a circuit board 169 according to the first modification.
Figure 30A:
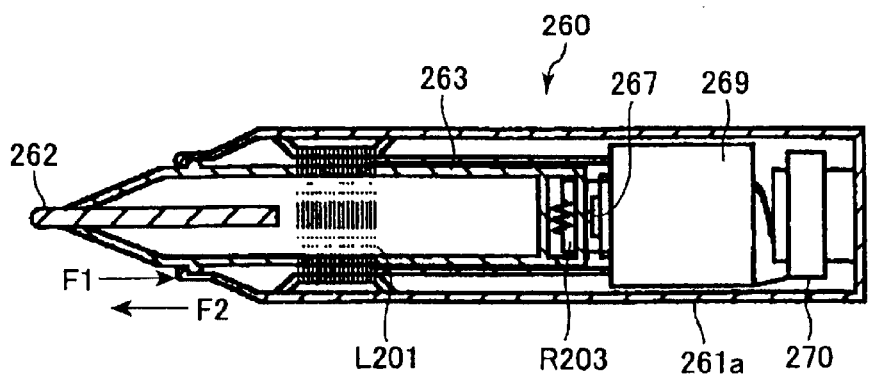
FIG. 30(a) is a cross-sectional view showing internal configuration of a pen 260 according to a second modification of the third embodiment.
Figure 30B:
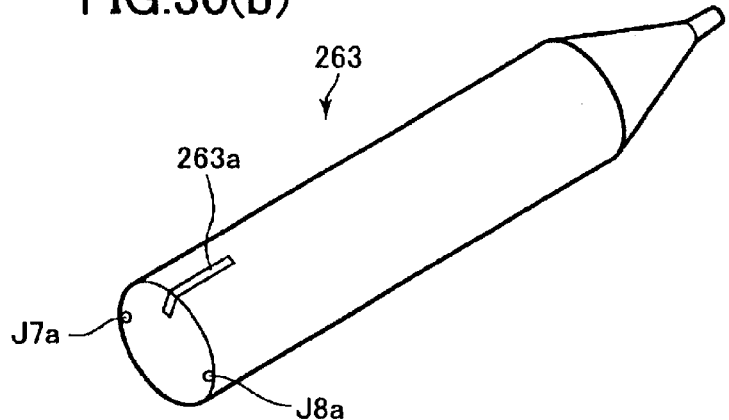
FIG. 30(b) is a perspective view showing the ink cartridge 263 from its rear side.
Figure 30C:
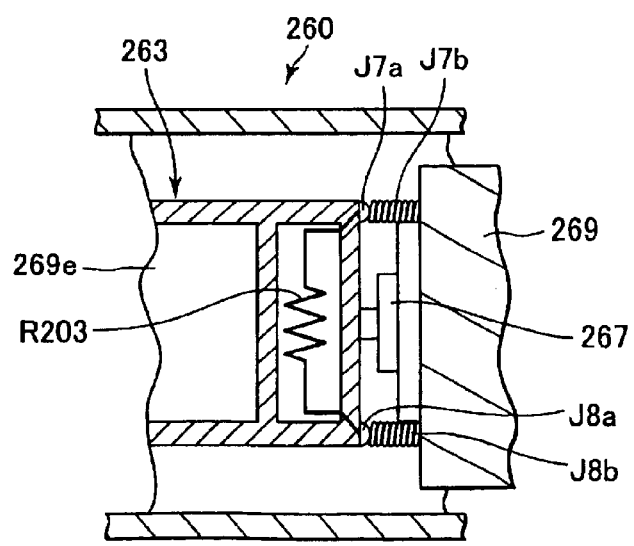
FIG. 30(c) illustrates a connection between the ink cartridge and a circuit board 269 according to the second modification.
Figure 30D:
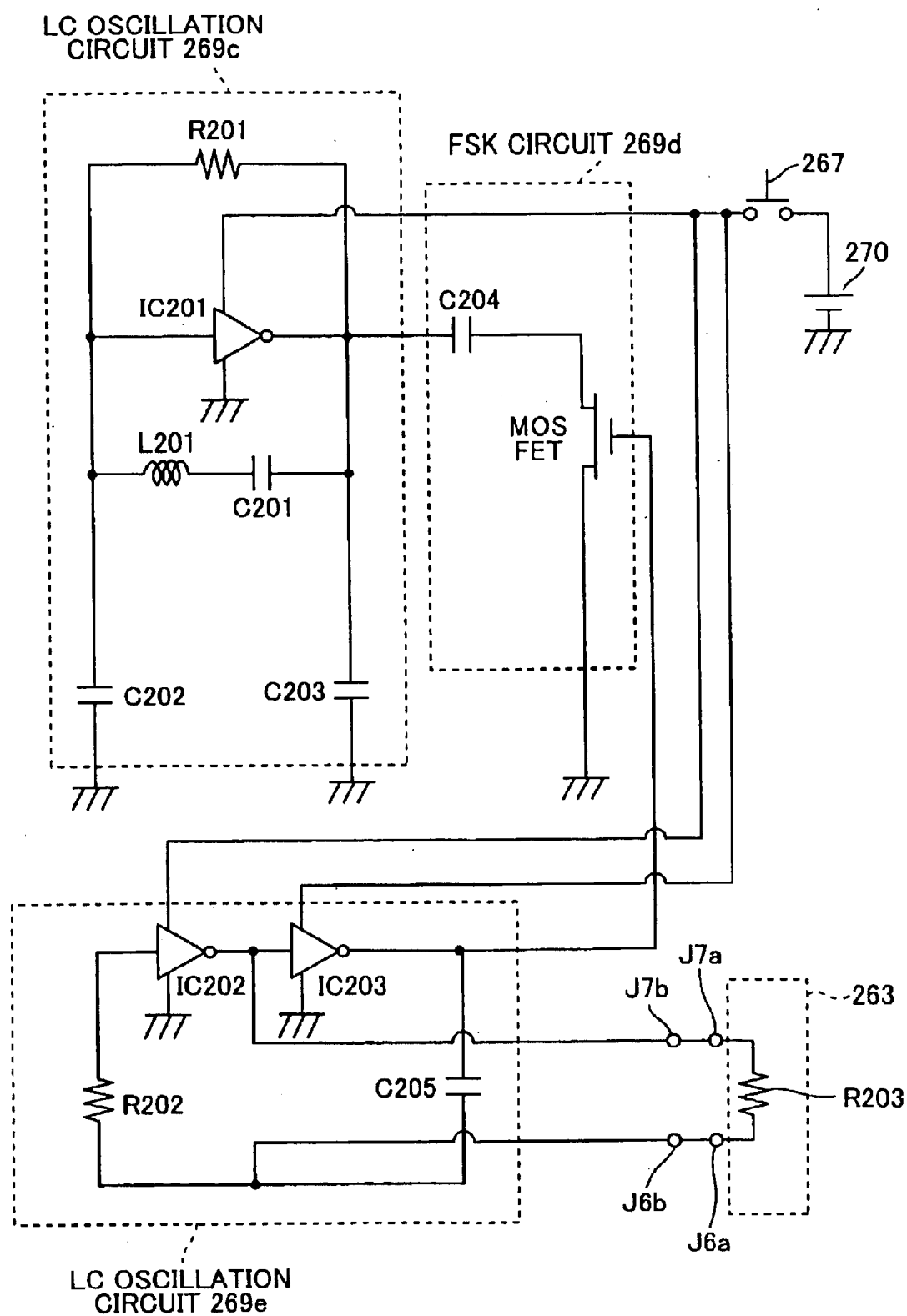
FIG. 30(d) is a circuit board showing electric configuration of the pen 260 according to the second modification.

For example, according to a first modification shown in FIGS. 29(*a*)–29(*c*), a pen 160 is provided with an ink cartridge 163. A capacitor C105 is mounted in the ink cartridge 163. A remaining part of a CR oscillation circuit 169e is mounted on a circuit board 169, which is mounted in the cylindrical body portion 161a.

As shown in FIGS. 29(*b*) and 29(*c*), the ink cartridge 163 includes a pair of connection points J5a and J6a, and the circuit board 169 includes connection points J5b, J6b. When the ink cartridge 163 is mounted in the cylindrical body portion 161a, the connection point J5a of the ink cartridge 163 is located in non-contacting confrontation with the connection point J5b of the circuit board 169. The connection point J6a of the ink cartridge 163 is arranged in non-contacting confrontation with the contact point J6b of the circuit board 169. All of the connection points J5a, J5b, J6a, J6b are formed from thin metal plates. A dielectric body, that is, air and the wall of the ink cartridge 163 (resin), is interposed in the space between the confronting non-contacting connection points. Accordingly, the portion between the thus confronting non-contacting connection points function as capacitors. For this reason, by setting the total capacitance from the connection points J5b to J6b, including the capacitor C105, to a desired value, a desired modulation frequency fm can be generated by the non-contact connections.

As described above, according to this modification, the pen 160 has the ink cartridge 163 with the capacitor C105 for signal modulation. Therefore, there is no danger that the electronic white board 1 will erroneously recognize the attribute of the pen. In particular, because the modulation frequency fm can be set using this limited configuration, running costs in association with exchanging ink can be kept low. In addition to this, because this is achieved with a non-contacting configuration, configuration is simplified, production costs are reduced, and problems resulting from poor contact can be avoided.

A second modification of the pen structure will be described below.

As shown in FIGS. 30(*a*)–30(*d*), a pen 260 is provided with an ink cartridge 263. A resistor R203 is mounted in the ink cartridge 263. A remaining part of a CR oscillation circuit 269e is mounted on a circuit board 269, which is mounted in the cylindrical body portion 261a. More specifically, the resister R203 is disposed in the rear portion of the ink cartridge 263. A pair of contact points J7a, J8a are provided on the ink cartridge 263 in connection with the resister R203. A pair of contact points J7b, J8b are provided on the circuit board 269 so as to be electrically connected with the contact points J7a, J8a.

As shown in FIG. 30(*b*), the contact points J7a, J8a are provided at opposing peripheral edges on the rear surface of the ink cartridge 263. A groove 263a is provided for regulating position of the ink cartridge 263 in the pen 260, so that the contact points J7a, J8a will properly contact with the contact points J7b, J8b. As shown in FIG. 30(*o*), the contact points J7b, J8b are provided with coil springs, and abut against the contact points J7a, J8a with resilient force. Therefore, even if the ink cartridge 263 is moved in direction F1 so that the button switch 267 is pressed, the contact points J7a, J8a will stably contact the contact points J7b, J8b.

It should be noted that both the resisters R203 and R202 could be provided in the ink cartridge 263.

As described above, the ink cartridge 263 is provided with the resister R203 for modulating the signals. Therefore, a modulation frequency fm that properly matches the color of ink and thickness of the pen tip can be generated and transmitted to the electronic white board 1. In particular, this is accomplished using the relatively simple and inexpensive configuration of the resister R203 so running costs relating to exchange of ink can be kept low.

Still another modification will be described with reference to FIGS. 31(*a*)–31(*b*).

In the above description, the battery 70, which is disposed to the rear of the circuit board 69, is a dry battery. Representative examples of the dry battery are: a button shaped mercury cell, a manganese cell, and alkaline-manganese cell. Instead, a rechargeable battery can be used as the battery 70. A representative example of the rechargeable battery is a chargeable polymer battery, which employs a conductive macromolecule, added with a plasticizer, as an electrolyte of a lithium ion secondary battery. When such a chargeable battery is employed, then the battery can be formed in a very thin shape.

A pen 360 according to this modification is the same as the pen 60 of the present embodiment (FIG. 28) except that a chargeable battery 370 is mounted in the pen 360. In this case, a battery charge unit 300 is used to charge the chargeable battery. The battery charger 300 is preferably provided to the stand 12 of the electric black board 1. For example, the battery charge unit 300 may be provided inside each hole 12a. The battery charge unit 300 charges the chargeable battery 370 in the pen 360 using the function of a coil L301 that is disposed in the pen 360 near to its pen tip 362.

Figure 31A:
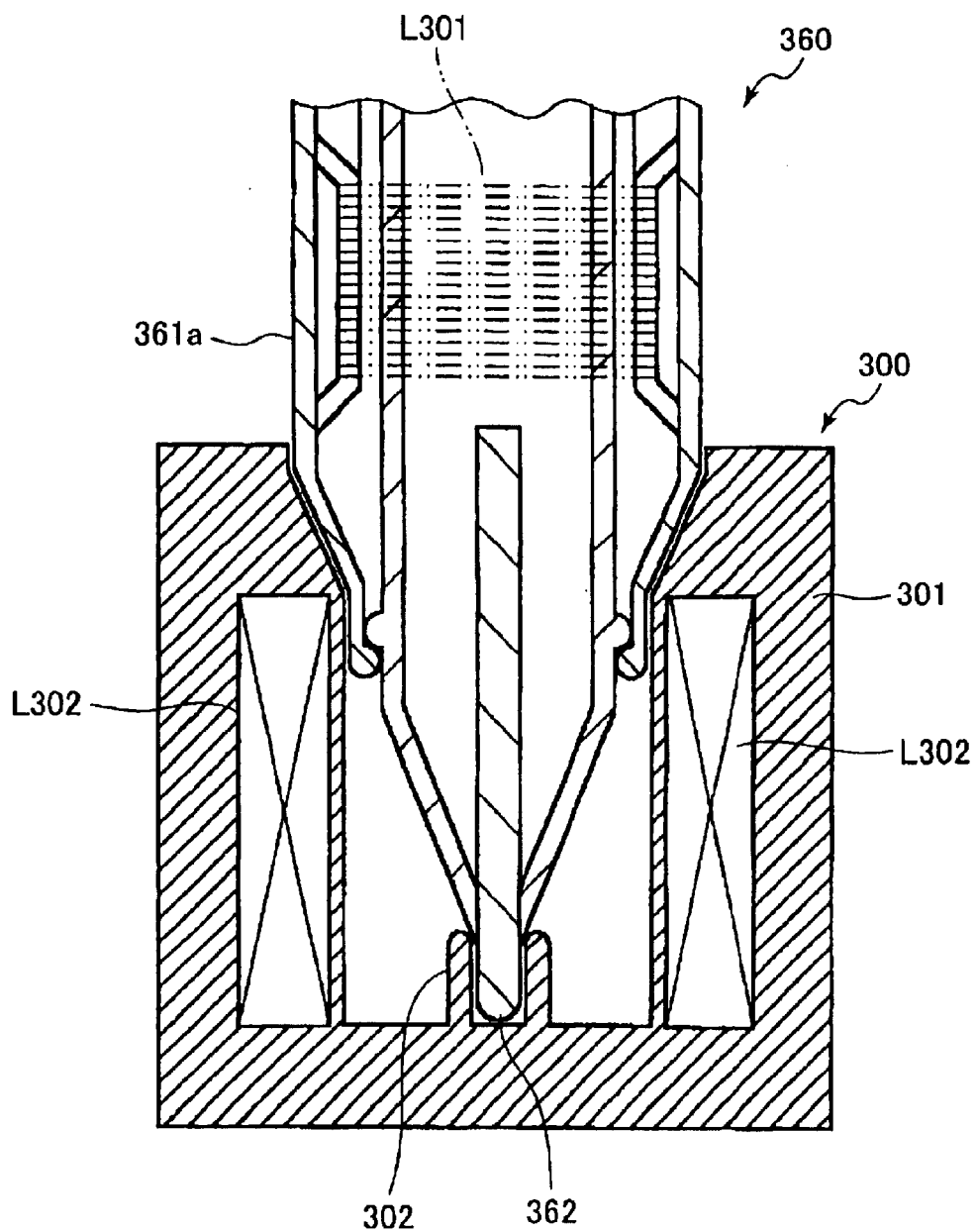
FIG. 31(a) is a partial cross-sectional view, according to another modification, showing a charging unit 300 for charging a chargeable battery 370 mounted in a pen 360, which includes a coil L301.

More specifically, as shown in FIG. 31(a), the battery charger 300 includes a stand shaped body 301 and a charging coil L302. The body 301 is formed with an insertion portion 302. The tip of the cylindrical body portion 361a of the pen 360 is inserted into and supported in the insertion portion 302. When the pen 360 is inserted in this manner, the pen tip 362 of the pen 360 is brought into a sealed condition and prevented from drying out. In this state, the charging coil L302 is disposed in confrontation with the coil L301 in the pen 360, so that the charging coil L302 is capable of magnetically coupling with the coil L301.

Figure 31B:
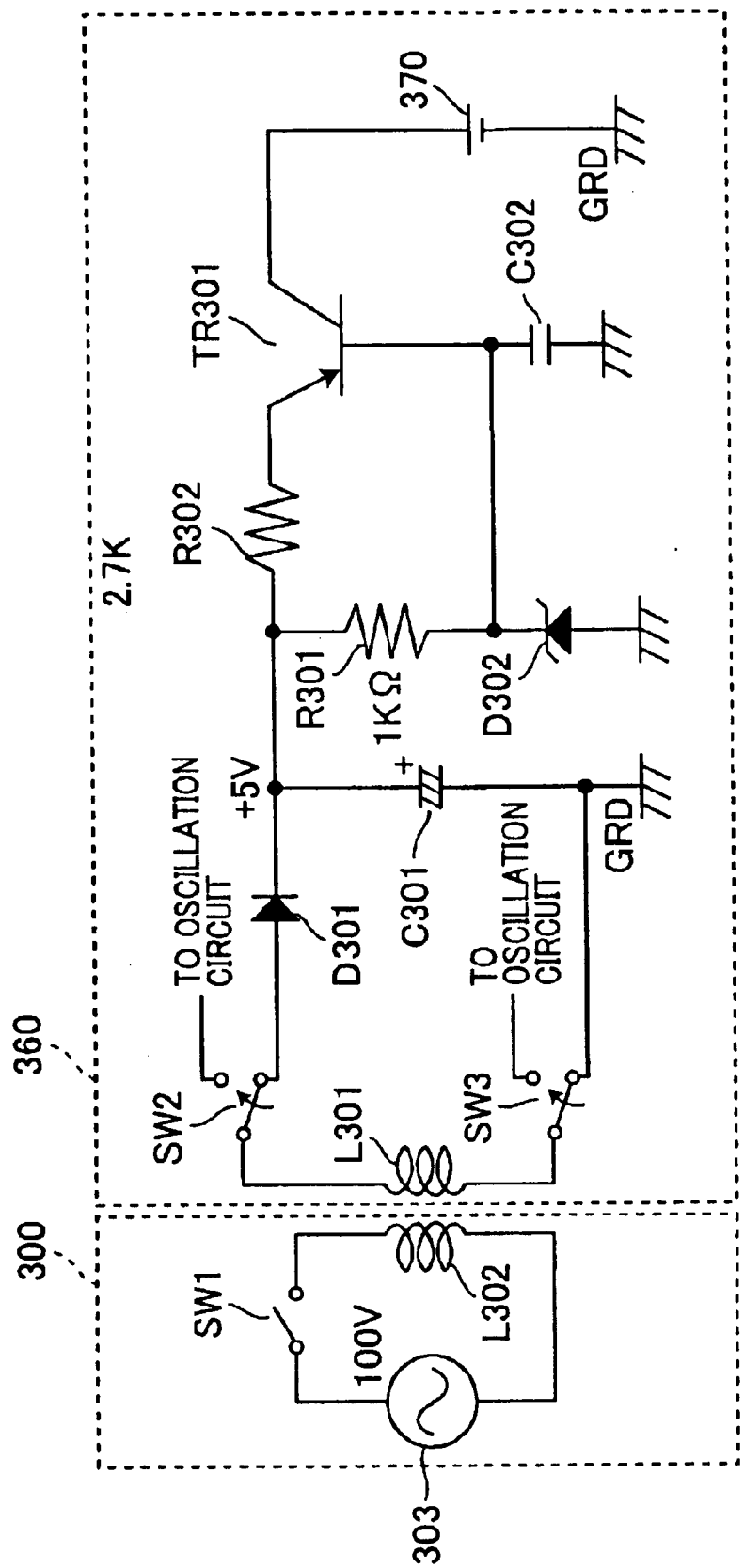
FIG. 31(b) is a circuitry diagram showing electrical configuration of the charging unit 300 and the pen 360.

As shown in FIG. 31(b), the battery charger 300 includes: an alternating current power source 303, the charging coil L302, and a switch SW1. The power source 303 is connected to the charging coil L302, and the switch SW1 is used to open and close the circuit between the power source 303 and the recharging coil L302.

The pen 360 includes: a pair of switches SW2 and SW3; a diode D301, condensers C301 and C302, resisters R301 and R302, a transistor TR301, a Zenar diode D302, and the chargeable battery 370. The switches SW2 and SW3 operate in an interlocking manner for switching connection of the coil L301 between the oscillation circuitry 69 (shown in FIG. 28(d)) and the charging circuitry of the battery charger 300. In order to charge the battery 370, the pen 360 is mounted in the battery charger 300, and the switches SW2 and SW3 are manually switched into connection with the charging circuitry of the battery charger 300. Alternatively, this switching operation can be automatically performed when the pen 360 is mounted in the battery charger 300.

When the pen 360 is mounted in the battery charger 300 and the switches SW2 and SW3 are switched into their battery charging states, the charging coil L302 and the coil L301 are magnetically coupled with each other so that an alternating current starts to flow at the coil L301. The diode D301 operates to flow the current of a half cycle wave in a single direction, and the condenser C301 serves as a smoothing circuit for smoothing the current into substantially a direct current. The Zenar diode D302 generates a reference voltage. The transistor TR301 stabilizes the current into a fixed amount so that the battery 370 can be charged without being subjected to an excessive current.

Modifications for the coil L1 an the pen tip 62 will be described below.

The position, the number of windings, and the diameter of the coil L1 are dependent on the size of the writing panel 10, and on the sensitivity and resolution enabled by the arrangement of the sense coils 23. The configuration of the coil L1 can be changed as needed.

Figure 32A:
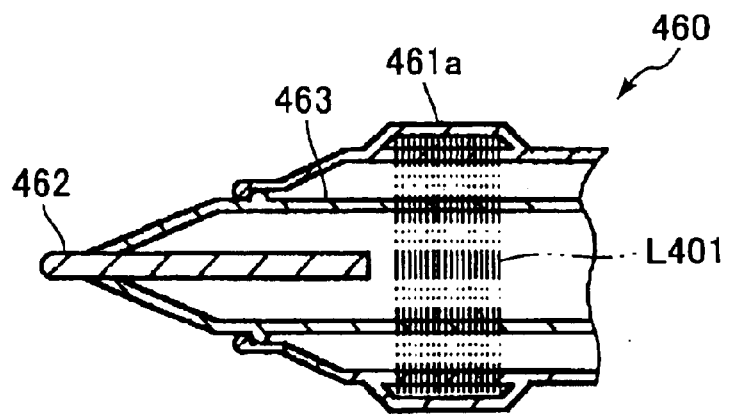
FIG. 32(a) is a cross-sectional view of a pen 460 according to another modification.

For example, a coil L401 may be provided in a pen 460 as shown in FIG. 32(a). More specifically, when the diameter of the cylindrical body portion 461a of the pen 460 is relatively small compared to the winding diameter of the coil L401, the cylindrical body portion 461a can be formed to protrude radially at a portion that corresponds to the location where the coil L401 is mounted.

Figure 32B:
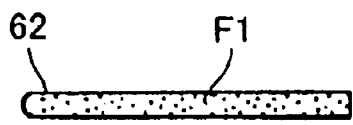
FIG. 32(b) shows a modification of a pen tip 62.
Figure 32C:
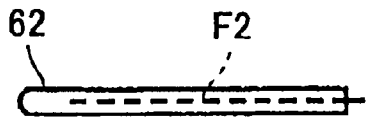
FIG. 32(c) shows another modification of a pen tip 62.
Figure 32D:
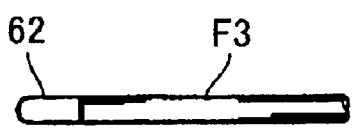
FIG. 32(d) shows still another modification of a pen tip 62.

The pen tip 62 may be modified as shown in FIGS. 32(b)–(d). For example, the magnetic flux can be regulated by dispersing ferrite particles into the felt pen tip 62 as shown in FIG. 32(b). Alternatively, a needle shaped iron core can be disposed in the pen tip 62 as shown in FIG. 32(c). Further alternatively, the pen tip 62 can be surrounded by an iron pipe as shown in FIG. 32(d). By using such modifications, the density and the direction of the lines of magnetic force can be adjusted, so the sensitivity, or resolution, of the pen 60 can be adjusted.

While the invention has been described in detail with reference to the specific embodiments thereof, it would be apparent to those skilled in the art that various changes and modifications may be made therein without departing from the spirit of the invention.

For example, the electrical circuitries disclosed in the above-described embodiments and modifications are merely examples, and could be changed into other circuitries that perform the same function.

It is desirable for the cylindrical body portion 61a of the pen 60 to be configured in accordance with the thickness of a line to be drawn using the pen 60. More specifically, pens 60 that are for drawing thick lines should have a thick body portion 61a and pens 60 that are for drawing fine lines should be provided with a thin body portion 61a. With this configuration, the user needs merely glance at the case 61a to determine the thickness of the line. Therefore, the user will draw with the wrong thickness pen less frequently. Also, it is desirable that the case 61a have the same color as the color to be written using the subject pen.

Figure 33A:
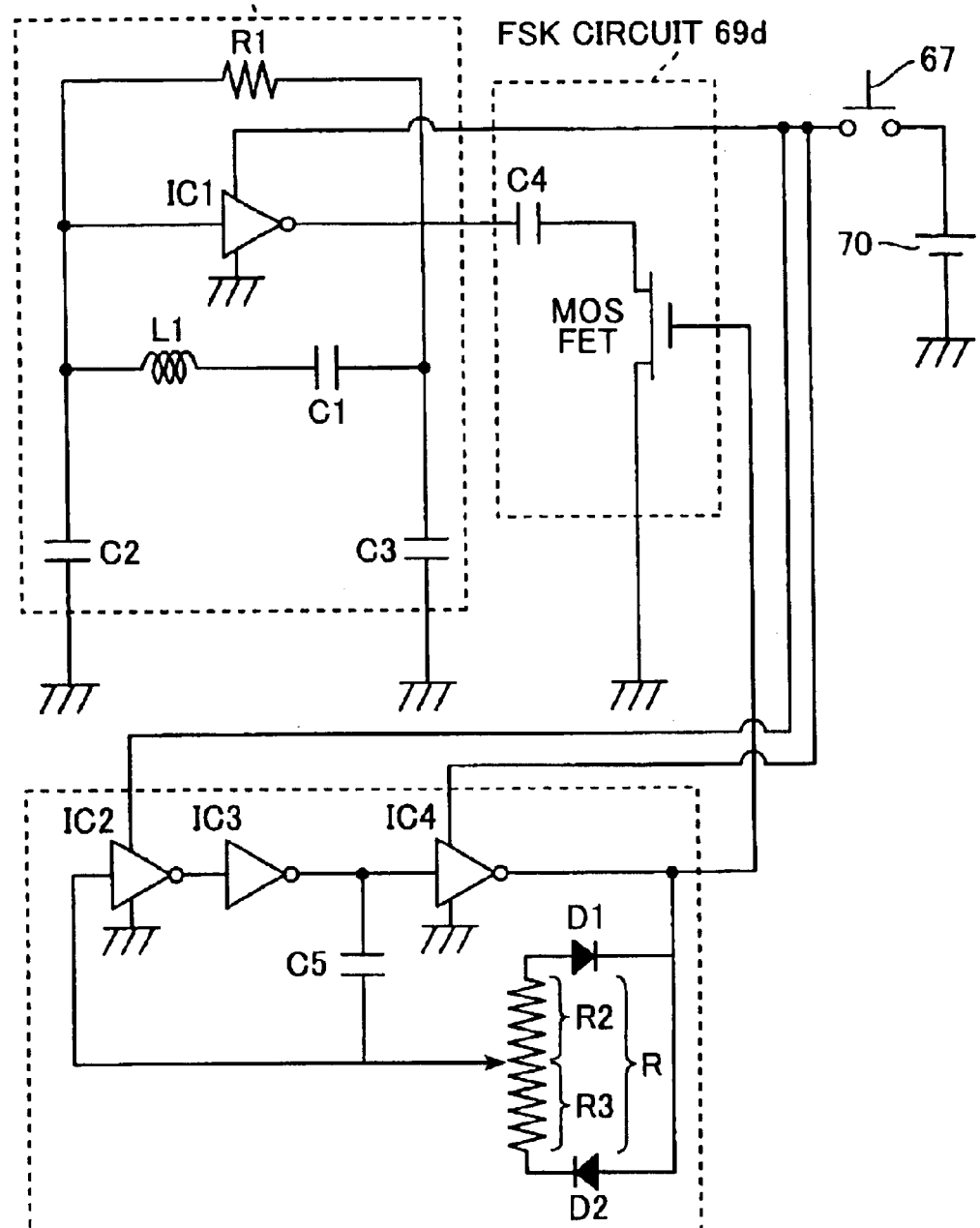
FIG. 33(a) is a circuit diagram showing electric configuration of the pen 60 according to another modification of the first embodiment.

In the first embodiment, the length of the period T of the CR signal is set differently for the respective pen attributes. However, the attribute information can be set by designating the duty ratio of the CR signal. In this case, the CR oscillation circuit 69e should be modified as shown in FIG. 33(a). That is, a pair of variable resistors R2 and R3 (resistor R) are employed, instead of the pressure sensor 68 in the second embodiment (FIG. 26(a)). According to the present modification, the position of the contact point between the capacitor C5 and the resistor R, that is, the separating point between the resistors R2 and R3 is changed according to the pen attribute. Thus, according to the pen attribute, the lengths of the resistors R2 and R3 are changed, while the total length of the resistors R2 and R3 are maintained to be fixed.

Accordingly, also in this case, the duty ratio D of the CR signal is determined as follows:

$$D=R2/(R2+R3).$$

The time length of the single period of the CR signal is determined as follows:

$$T=0.69 \times C5 \times (R2+R3).$$

Figure 33B:
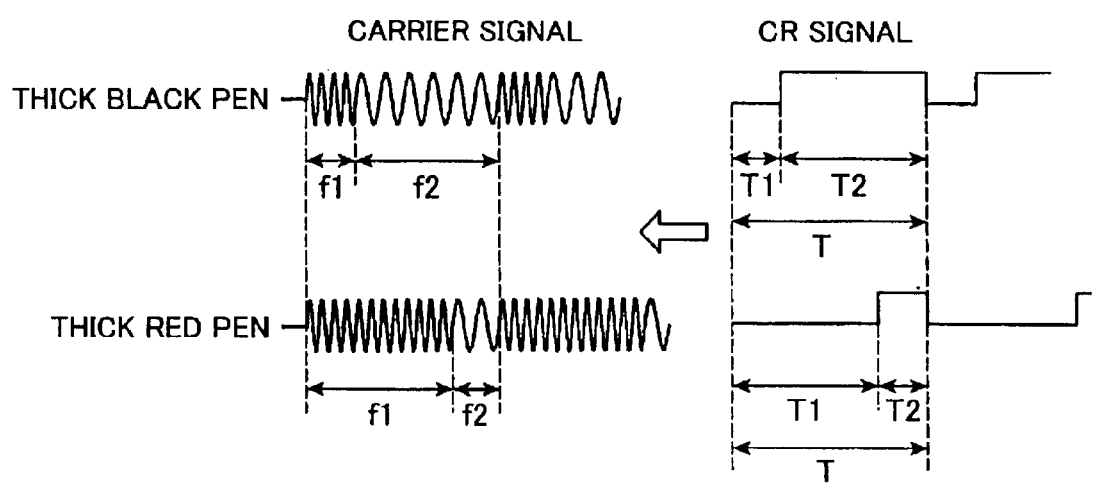
FIG. 33(b) are timing diagrams, for the modification of FIG. 33(a), showing a CR signal outputted from the CR oscillation circuit 69e and a carrier signal modulated by the CR signal, for a black thick pen and a red thick pen.

Accordingly, by changing the amounts of the resistances of the variable resistors R2 and R3, while maintaining the amounts of their sum value, according to a different pen attribute, the duty ratio D can be set differently for a different pen attribute. For example, as shown in FIG. 33(b), the CR oscillation circuit 69e may oscillate the CR signal with some single duty ratio D(=T1/T) for the black thick pen, and may oscillate the CR signal with another single duty ratio D for the red thick pen. It is noted that T=T1+T2, wherein T1 is the time length where the CR signal is in the low level and T2 is the time length where the CR signal is in the high level.

In this case, the FSK demodulation circuit 55 in the first embodiment is preferably modified into the FSK demodulation circuit 55' (FIG. 22) as in the second embodiment. By executing the operation shown in FIG. 25 of the second embodiment, the FSK demodulation circuit 55' outputs a demodulated counted value, indicative of the time length T1 where the CR signal is maintained in the low level, and another demodulated counted value, indicative of the time length T2 where the CR signal is maintained in the high level. Based on the received information, the CPU 56 can calculate the time length of the single period T, that is, the sum of the time lengths T1 and T2, and then calculate the duty ratio D=(T1/T) of the CR signal, and detect the pen attribute accordingly.

By additionally setting a different duty ratio of the CR signal for each user of the pen 60 and storing, in an EEPROM for example, each user name in correspondence with its duty ratio, written data can be printed out or displayed with the user's name.

It should be noted that phase modulation can be used in place of the frequency modulation. Thus, according to the present invention, any angle modulation for modulating an angle or phase state, such as the phase or the frequency, of the alternating magnetic field (carrier wave), can be used to designate the pen attributes. Because the carrier wave has its angle state modulated by the CR signal corresponding to the pen attribute, even if the amplitude of the carrier wave is changed, the period or the duty ratio of the CR signal will not change. Therefore, there is no danger that the pen attribute information indicated by the period or the duty ratio of the carrier wave will change.

Thus, according to the first embodiment and this modification, the pen or coordinate input device 60 is provided to include the coil L1 for generating an alternating magnetic field with a fixed frequency, and to modulate the alternating magnetic field in angle modulation with a single period or a single duty ratio that is set corresponding to attribute information of the pen 60. The pen or coordinate input device 60 transmits the angle-modulated signal, whose period or duty ratio is set to the single value that corresponds to the attribute information. When the electronic white board or coordinate reading device 1 receives the transmitted signal, the sense coils 23 are magnetically coupled with the angle-modulated alternating magnetic field, thereby producing signals. Based on the thus produced signals, the electronic white board or coordinate reading device 1 calculates the coordinate of the pen or coordinate input device 60. The electronic white board or coordinate reading device further demodulates the signals, and detects the period or duty ratio of the signal, thereby determining the attribute information.

Because the carrier signal is angle modulated by the pen 60 before being transmitted, even if the strength of the alternating magnetic field is changed, the attribute information will be accurately transmitted and received because the period or phase, which is the attribute information indicating portion, will not be influenced even when the strength is changed.

By repeatedly transmitting the carrier signal over at least the predetermined duration of time, even if the timing when the alternating magnetic field is generated from the pen does not match the timing where the electronic white board 1 detects the signal generated in the sense coils, the electronic white board 1 can determine the attribute information because it can detect the signal generated in the sense coils within the predetermined time.

The above description is directed to an electronic white board. However, the present invention can be applied to other various information communication systems, such as a security system. In the situation for the security system, several sensors are provided at various locations in a building to monitor windows, entrances, and exits. A transmission device provided with the oscillation circuit 69 shown in FIG. 6(*b*) or FIG. 33(*a*) is installed into each sensor. The modulation frequency fm (or period) or the duty ratio of the CR oscillation circuit 69e in the transmission device is set to a different value for each sensor. A reception device, having the at least the limiter circuit 54 and the FSK demodulation circuit 55 shown in FIG. 8 or the FSK demodulation circuit 55' shown in FIG. 22, is provided in a security office of the building.

When a sensor is turned ON, the transmission device connected to the sensor operates and sends a signal to the reception device. The reception device demodulates the transmitted signal, and determines which sensor has transmitted the signal. Also in this case, because the sensors can be distinguished by providing slightly different frequencies (periods) to the CR oscillation circuit, a great number of sensors can be provided in the security system.

Thus, according to this signal communicating method, the pen or transmitting device 60 sets a single period or a single duty ratio to information desired to be transmitted, and modulates a carrier signal in angle modulation with the set single period or the set single duty ratio. The pen or transmitting device 60 transmits the angle-modulated signal, whose period or duty ratio is set to the single value that corresponds to information desired to be transmitted. The electronic white board or receiving device 1 receives the transmitted signal, and detects the period or duty ratio of the signal, thereby determining the corresponding information.

Because the signal has a single period or a single duty ratio, and because the period or duty ratio is set depending on the information to be transmitted, the receiving side can recognize the information by merely detecting the signal for a single period. Accordingly, the time required to detect the information becomes shorter than the conceivable situation of FIG. 1(*b*) wherein information is indicated using a plurality of periods from a start bit to a stop bit.

Additionally, according to this method, information can be distinguished by merely changing the period or the duty ratio of the signal slightly. For example, the information can be distinguished if the period or the duty ratio is changed by at least a single signal period of a system clock by the receiving device (electronic white board) 1. Accordingly, a great variety of different types of information can be transmitted and information can be distinguished in a shorter time.

Further, because the carrier signal is angle modulated by the pen (transmitting side) 60 before being transmitted, even if the amplitude of the carrier signal is changed, the information will be accurately transmitted and received because the period or phase, which is the information indicating portion of the signal, will not be influenced even when the amplitude is changed.

By repeatedly transmitting the signal over at least the predetermined duration of time, the time that the signal can be received by the receiving side can be properly secured. Therefore, if the receiving side starts receiving the signal in the middle of a first period of the signal, so that the information in the signal could not be detected, then even in this situation the information can be detected by merely receiving the second period of the signal.

What is claimed is:

1. A coordinate reading system, comprising
   a coordinate input device, the coordinate input device including:
   a coil generating an alternating magnetic field;
   an angle-modulation portion that modulates the alternating magnetic field in an angle modulation to thereby successively change an angle state of the alternating magnetic field into a plurality of different states in a plurality of successive time durations, while setting a length of at least one time duration to a value corresponding to information of the coordinate input device, the angle state being maintained, during each time duration, as being fixed to a corresponding state and changing from the corresponding state into another state at a timing between the each time duration and its next time duration; and a coordinating reading device, the coordinate reading device including:

a main body having a surface defining a coordinate of the coordinate input device;

a plurality of wires provided to the main body, each wire generating, upon receipt of the modulated alternating magnetic field, an electric signal whose amplitude corresponds to the position of the coordinate input device and whose angle state corresponds to the angle state of the received alternating magnetic field;

a coordinate detection unit that calculates the coordinate of a position of the coordinate input device based on the amplitude of the generated electric signal; and an information detection unit that detects the length of the at least one time duration by detecting timings when the angle state of the electric signal changes, thereby determining the information of the coordinate input device.

2. A coordinate reading system as claimed in claim 1, wherein the angle-modulation portion includes:

a modulation frequency setting portion that sets a value of a modulation frequency that corresponds to the information of the coordinate input device; and a modulation portion that changes the angle state of the alternating magnetic field into the plurality of different states in the plurality of successive time durations, a length of a single modulation period, which is equal to the total length of all the plurality of successive time durations, having a value corresponding to the set modulation frequency value.

3. A coordinate reading system as claimed in claim 1, wherein the angle-modulation portion includes:

a duty ratio setting portion that sets a value of a duty ratio that corresponds to the information of the coordinate input device; and a modulation portion that changes the angle state of the alternating magnetic field into the plurality of different states in the plurality of successive time durations, a duty ratio, which is equal to a ratio of a length of one time duration relative to the total length of all the plurality of time durations, having the set value.

4. A coordinate reading system as claimed in claim 1, wherein the angle-modulation portion includes a frequency modulation portion that modulates the alternating magnetic field in a frequency deviation modulation to successively modulate the alternating magnetic field into a plurality of different frequencies in the plurality of time durations, with a length of at least one time duration for at least one frequency having the set value.

5. A coordinate reading system as claimed in claim 4, wherein each wire generates the electric signal, whose amplitude corresponds to the coordinate of the position of the coordinate input device and whose frequency corresponds to the frequency of the alternating magnetic field, and wherein the information detection unit includes a timing detecting portion that detects the timing when the generated electric signal changes in its frequency, to thereby detect the length of the at least one time duration.

6. A coordinate reading system as claimed in claim 4, wherein the frequency modulation portion includes:

a single-value-setting portion that sets a single value indicative of a single kind of information of the coordinate input device; and a modulation portion that modulates the frequency of the alternating magnetic field in the plurality of successive time durations, the length of the at least one time duration having the set single value.

7. A coordinate reading system as claimed in claim 4, wherein the frequency modulation portion includes:

a modulation frequency setting portion that sets a value of a modulation frequency that corresponds to the single kind of information of the coordinate input device; and a modulation portion that changes the frequency of the alternating magnetic field into the plurality of different states in the plurality of successive time durations, a modulation period, which is equal to a total length of all the plurality of successive time durations, having a value corresponding to the set modulation frequency value.

8. A coordinate reading system as claimed in claim 7, wherein the modulation frequency setting portion sets the modulation frequency to a fixed value that corresponds to attribute information predetermined for the coordinate input device, thereby causing the modulation period to have a fixed value indicative of the attribute information of the coordinate input device.

9. A coordinate reading system as claimed in claim 4, wherein the frequency modulation portion includes:

a duty ratio setting portion that sets a value of a duty ratio that corresponds to the single kind of information of the coordinate input device; and a modulation portion that changes the frequency of the alternating magnetic field into the plurality of different states in the plurality of successive time durations, a duty ratio, which is equal to a ratio of a length of one time duration relative to the total length of all the time durations, having the set value.

10. A coordinate reading system as claimed in claim 9, wherein the duty ratio setting portion sets the duty ratio to a fixed value that corresponds to attribute information predetermined for the coordinate input device, thereby causing the duty ratio to have the fixed value indicative of the attribute information of the coordinate input device.

11. A coordinate reading system as claimed in claim 4, wherein the frequency modulation portion includes:

a plural-value-setting portion that sets a plurality of values indicative of a plurality of kinds of information of the coordinate input device; and a modulation portion that modulates the frequency of the alternating magnetic field in the plurality of successive time durations, the lengths of the plurality of time durations corresponding to the set plurality of values.

12. A coordinate reading system as claimed in claim 11, wherein the lengths of the plurality of time durations have the set plurality of values, respectively.

13. A coordinate reading system as claimed in claim 11, wherein the coordinate input device further comprises a consecutive detection unit that consecutively detects a characteristic of the coordinate input device, wherein the plural-value-setting portion sets one fixed value that corresponds to attribute information that is predetermined for the coordinate input device and one consecutively-changing value indicative of the consecutively-detected characteristic of the coordinate input device, and wherein the modulation portion modulates the frequency of the alternating magnetic field in the plurality of successive time durations, the length of one time duration for one frequency having the set fixed value indicative of the attribute information of the coordinate input device, the length of another time duration for another frequency having the set consecutively-changing value indicative of the consecutively-detected characteristic of the coordinate input device.

14. A coordinate reading system as claimed in claim 4, wherein the frequency modulation portion includes:

a fixed-value-setting portion that sets a fixed value indicative of information of a fixed state of the coordinate input device; and a modulation portion that modulates the frequency of the alternating magnetic field in the plurality of successive time durations, the length of at least one time duration for at least one frequency corresponding to the set fixed value.

15. A coordinate reading system as claimed in claim 4, wherein the coordinate input device further comprises a consecutive detection unit that consecutively detects a characteristic of the coordinate input device, and wherein the frequency modulation portion includes:

a changeable-value-setting portion that sets a consecutively-changing value indicative of the consecutively-detected characteristic of the coordinate input device; and a modulation portion that modulates the frequency of the alternating magnetic field in the plurality of successive time durations, the length of at least one time duration for at least one frequency corresponding to the consecutively-changing value.

16. A coordinate reading system as claimed in claim 4, wherein the frequency modulation portion repeatedly modulates the frequency of the alternating magnetic field for a predetermined length of time.

17. A coordinate reading system as claimed in claim 4, wherein the coordinate input device further includes a carrier wave generating portion that causes the coil to generate the alternating magnetic field with a predetermined frequency, and wherein the frequency modulation portion controls the carrier wave generating portion to cause the coil to generate the alternating magnetic field whose frequency is modulated into the plurality of different frequencies in the plurality of successive time durations.

18. A coordinate reading system as claimed in claim 4, wherein the frequency modulation portion in the coordinate input device includes:

a signal production portion that produces a signal that repeatedly changes its amplitude in a modulation frequency, the amount of the modulation frequency indicating the information; and a modulation portion that subjects the alternating magnetic field to the frequency modulation by using the product signal.

19. A coordinate reading system as claimed in claim 18, wherein the modulation portion performs a frequency-shift-keying modulation onto the alternating magnetic field by using the produced signal.

20. A coordinate reading system as claimed in claim 18, wherein the coordinate input device further includes:

an ink cartridge that includes a tank storing ink, the desired information indicating color of the ink; and a case portion that detachably houses the ink cartridge, wherein at least a part of the signal production portion is mounted to the ink cartridge.

21. A coordinate reading system as claimed in claim 20, wherein the ink cartridge further includes a pen tip for writing with the ink stored in the tank, the desired information indicating thickness of the pen tip.

22. A coordinate reading system as claimed in claim 20, wherein the signal production portion includes a capacitor that determines the modulation frequency, the capacitor being mounted to the ink cartridge.

23. A coordinate reading system as claimed in claim 20, wherein the signal production portion includes a resistor that determines the modulation frequency, the resistor being mounted to the ink cartridge.

24. A coordinate reading system as claimed in claim 20, wherein the coordinate input device further includes:

a power source that supplies electric power; and an LC oscillation circuit that causes the coil to generate the alternating magnetic field with a predetermined frequency;

wherein the signal production portion includes a CR oscillation circuit that has a capacitor and a resistor oscillating the signal with the modulation frequency, wherein the modulation portion includes a frequency shift keying circuit that modulates the alternating magnetic field with the signal produced by the CR oscillation circuit, wherein the coordinate input device further includes a switch that supplies the electric power from the power source to the LC oscillation circuit, the CR oscillation circuit, and the frequency shift keying circuit when the ink cartridge is in a writing operation, and wherein at least a part of the CR oscillation circuit is mounted to the ink cartridge.

25. A coordinate reading system as claimed in claim 24, wherein an entire part of the CR oscillation circuit is mounted to the ink cartridge.

26. A coordinate reading system as claimed in claim 1, wherein the angle-modulation portion includes:

a setting portion that sets a value indicative of the information of the coordinate input device; and a modulation portion that modulates the angle state of the alternating magnetic field into a plurality of different states in the plurality of successive time durations, while setting the length of the at least one time duration to a value corresponding to the set value.

27. A coordinate reading system as claimed in claim 1, wherein the angle-modulation portion includes:

a fixed-value-setting portion that sets a fixed value indicative of information of a fixed state of the coordinate input device; and a modulation portion that modulates the angle state of the alternating magnetic field into the plurality of different states in the plurality of successive time durations, the length of the at least one time duration corresponding to the set fixed value.

28. A coordinate reading system as claimed in claim 1, wherein the angle-modulation portion includes:

a changeable-value-setting portion that detects a changeable state of the coordinate input device and that sets a changeable value indicative of the detected state of the coordinate input device; and a modulation portion that modulates the angle state of the alternating magnetic field into the plurality of different states in the plurality of successive time durations, the length of the at least one time duration corresponding to the set changeable value.

29. A coordinate input reading device, comprising:

a coil generating an alternating magnetic field; and an angle-modulation portion that modulates the alternating magnetic field in an angle modulation to thereby successively change an angle state of the alternating magnetic field into a plurality of different states in a plurality of successive time durations, while setting a length of at least one time duration to a value corresponding to information of the coordinate input device, the angle state being maintained, during each time duration, as being fixed to a corresponding state and changing from the corresponding state into another state at a timing between the each time duration and its next time duration.

30. A coordinate input device as claimed in claim 29, wherein the angle-modulation portion includes:

a modulation frequency setting portion that sets a value of a modulation frequency that corresponds to the information of the coordinate input device; and a modulation portion that changes the angle state of the alternating magnetic field into the plurality of different states in the plurality of successive time durations, a length of a single modulation period, which is equal to the total length of all the plurality of successive time durations, having a value corresponding to the set modulation frequency value.

31. A coordinate input device as claimed in claim 29, wherein the angle-modulation portion includes:

a duty ratio setting portion that sets a value of a duty ratio that corresponds to the information of the coordinate input device; and a modulation portion that changes the angle state of the alternating magnetic field into the plurality of different states in the plurality of successive time durations, a duty ratio, which is equal to a ratio of a length of one time duration relative to the total length of all the plurality of time durations, having the set value.

32. A coordinate input device as claimed in claim 29, wherein the angle-modulation portion includes a frequency modulation portion that modulates the alternating magnetic field in a frequency deviation modulation to successively modulate the alternating magnetic field into a plurality of different frequencies in the plurality of time durations, with a length of at least one time duration for at least one frequency having the set value.

33. A coordinate input device as claimed in claim 29, wherein the angle-modulation portion includes:

a setting portion that sets a value indicative of the information of the coordinate input device; and a modulation portion that modulates the angle state of the alternating magnetic field into the plurality of different states in the plurality of successive time durations, while setting the length of the at least one time duration to a value corresponding to the set value.

34. A coordinate reading device reading a coordinate of a position of a coordinate input device, the coordinate reading device comprising:

a main body having a surface defining a coordinate of the coordinate input device, a plurality of wires provided on the main body, each wire generating an electric signal in response to an alternating magnetic field from a coordinate input device, the alternating magnetic field having an angle state successively modulated into a plurality of different states in a plurality of successive time durations, the angle state being maintained, during each time duration, as being fixed to a corresponding state and changing from the corresponding state into another state at a timing between the each time duration and its next time duration, a length of at least one time duration corresponding to information of the coordinate input device, an amplitude of the electric signal corresponding to the position of the coordinate input device and an angle state of the electric signal corresponding to the angle state of the alternating magnetic field;

a coordinate detection unit that calculates the coordinate of a position of the coordinate input device based on the amplitude of the generated electric signal; and an information detection unit that detects the length of the at least one time duration by detecting timings when the angle state of the electric signal changes, thereby determining the information of the coordinate input device.

35. A coordinate reading device as claimed in claim 34, wherein the alternating magnetic field has a length of a single modulation period, which is equal to the total length of all the plurality of time durations, corresponding to the information, and wherein the information detection unit detects the length of the single modulation period of the generated electric signal, thereby determining the information.

36. A coordinate reading device as claimed in claim 34, wherein the alternating magnetic field has an amount of a duty ratio, which is equal to a ratio of a length of one time duration relative to the total length of all the plurality of time durations, corresponding to the information, and wherein the information detection unit detects the duty ratio of the generated electric signal, thereby determining the information.

37. A coordinate reading device as claimed in claim 34, wherein the alternating magnetic field is modulated in its frequency to be successively modulated into a plurality of different frequencies in a corresponding plurality of time durations, and wherein the information detection unit includes a timing detecting portion that detects the timing when the generated electric signal changes in its frequency, to thereby detect the length of the at least one time duration.

38. An information communicating method, comprising:

generating a carrier wave;

modulating the carrier wave in an angle modulation to thereby successively change an angle state of the carrier wave into a plurality of different states in a plurality of successive time durations, while setting a length of at least one time duration to a value corresponding to information, the angle state being maintained, during each time duration, as being fixed to a corresponding state and changing from the corresponding state into another state at a timing between the each time duration and its next time duration, and transmitting the carrier wave;

receiving the modulated carrier wave by producing an electric signal whose angle state corresponds to that of the carrier wave; and detecting timings when the angle state of the electric signal changes to detect the length of the at least one time duration, thereby determining the desired information.

39. An information communicating method as claimed in claim 38, wherein modulating the carrier wave further comprises modulating the carrier wave into a modulated state in which a length of a single modulation period, which is equal to the total length of all the plurality of time durations, corresponds to the information, and the detecting timings further comprises detecting the length of the single modulation period of the electric signal, thereby determining the information.

40. An information communicating method as claimed in claim 38, wherein modulating the carrier wave further comprises modulating the carrier wave into a modulated state in which a duty ratio, which is equal to a ratio of a length of one time duration relative to the total length of all the plurality of time durations, corresponds to the information, and the detecting timings further comprises detecting the duty ratio of the electric signal, thereby determining the information.

41. An information communicating method as claimed in claim 38, wherein the angle-modulation modulates the alternating magnetic field in a frequency modulation to successively modulate the alternating magnetic field into a plurality of different frequencies in the plurality of time durations, and the detecting timings further comprises detecting the timings when the frequency of the electrical signal changes to determine the length of the at least one time duration, thereby determining the information.

* * * * *